US012105466B2

(12) United States Patent
Yoshimura et al.

(10) Patent No.: US 12,105,466 B2
(45) Date of Patent: Oct. 1, 2024

(54) PROCESS CARTRIDGE AND IMAGE FORMING APPARATUS

(71) Applicant: CANON KABUSHIKI KAISHA, Tokyo (JP)

(72) Inventors: Akira Yoshimura, Suntoh-gun (JP); Kazunari Murayama, Suntoh-gun (JP); Susumu Nittani, Suntoh-gun (JP); Atsushi Numagami, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/388,570

(22) Filed: Nov. 10, 2023

(65) Prior Publication Data

US 2024/0077832 A1 Mar. 7, 2024

Related U.S. Application Data

(62) Division of application No. 18/079,093, filed on Dec. 12, 2022, now Pat. No. 11,841,673, which is a (Continued)

(30) Foreign Application Priority Data

Jan. 11, 2006 (JP) ................................ 2006-004106
Dec. 22, 2006 (JP) ................................ 2006-346270

(51) Int. Cl.
*G03G 21/18* (2006.01)
*G03G 21/16* (2006.01)

(52) U.S. Cl.
CPC ..... *G03G 21/1814* (2013.01); *G03G 21/1623* (2013.01); *G03G 21/1647* (2013.01); (Continued)

(58) Field of Classification Search
CPC ........... G03G 21/1814; G03G 21/1623; G03G 21/1647; G03G 21/1676; G03G 21/1803; (Continued)

(56) References Cited

U.S. PATENT DOCUMENTS 5,283,616 A 2/1994 Numagami et al.
5,500,714 A 3/1996 Yashiro et al.
(Continued)

FOREIGN PATENT DOCUMENTS

CN 1 304 065 A 1/2001
CN 1591207 A 3/2005
(Continued)

OTHER PUBLICATIONS

Office Action in Brazilian Patent Application No. BR 12 2015 008875-5, dated Sep. 10, 2019 (with partial English translation).
(Continued)

*Primary Examiner* — G. M. A Hyder
(74) *Attorney, Agent, or Firm* — Venable LLP

(57) ABSTRACT

A cartridge includes a photosensitive drum and a developing roller configured to develop an electrostatic latent image formed on the photosensitive drum. A first frame rotatably supports the photosensitive drum and a second frame rotatably supports the developing roller. A movable member is movable with respect to the second frame, with the movable member including a first force receiving surface and a second force receiving surface. The second frame is movable relative to the first frame between a contact position in which the developing roller is in contact with the photosensitive drum and a spaced position in which the developing roller is spaced from the photosensitive drum. The second force receiving surface is capable of being moved by the first force receiving surface between a first position and a second position, and the second frame is capable of being moved by the second force receiving surface from the contact position toward the spaced position.

15 Claims, 53 Drawing Sheets

Related U.S. Application Data division of application No. 17/503,457, filed on Oct. 18, 2021, now Pat. No. 11,579,563, which is a division of application No. 16/936,569, filed on Jul. 23, 2020, now Pat. No. 11,215,949, which is a division of application No. 16/582,076, filed on Sep. 25, 2019, now Pat. No. 10,761,478, which is a division of application No. 16/160,083, filed on Oct. 15, 2018, now Pat. No. 10,642,218, which is a division of application No. 15/334,589, filed on Oct. 26, 2016, now Pat. No. 9,829,856, which is a division of application No. 14/829,004, filed on Aug. 18, 2015, now Pat. No. 9,501,034, which is a division of application No. 14/548,739, filed on Nov. 20, 2014, now Pat. No. 9,141,083, which is a division of application No. 13/953,865, filed on Jul. 30, 2013, now Pat. No. 8,971,760, which is a division of application No. 13/408,911, filed on Feb. 29, 2012, now Pat. No. 8,588,646, which is a division of application No. 12/941,587, filed on Nov. 8, 2010, now Pat. No. 8,165,494, which is a division of application No. 12/363,114, filed on Jan. 30, 2009, now Pat. No. 7,869,740, which is a division of application No. 11/622,205, filed on Jan. 11, 2007, now Pat. No. 7,509,071.

(52) U.S. Cl.
CPC ..... *G03G 21/1676* (2013.01); *G03G 21/1803* (2013.01); *G03G 21/1825* (2013.01); *G03G 21/1839* (2013.01); *G03G 21/1842* (2013.01); *G03G 2215/0119* (2013.01); *G03G 2221/169* (2013.01); *G03G 2221/1861* (2013.01); *G03G 2221/1869* (2013.01)

(58) Field of Classification Search
CPC ........... G03G 21/1825; G03G 21/1839; G03G 21/1842; G03G 2215/0119; G03G 2221/169; G03G 2221/1861; G03G 2221/1869; G03G 21/18; G03G 15/00; G03G 15/02
See application file for complete search history.

(56) References Cited

U.S. PATENT DOCUMENTS

| | | | |
|---|---|---|---|
| 5,543,898 | A | 8/1996 | Shishido et al. |
| 5,585,895 | A | 12/1996 | Yashiro et al. |
| 5,617,579 | A | 4/1997 | Yashiro et al. |
| 5,619,309 | A | 4/1997 | Yashiro et al. |
| 5,638,161 | A | 6/1997 | Numagami et al. |
| 5,652,647 | A | 7/1997 | Yashiro et al. |
| 5,689,774 | A | 11/1997 | Shishido et al. |
| 5,768,658 | A | 6/1998 | Watanabe et al. |
| 5,790,923 | A | 8/1998 | Oguma et al. |
| 5,813,782 | A | 9/1998 | Mason |
| 5,920,753 | A | 7/1999 | Sasaki et al. |
| 5,937,239 | A | 8/1999 | Watanabe et al. |
| 5,937,242 | A | 8/1999 | Yokoyama et al. |
| 5,953,560 | A | 9/1999 | Numagami et al. |
| 5,966,566 | A | 10/1999 | Odagawa et al. |
| 5,966,568 | A | 10/1999 | Numagami et al. |
| 6,006,058 | A | 12/1999 | Watanabe et al. |
| 6,016,413 | A | 1/2000 | Yokoyama et al. |
| 6,029,032 | A | 2/2000 | Watanabe et al. |
| 6,064,842 | A | 5/2000 | Takeuchi et al. |
| 6,097,908 | A | 8/2000 | Uchiyama et al. |
| 6,097,909 | A | 8/2000 | Watanabe et al. |
| 6,101,354 | A | 8/2000 | Nakagawa et al. |
| 6,118,960 | A | 9/2000 | Nakagawa et al. |
| 6,131,007 | A | 10/2000 | Yamaguchi et al. |
| 6,157,792 | A | 12/2000 | Mori et al. |
| 6,169,866 | B1 | 1/2001 | Watanabe et al. |
| 6,246,849 | B1 | 6/2001 | Yokoyama et al. |
| 6,266,500 | B1 | 7/2001 | Numagami et al. |
| 6,272,299 | B1 | 8/2001 | Numagami et al. |
| 6,289,189 | B1 | 9/2001 | Numagami et al. |
| 6,308,028 | B1 | 10/2001 | Yashiro et al. |
| 6,330,409 | B1 | 12/2001 | Watanabe et al. |
| 6,385,416 | B1 | 5/2002 | Horikawa et al. |
| 6,408,142 | B1 | 6/2002 | Takeuchi et al. |
| 6,442,359 | B1 | 8/2002 | Numagami et al. |
| 6,459,869 | B2 | 10/2002 | Nittani et al. |
| 6,463,233 | B2 | 10/2002 | Kojima et al. |
| 6,463,234 | B2 | 10/2002 | Arimitsu et al. |
| 6,473,580 | B1 | 10/2002 | Inomata |
| 6,519,431 | B1 | 2/2003 | Toba et al. |
| 6,574,446 | B2 | 6/2003 | Kitayama |
| 6,577,831 | B1 | 6/2003 | Kojima et al. |
| 6,608,980 | B2 | 8/2003 | Murayama et al. |
| 6,681,088 | B2 | 1/2004 | Kanno et al. |
| 6,714,752 | B2 | 3/2004 | Ueno et al. |
| 6,823,153 | B2 | 11/2004 | Ueno et al. |
| 6,834,171 | B2 | 12/2004 | Nittani et al. |
| 6,898,391 | B2 | 5/2005 | Numagami et al. |
| 6,912,365 | B2 | 6/2005 | Ueno et al. |
| 6,954,601 | B2 | 10/2005 | Numagami et al. |
| 6,980,759 | B2 | 12/2005 | Kanno et al. |
| 7,072,602 | B2 | 7/2006 | Hatori et al. |
| 7,088,939 | B2 | 8/2006 | Maeshima et al. |
| 7,127,194 | B2 | 10/2006 | Hoshi et al. |
| 7,158,735 | B2 | 1/2007 | Murayama et al. |
| 7,158,736 | B2 | 1/2007 | Sato et al. |
| 7,162,174 | B2 | 1/2007 | Suzuki et al. |
| 7,184,690 | B2 | 2/2007 | Ueno et al. |
| 7,209,682 | B2 | 4/2007 | Numagami et al. |
| 7,212,768 | B2 | 5/2007 | Numagami et al. |
| 7,215,909 | B2 | 5/2007 | Nittani et al. |
| 7,272,339 | B2 | 9/2007 | Tsuzuki et al. |
| 2002/0051653 | A1 | 5/2002 | Toba et al. |
| 2002/0110386 | A1 | 8/2002 | Kanno et al. |
| 2002/0172521 | A1 | 11/2002 | Oguma et al. |
| 2002/0191981 | A1 | 12/2002 | Miyabe et al. |
| 2004/0114960 | A1 | 6/2004 | Kunou et al. |
| 2004/0131370 | A1 | 7/2004 | Toba et al. |
| 2004/0258432 | A1 | 12/2004 | Hatori et al. |
| 2005/0047821 | A1 | 3/2005 | Murayama et al. |
| 2005/0053394 | A1 | 3/2005 | Ishii et al. |
| 2005/0123319 | A1 | 6/2005 | Mizoguchi |
| 2005/0135831 | A1 | 6/2005 | Kawaguchi et al. |
| 2005/0214019 | A1 | 9/2005 | Abe et al. |
| 2005/0260011 | A1 | 11/2005 | Murayama et al. |
| 2006/0177231 | A1 | 8/2006 | Mori et al. |
| 2006/0245785 | A1 | 11/2006 | Kawamura et al. |
| 2006/0257164 | A1 | 11/2006 | Hoshi et al. |
| 2007/0092286 | A1 | 4/2007 | Suzuki et al. |
| 2007/0110478 | A1 | 5/2007 | Numagami et al. |
| 2007/0160388 | A1 | 7/2007 | Yoshimura et al. |
| 2008/0159772 | A1 | 7/2008 | Koishi et al. |
| 2008/0159773 | A1 | 7/2008 | Murayama et al. |
| 2008/0159774 | A1 | 7/2008 | Tanabe et al. |
| 2009/0003875 | A1 | 1/2009 | Toba et al. |
| 2009/0003876 | A1 | 1/2009 | Maeshima et al. |

FOREIGN PATENT DOCUMENTS

| | | | |
|---|---|---|---|
| CN | 1601401 | | 3/2005 |
| CN | 1384405 | | 12/2012 |
| EP | 1 231 523 | A2 | 8/2002 |
| EP | 1 519 248 | | 3/2005 |
| EP | 1 612 615 | A | 1/2006 |
| JP | 11-052654 | | 2/1999 |
| JP | 2000-132069 | | 5/2000 |
| JP | 2001-337511 | | 12/2001 |
| JP | 2002-268512 | A | 9/2002 |
| JP | 3347361 | B2 | 11/2002 |
| JP | 2003-167499 | | 6/2003 |
| JP | 2004-045603 | A | 2/2004 |
| JP | 2004-061596 | | 2/2004 |

(56) References Cited

FOREIGN PATENT DOCUMENTS

| | | | |
|---|---|---|---|
| JP | 2004-0053745 | A | 6/2004 |
| JP | 2004-361749 | | 12/2004 |
| JP | 2005-141140 | A | 6/2005 |
| KR | 2001-0020866 | A | 3/2001 |
| KR | 2001-0076362 | A | 8/2001 |
| RU | 2120387 | C1 | 10/1998 |
| RU | 2 206 553 | C2 | 4/2005 |
| TW | 2005023692 | | 7/2005 |
| TW | 2005-27168 | A | 8/2005 |

OTHER PUBLICATIONS

Office Action in Brazilian Patent Application No. BR 12 2015 008876-3, dated Sep. 10, 2019 (with partial English translation).
Office Action in Brazilian Patent Application No. PI 0706369-5, dated Sep. 10, 2019 (with partial English translation).
Dec. 13, 2019 Decision to Grant in Russian Patent Application No. 2019126032 (with English translation).
Feb. 27, 2020 Office Action in Taiwanese Patent Application No. 108123098 (with English translation).
Jan. 20, 2020 Decision to Grant in Russian Patent Application No. 2019126032 (with English translation).
Examination Report in Indian Patent Application No. 788/CHENP/2014, dated Feb. 21, 2020.
Mar. 31, 2021 Office Action in Taiwanese Patent Application No. 109132405.
Oct. 2, 2020 Decision on Grant in Russian Patent Application No. 2020112512 (with English translation).
Mar. 1, 2021 Extended Search Report in European Patent Application No. 20 207 385.4.
May 26, 2021 Decision on Grant in Russian Patent Application No. 2020134678 (with English Translation).
Jul. 19, 2021 Office Action in Indian Patent Applicaiton No. 790/CHENP/2014.
Office Action dated Nov. 11, 2020 in counterpart Indian Patent Application No. 789/CHENP/2014, which includes English translation thereof.
Oct. 29, 2021 Office Action in Taiwanese Patent Application No. 110124129.
Feb. 1, 2022 Decision to Grant in Russian Patent Application No. 2021121750 (with English translation).
Apr. 21, 2022 Communication in European Patent Application No. 20 207 385.4.
Dec. 30, 2022 Decision on Opposition in Russian Patent Application No. 2014116616/63 (with English translation).
Dec. 12, 2022 Office Action in European Patent Application Pub. No. 22 191 401.3.
International Search Report for PCT Application No. PCT/JP2007/050622, issued May 4, 2007.
Australian Search and Examination Report in Australian Application No. SG 200804772-2, issued Jul. 21, 2009.
English translation of JP 2004-061596.
Office Action in Taiwanese Patent Application No. 096101147, dated Jul. 18, 2011 (with translation).
English translation of Decision on Grant in Russian Patent Application No. 2008132822.
Communication in Taiwanese Patent Application No. 101102236, issued Aug. 15, 2014.
Decision on Grant in Russian Patent Application No. 2011115804, mailed Apr. 17, 2014 (with English translation).
Communication in European Patent Application No. 14200533.9, dated Apr. 15, 2015.
Office Action in Taiwanese Patent Application No. 101102237, dated Apr. 22, 2015 (with English translation).
Communication in European Patent Application No. 14200534.7, dated Apr. 15, 2015.
Decision on Grant in Russian Patent Application No. 2014116614, dated Jun. 2, 2015 (with English translation).
Examination Report in Malaysian Patent Application No. PI 20082554, dated Jun. 15, 2015.
Official Action in Russian Patent Application No. 2014116616, dated Jul. 8, 2015 (with English translation).
Jan. 20, 2016 Notice of Allowance in Chinese Patent Application No. 201110148050.0.
Office Action in Chinese Patent Application No. 201110148071.2, mailed Feb. 22, 2016 (with English translation).
Office Action in Taiwanese Patent Application No. 103132256, dated Jun. 16, 2016 (with English translation).
Sep. 2, 2016 Decision on Grant in Russian Patent Application No. 2014116616 (with English translation).
Sep. 19, 2017 Office Action in Taiwanese Patent Application No. 106103515 (with English translation).
Oct. 5, 2017 Official Communication in European Patent Application No. 17171902.4.
Decision on Grant in Russian Patent Application No. 2016152196, mailed Feb. 5, 2018 (with English translation).
Examination Report in Malaysian Patent Applicatino No. PI 20182554, mailed Mar. 15, 2018.
Extended Search Report in European Patent Application No. 18166842.7, dated Aug. 13, 2018.
Notice of Allowance in Taiwanese Patent Application No. 107117080, mailed Oct. 31, 2018.
Jun. 20, 2019 Decision on Grant in Russian Patent Application No. 2018126081 (with English translation).
Notice of Allowance in Taiwanese Patent Application No. 10714070, mailed May 31, 2019.
Office Action in Russian Patent Application No. 2018126081, dated Mar. 14, 2019 (with English translation).

(a)

(b)

(a)

(b)

PROCESS CARTRIDGE AND IMAGE FORMING APPARATUS

FIELD OF THE INVENTION

The present invention relates to a process cartridge in which an electrophotographic photosensitive drum and a developing roller actable on the electrophotographic photosensitive drum are contactable to each other and spaceable from each other, and an electrophotographic image forming apparatus to which the process cartridge is detachably mountable.

RELATED ART

In an image forming apparatus using an electrophotographic image forming process, a process cartridge type is conventional wherein an electrophotographic photosensitive drum and a developing roller actable on the electrophotographic photosensitive drum are unified into a process cartridge detachably mountable to a main assembly of the image forming apparatus. With the process cartridge type, the maintenance operation of the apparatus can be carried out in effect without a service person. Therefore, the process cartridge type is widely used in the field of electrophotographic image forming apparatus.

When the image forming operation is carried out, the developing roller is kept urged to the electrophotographic photosensitive drum at a predetermined pressure. In a contact developing system in which a developing roller is contacted to the photosensitive drum during the developing operation, an elastic layer of the developing roller is in contact with the surface of the photosensitive drum at a predetermined pressure.

Therefore, when the process cartridge is not used for a long time with the process cartridge kept mounted to the main assembly of the image forming apparatus, the elastic layer of the developing roller may be deformed. If this occurs, non-uniformity may result in the formed image. Since the developing roller is contacted to the photosensitive drum, a developer may be deposited from the developing roller to the photosensitive drum since the photosensitive drum and the developing roller are rotated in contact with each other even when the developing operation is not carried out.

As a structure for solving this problem, there is provided an image forming apparatus in which when the image forming operation is not carried out, a mechanism acts on the process cartridge to space the developing roller from the electrophotographic photosensitive drum (Japanese Laid-open Patent Application 2003-167499).

In the apparatus disclosed in this publication, four process cartridges are demountably mounted to the main assembly of the image forming apparatus. The process cartridge comprises a photosensitive member unit having a photosensitive drum, and a developing unit for supporting the developing roller swingably provided in the photosensitive member unit. By moving a spacing plate provided in the main assembly of the image forming apparatus, a force receiving portion provided in the developing unit receives a force from the spacing plate. By moving the developing unit relative to the photosensitive member unit, the developing roller moves away from the photosensitive drum.

In the conventional example, the force receiving portion for spacing the developing roller from the photosensitive drum is projected from the outer configuration of the developing unit. Therefore, when the user handles the process cartridge, and/or when the process cartridge is transported, the force receiving portion tends to be damaged. The existence of the force receiving portion may hinder the downsizing of the process cartridge in which the electrophotographic photosensitive drum and the developing roller are contactable to each other and spaceable from each other and the main assembly of the image forming apparatus to which the process cartridge is detachably mountable.

SUMMARY OF THE INVENTION

Accordingly, it is a principal object of the present invention to provide a downsized process cartridge in which the electrophotographic photosensitive drum and the developing roller are contactable to each other and spaceable from each other and a downsized electrophotographic image forming apparatus to which the process cartridge is detachably mountable.

It is another object of the present invention to provide a process cartridge in which the electrophotographic photosensitive drum and the developing roller are contactable to each other and spaceable from each other with which when the process cartridge is handled, or when the process cartridge is transported, the force receiving portion is not damaged.

According to an aspect of the present invention, there is provided a process cartridge detachably mountable to a main assembly of an electrophotographic image forming apparatus. The main assembly includes an opening, a door movable between a closed position for closing the opening and an open position for opening the opening, a first force application member movable with movement of the door from the open position to the closing position and a second force application member movable by a driving force from a driving source. The process cartridge comprises: an electrophotographic photosensitive drum; a developing roller for developing an electrostatic latent image formed on the electrophotographic photosensitive drum; a drum unit containing the electrophotographic photosensitive drum; a developing unit which contains the developing roller and which is movable relative to the drum unit such that developing roller is movable between a contact position in which the developing roller is contacted to the electrophotographic photosensitive drum and a spaced position in which said developing roller is spaced from the electrophotographic photosensitive drum; and a force receiving device including a first force receiving portion for receiving a force from the first force application member by movement of the door from the open position to the closed position in the state that process cartridge is mounted to the main assembly of the apparatus through the opening, and a second force receiving portion movable from a stand-by position by movement of the first force receiving portion by a force received from the first force application member. The second force receiving portion takes a projected position for receiving a force from the second force application member to move the developing unit from the contact position to the spaced position, the projected position being higher than the stand-by position.

According to another aspect of the present invention, there is provided an electrophotographic image forming apparatus for forming an image on a recording material, to which a process cartridge is detachably mountable. The apparatus comprises (i) an opening; (ii) a door movable between a closed position for closing said opening and an open position for opening the opening; (iii) a first force application member movable with movement of the door from the open position to the closed position; (iv) a second force application member movable by a driving force from a driving source; and (v) mounting means for detachably mounting a process cartridge. The process cartridge includes an electrophotographic photosensitive drum, a developing roller for developing an electrostatic latent image formed on the electrophotographic photosensitive drum, a drum unit containing the electrophotographic photosensitive drum, a developing unit which contains the developing roller and which is movable relative to the drum unit such that developing roller is movable between a contact position in which the developing roller is contacted to the electrophotographic photosensitive drum and a spaced position in which the developing roller is spaced from the electrophotographic photosensitive drum, and a force receiving device including a first force receiving portion for receiving a force from the first force application member by movement of the door from the open position to the closed position in the state that the process cartridge is mounted to a main assembly of the apparatus through the opening, and a second force receiving portion movable from a stand-by position by movement of the first force receiving portion by a force received from the first force application member. The second force receiving portion takes a projected position for receiving a force from the second force application member to move the developing unit from the contact position to the spaced position, the projected position being higher than the stand-by position. The apparatus also includes feeding means for feeding the recording material.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

First Embodiment

FIGS. 1-4 show the process cartridge and the electrophotographic image forming apparatus according to the first embodiment of the present invention.

Figure 1:
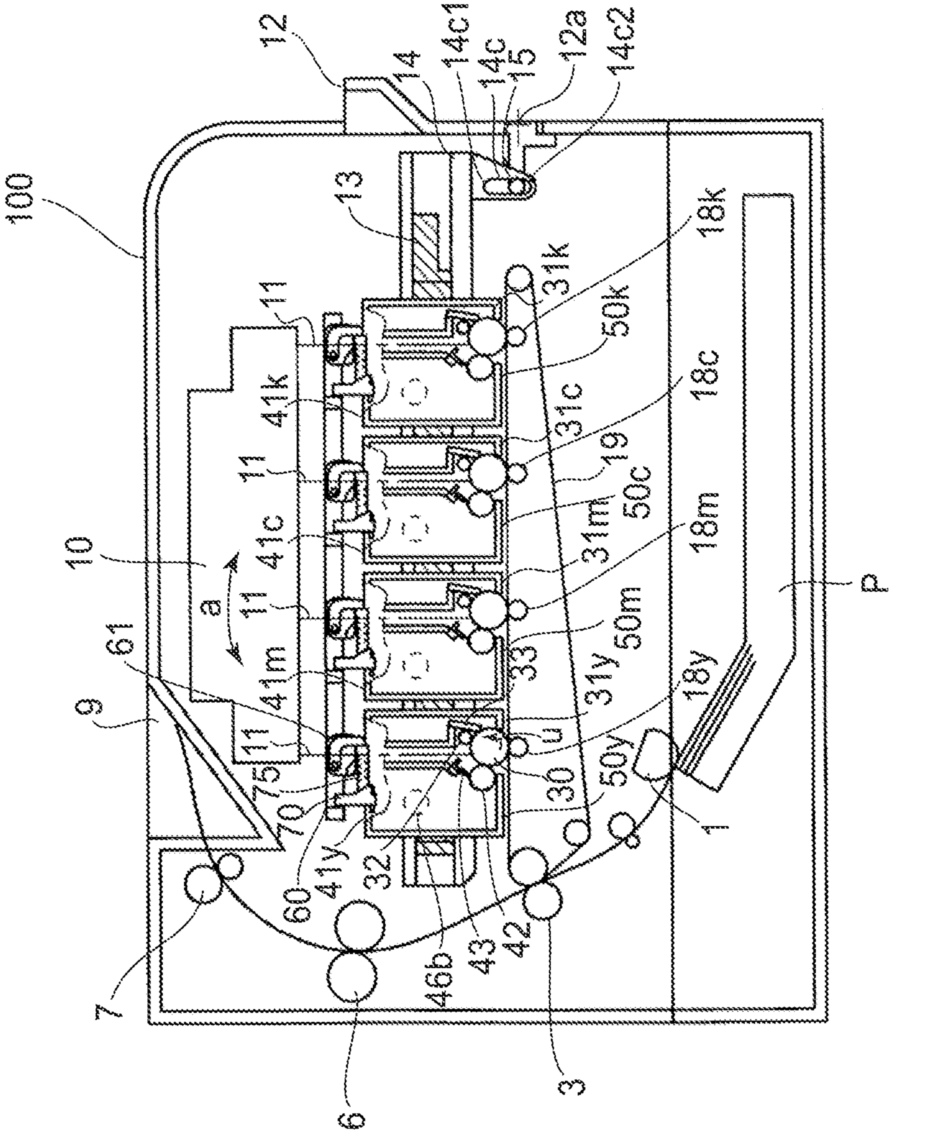
FIG. 1 illustrates a general arrangement of an electrophotographic image forming apparatus according to a first embodiment of the present invention.
Figure 2:
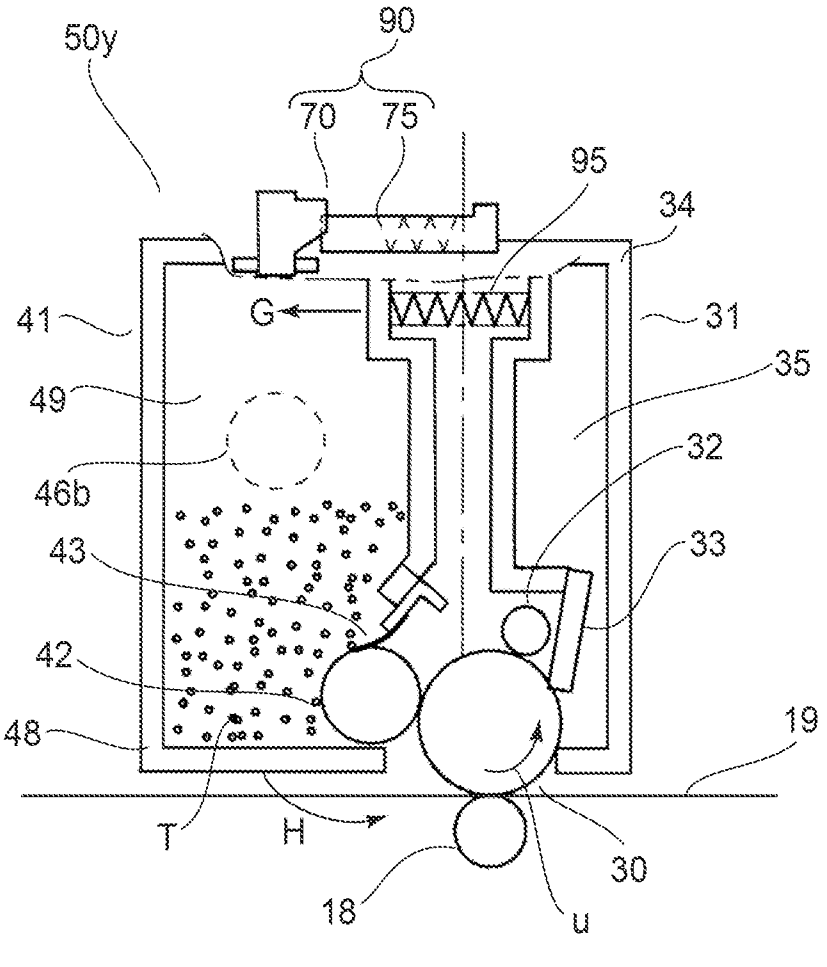
FIG. 2 is a sectional view of a process cartridge according to the first embodiment of the present invention.
Figure 3:
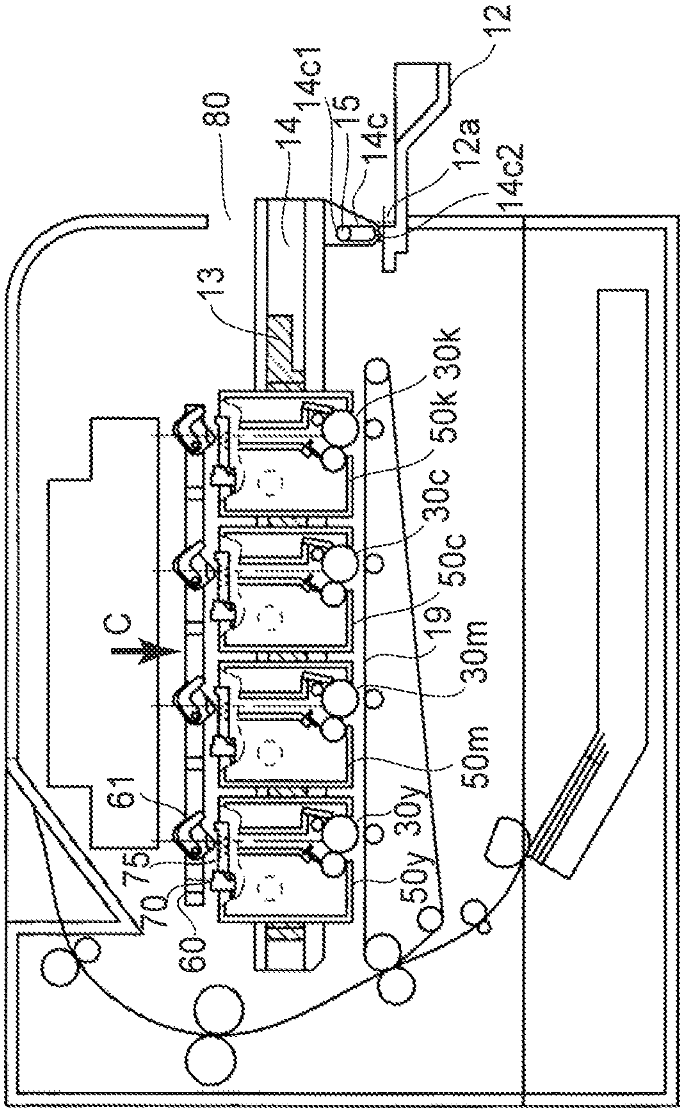
FIG. 3 illustrates a general arrangement of an electrophotographic image forming apparatus according to a first embodiment of the present invention.
Figure 4:
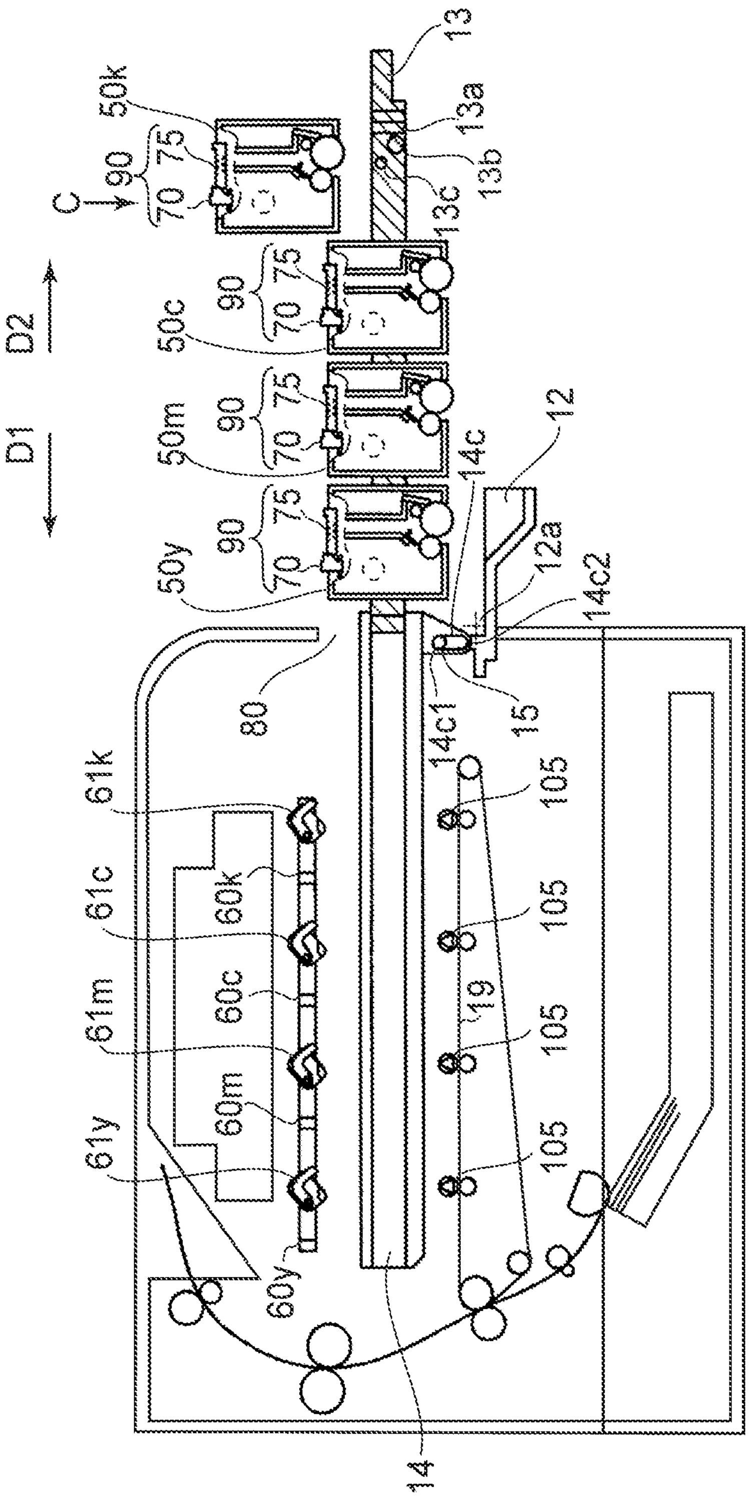
FIG. 4 illustrates exchange of a process cartridge according to the first embodiment of the present invention.

FIG. 1 shows an electrophotographic image forming apparatus (main assembly of the apparatus) 100 including process cartridges (cartridges) 50*y*, 50*m*, 50*c*, 50*k* detachably mounted thereto. The cartridges 50*y*, 50*m*, 50*c*, 50*k* contain or accommodate yellow color toner (developer), magenta color toner (developer), cyan color toner (developer) and black color toner (developer), respectively. FIG. 2 is a sectional side elevation of the cartridge alone; FIGS. 3 and 4 are illustrations of removing the cartridges 50*y*, 50*m*, 50*c*, 50*k* from the main assembly 100 of the apparatus.

[General Arrangement of Electrophotographic Image Forming Apparatus]

As shown in FIG. 1, in the main assembly 100 of the apparatus, the electrophotographic photosensitive drums (photosensitive drums) 30*y*, 30*m*, 30*c*, 30*k* are exposed to the laser beams 11 modulated in accordance with the image signal by the laser scanner 10, so that electrostatic latent images are formed on the surfaces thereof. The electrostatic latent images are developed by developing rollers 42 into toner images (developed images) on the respective surfaces of the photosensitive drums 30. By applying voltages to the transfer rollers 18*y*, 18*m*, 18*c*, 18*k*, the toner images of respective colors formed on the photosensitive drums 30*y*, 30*m*, 30*c*, 30*k* are sequentially transferred onto the transfer belt 19. Thereafter, the toner image formed on the transfer belt 19 is transferred by the transfer roller 3 onto the recording material P fed by the feeding roller 1 (feeding means). Thereafter, the recording material P is fed to the fixing unit 6 including a driving roller and a fixing roller containing a heater. Here, by applying heat and pressure on the recording material P, the toner image transferred onto the recording material P is fixed. Thereafter, the recording material having the toner image fixed thereon is discharged to a discharging portion 9 by a pair 7 of discharging rollers.

[General Arrangement of Process Cartridge]

Referring to FIGS. 1, 2, 5 and 22, 29, 30, the cartridges 50*y*, 50*m*, 50*c* and 50*k* of this embodiment will be described. Since the cartridges 50*y*, 50*m*, 50*c*, 50*k* are all the same except that the colors contained therein are different from each other, the following description will be made only as to the cartridge 50*y*.

The cartridge 50*y* includes a photosensitive drum 30, and process means actable on the photosensitive drum 30. The process means includes a charging roller 32 functioning as charging means for charging electrically the photosensitive drum 30, a developing roller 42 functioning as developing means for developing a latent image formed on the photosensitive drum 30, and/or a blade 33 functioning as cleaning means for removing residual toner remaining on the surface of the photosensitive drum 30. The cartridge 50*y* comprises a drum unit 31 and a developing unit 41.

[Structure of Drum Unit]

Figure 9:
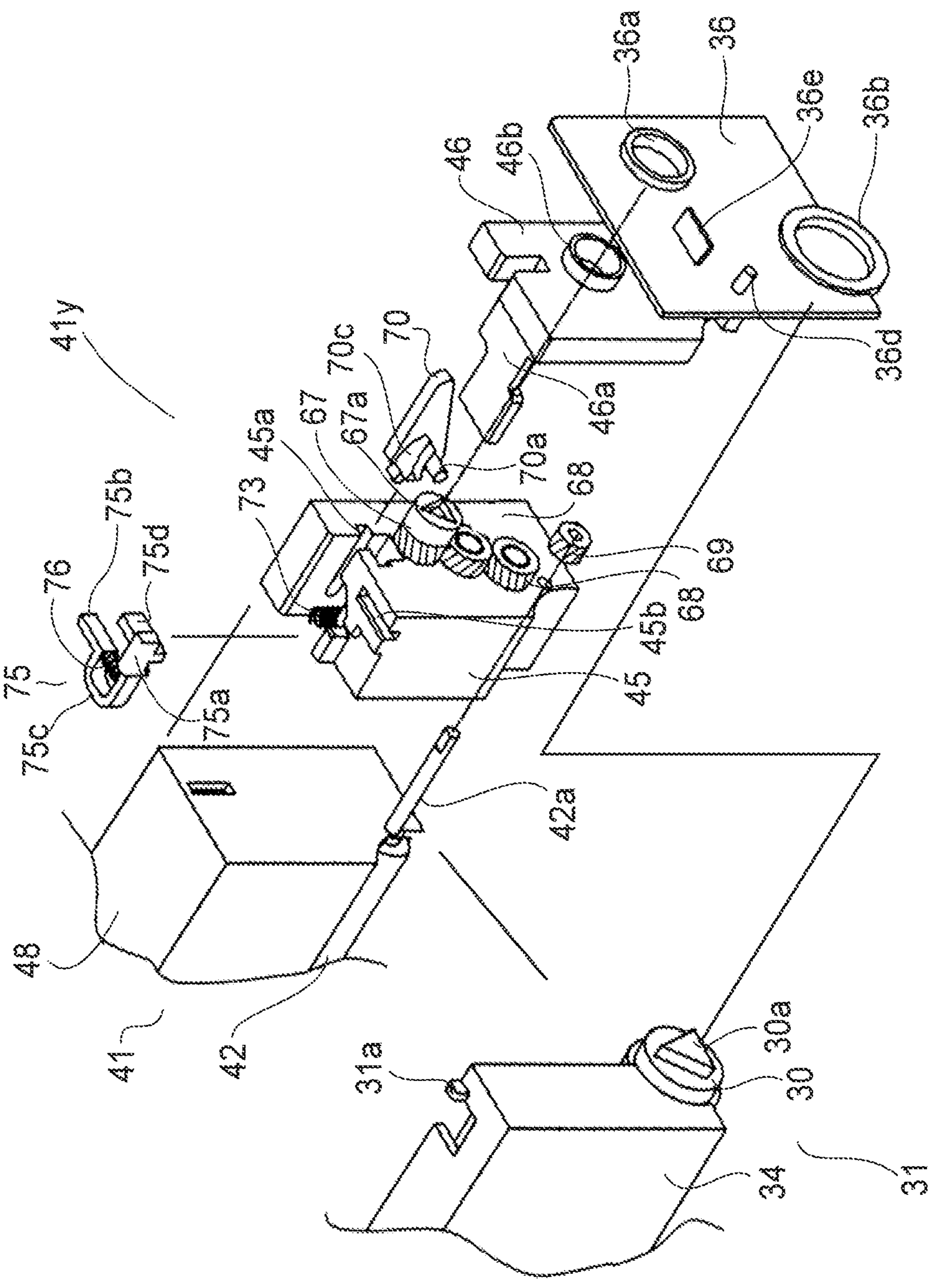
FIG. 9 is a perspective view of the process cartridge as seen from drives side according to the first embodiment of the present invention.
Figure 10:
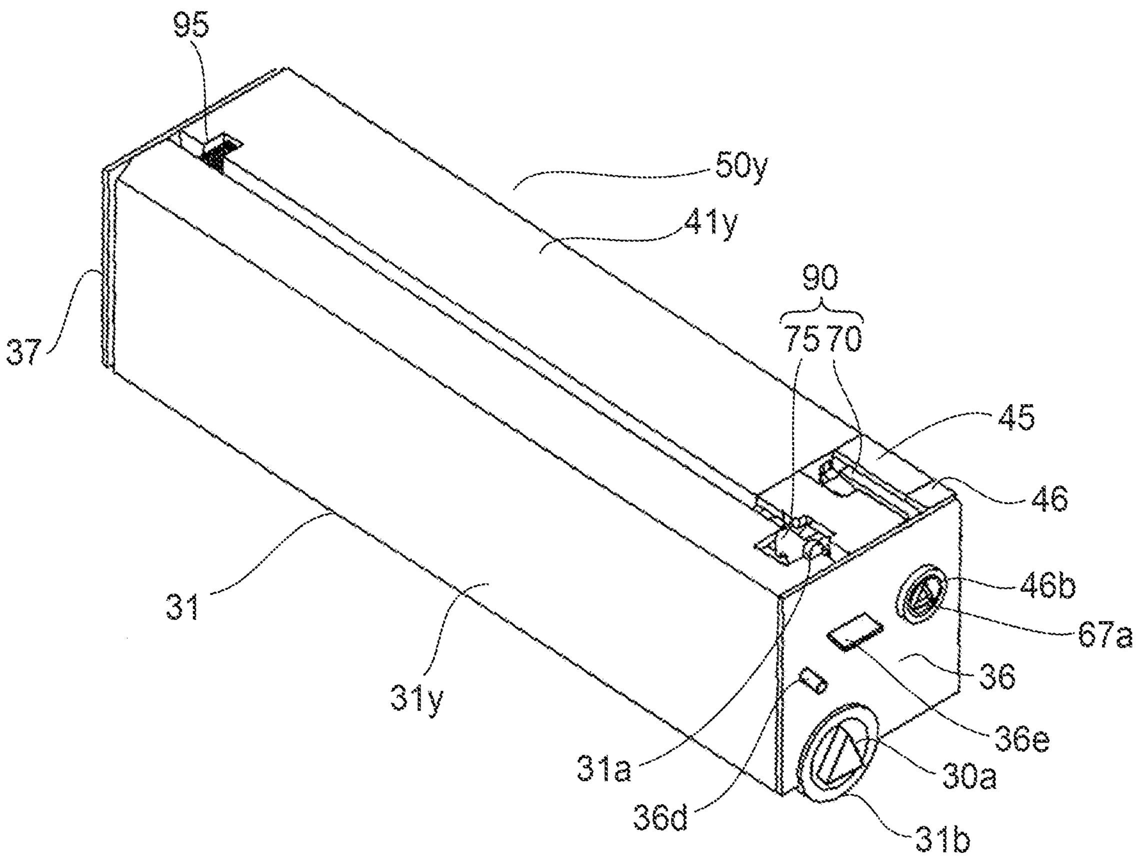
FIG. 10 is a perspective view of the process cartridge as seen from the drive side according to the first embodiment the present invention.

As shown in FIGS. 2, 10, the drum unit 31 contains the photosensitive drum 30, the charging means 32, the cleaning means 33, the residual toner accommodating portion 35, the drum frame 34, and the covering members 36, 37. One longitudinal end of the photosensitive drum 30, as shown in FIG. 9, is supported rotatably by a supporting portion 36*b* of the covering member 36. The other longitudinal end of the photosensitive drum 30, as shown in FIG. 11-FIG. 14, is rotatably supported by a supporting portion 37*b* of a covering member 37. The covering members 36, 37 are fixed to the drum frame 34 at the opposite longitudinal ends of the drum frame 34. As shown in FIGS. 9, 10, one longitudinal end of the photosensitive drum 30 is provided with a coupling member 30*a* for receiving a driving force for rotating the photosensitive drum 30. The coupling member 30*a* is engaged with first main assembly coupling member 105 shown in FIGS. 4, 30 when the cartridge 50*y* is mounted to the main assembly 100 of the apparatus. The photosensitive drum 30 is rotated in the direction of an arrow u as shown in FIG. 2 by a driving force transmitted from a driving motor (unshown) provided in the main assembly 100 of the apparatus to the coupling member 30*a*. The charging means 32 is supported on the drum frame 34 and is rotated by the photosensitive drum 30 to which the charging means 32 is contacted. The cleaning means 33 is supported by the drum frame 34 and is contacted to the peripheral surface of the photosensitive drum 30. The covering members 36, 37 are provided with supporting hole portions 36*a*, 37*a* for rotatably (movably) supporting the developing unit 41.

[Structure of Developing Unit]

As shown in FIG. 2, the developing unit 41 contains the developing roller 42, the developing blade 43, the developing device frame 48, the bearing unit 45 and the covering member 46. The developing device frame 48 comprises a toner accommodating portion 49 for accommodating the toner to be supplied to the developing roller 42, and a developing blade 43 for regulating a layer thickness of the toner of the peripheral surface of the developing roller 42. As shown in FIG. 9, the bearing unit 45 is fixed to the one longitudinal end side of the developing device frame 48, and supports rotatably the developing roller 42 having a developing roller gear 69 at the end thereof. The bearing unit 45 is provided with a coupling member 67, and an idler gear 68 for transmitting a driving force to the developing roller gear 69 from the coupling member 67. The covering member 46 is fixed to the longitudinally outside of the bearing unit 45 so as to cover the coupling member 67 and the idler gear 68. The covering member 46 is provided with a cylindrical portion 46*b* which is projected beyond the surface of the covering member 46. The coupling member 67 is exposed through an inside opening of the cylindrical portion 46*b*. Here, the coupling member 67 is engaged with the second main assembly coupling member 106 shown in FIG. 30 to transmit the driving force from the driving motor (unshown) provided in the main assembly 100 of the apparatus when the cartridge 50*y* is mounted to the main assembly 100 of the apparatus.

[Assembling of Drum Unit and Developing Unit]

As shown in FIGS. 9 and 11 to FIG. 14, when the developing unit 41 and the drum unit 31 are assembled with each other, an outside circumference of the cylindrical portion 46*b* is engaged with the supporting hole portion 36*a* at one end side, and the projected portion 48*b* projected from the developing device frame 48 is engaged with the supporting hole portion 37*a* at the other end side. By doing so, the developing unit 41 is rotatably supported relative to the drum unit 31. As shown in FIG. 2, the developing unit 41 is urged by the urging spring 95 (elastic member) so that developing roller 42 rotates about the cylindrical portion 46*b* and the projected portion 48*b* to contact to the photosensitive drum 30. More specifically, the developing unit 41 is urged in the direction of an arrow G by the urging force of the urging spring 95 so that the developing unit 41 receives a moment H about the cylindrical portion 46*b* and the projected portion 48*b*. By this, the developing roller 42 can be contacted to the photosensitive drum with a predetermined pressure. The position of the developing unit 41 at this time is "contact position".

As shown in FIG. 10, the urging spring 95 of this embodiment is provided on the end which is opposite the one longitudinal end provided with the coupling member 30*a* for the photosensitive drum 30 and with the coupling member 67 for the developing roller gear 69. Because of such a structure, the force g (FIG. 6) received by the first force receiving member 75 of a force receiving device 90 (which will be described hereinafter) which is provided on the one longitudinal end, from the first force application member 61, produces a moment about the cylindrical portion 46*b* in the developing unit 41. In other words, at the one longitudinal end, the moment h thus produced is effective to urge the developing roller 42 to the photosensitive drum 30 with a predetermined pressure. At the other end, the urging spring 95 functions to urge the developing roller 42 to the photosensitive drum 30 with a predetermined pressure.

[Force Receiving Device]

Figure 15:
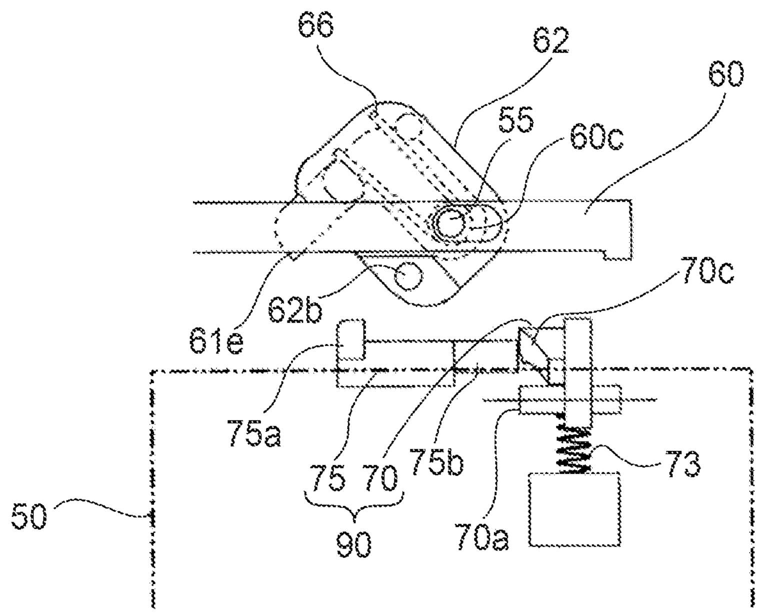
FIG. 15 is a perspective view showing a force receiving device of the process cartridge according to the first embodiment of the present invention.
Figure 19:
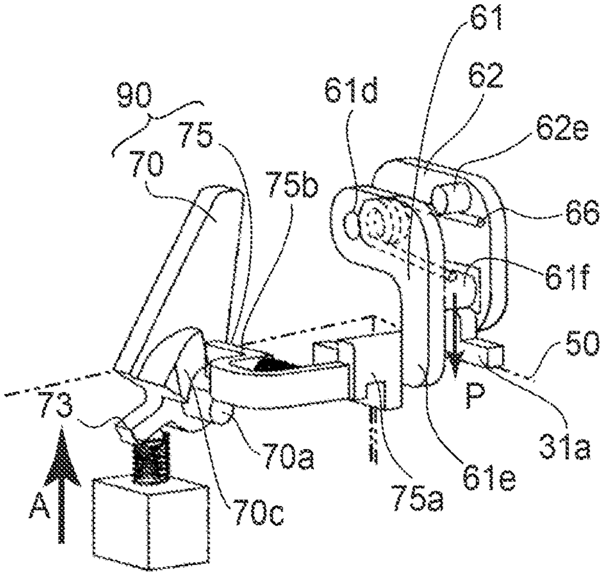
FIG. 19 is a perspective view showing a force receiving device of the process cartridge according to the first embodiment of the present invention.

As shown in FIG. 2, the cartridge 50*y* is provided with a force receiving device 90 for effecting contact and spacing between the developing roller 42 and the photosensitive drum 30 in the main assembly 100 of the apparatus. As shown in FIGS. 9, 15 and FIG. 19, the force receiving device 90 includes a first force receiving member 75, a second force receiving member 70 and a spring 73 (urging means).

As shown in FIG. 9, the first force receiving portion 75 is mounted to the bearing unit 45 by engaging an engaging portion 75*d* of the first force receiving member with a guide portion 45*b* of the bearing unit 45. On the other hand, the second force receiving member 70 is mounted to the bearing unit 45 by engaging a shaft 70*a* of the second force receiving member 70 with the guide portion 45*a* of the bearing unit 45. The bearing unit 45 thus having the first force receiving member 75 and the second force receiving member 70 is fixed to the development accommodating portion 48, and then as shown in FIG. 10, the covering member 46 is fixed so as to cover the bearing unit 45 from an outside in the axial direction of the developing roller 42 of the bearing unit 45. The first force receiving member 75 and the second force receiving member 70 are disposed above the cartridge 50*y* in the state that cartridge 50*y* is mounted to the main assembly 100 of the apparatus.

The operations of the force receiving device 90 will be described in detail hereinafter.

[Drawer Member of Main Assembly of Electrophotographic Image Forming Apparatus]

A description will be provided as to a cartridge tray 13, which is a drawer member.

As shown in FIG. 4, the cartridge tray 13 is movable (inserting and drawing) along a rectilinear line which is substantially horizontal (D1, D2 directions) relative to the main assembly 100 of the apparatus. More particularly, the cartridge tray 13 is movable between a mounted position in the main assembly 100 of the apparatus shown in FIG. 1 and a drawn-out position outside the main assembly 100 of the apparatus shown in FIG. 4. In the state that cartridge tray 13 is at the drawn-out position, the cartridges 50*y*, 50*m*, 50*c*, 50*k* are mounted on the cartridge tray 13 by the operator substantially vertically (arrow C) as shown in FIG. 4. The cartridges 50*y*, 50*m*, 50*c*, 50*k* are arranged in parallel with each other such that longitudinal directions (axial directions of the photosensitive drum 30 and the developing roller 42) thereof are substantially perpendicular to the moving direction of the cartridge tray 13. The cartridges 50*y*, 50*m*, 50*c*, 50*k* enter into the main assembly 100 of the apparatus while being carried on the cartridge tray 13. At this time, the cartridges 50*y*, 50*m*, 50*c*, 50*k* are moved keeping a distance (gap f2) (FIG. 5) between the intermediary transfer belt 19 provided below them and the photosensitive drum 30. When the cartridge tray 13 is positioned at the mounted position, the cartridges 50*y*, 50*m*, 50*c*, 50*k* are positioned in place by the positioning portion 101*a* provided in the main assembly of the image forming apparatus 100. The positioning operation will be described in detail hereinafter. Therefore, the user can mount with certainty the cartridges 50*y*, 50*m*, 50*c*, 50*k* into the main assembly 100 of the apparatus by entering the cartridge tray 13 and closing the door 12. Therefore, the operationality is improved over the structure with which the cartridges 50*y*, 50*m*, 50*c*, 50*k* are mounted individually into the main assembly 100 of the apparatus by the user.

Referring to FIGS. 23 to 25 and 36 to 38, the operation of the cartridge tray 13 will be described.

Here, the cartridges are omitted for simplicity of explanation of the operation of the cartridge tray 13.

The cartridge tray 13 is supported drawably relative to a tray holding member 14. The tray holding member 14 is movable in interrelation with movement of the door 12 (opening and closing member). The door 12 is provided on the main assembly 100 of the apparatus and is rotatable about a rotational center 12*a*.

Figure 24:
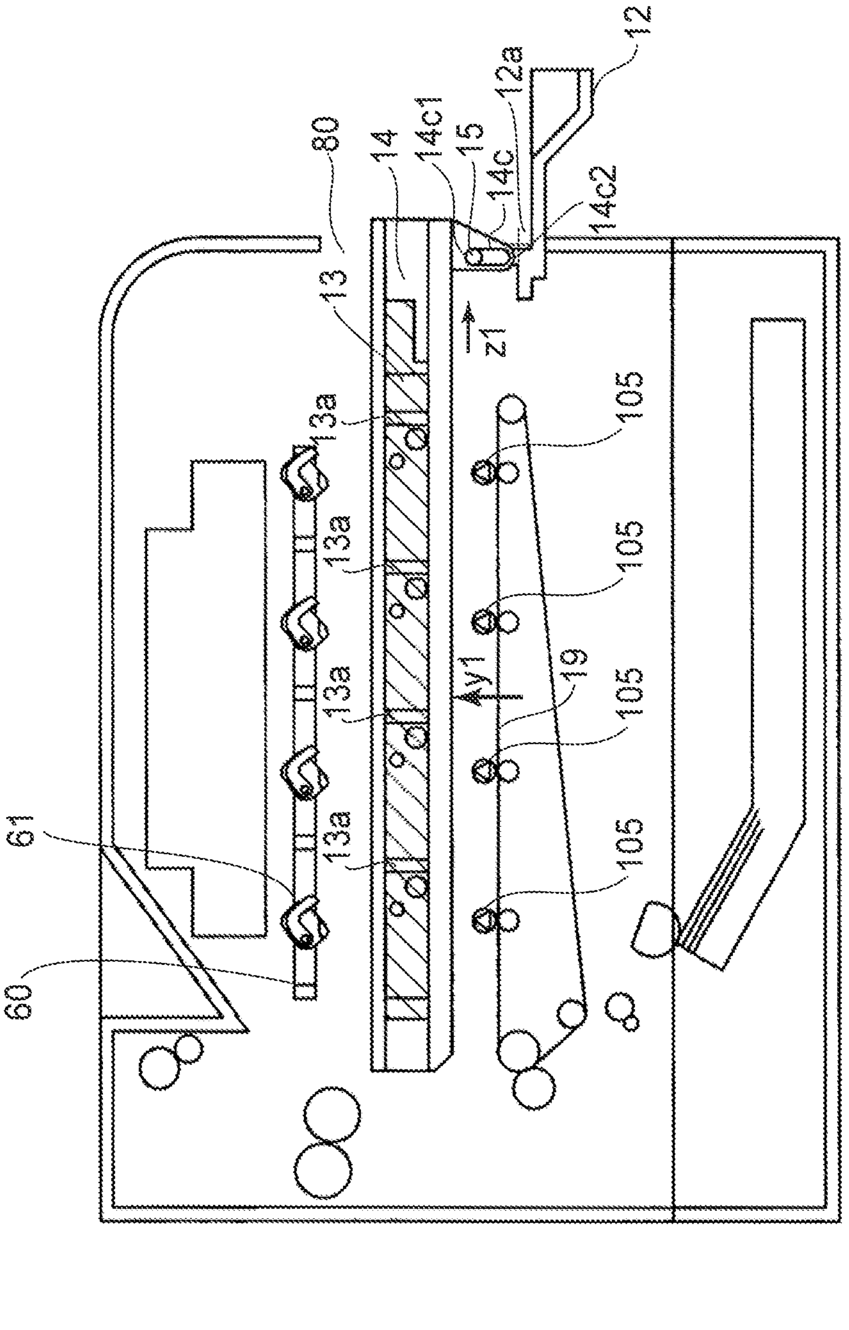
FIG. 24 shows a general arrangement of the electrophotographic image forming apparatus according to the first embodiment of the present invention.
Figure 25:
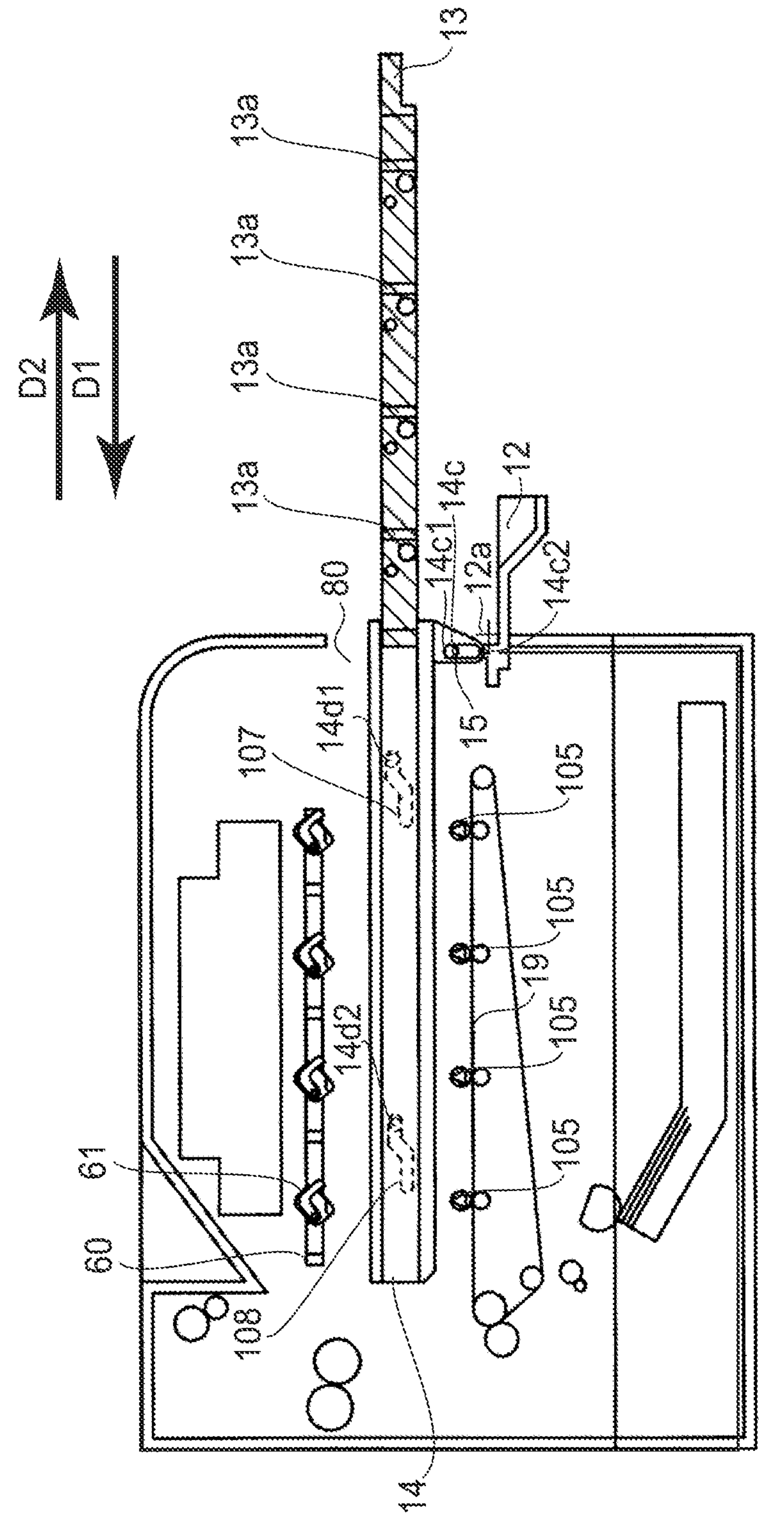
FIG. 25 shows a general arrangement of the electrophotographic image forming apparatus according to the first embodiment of the present invention.
Figure 26:
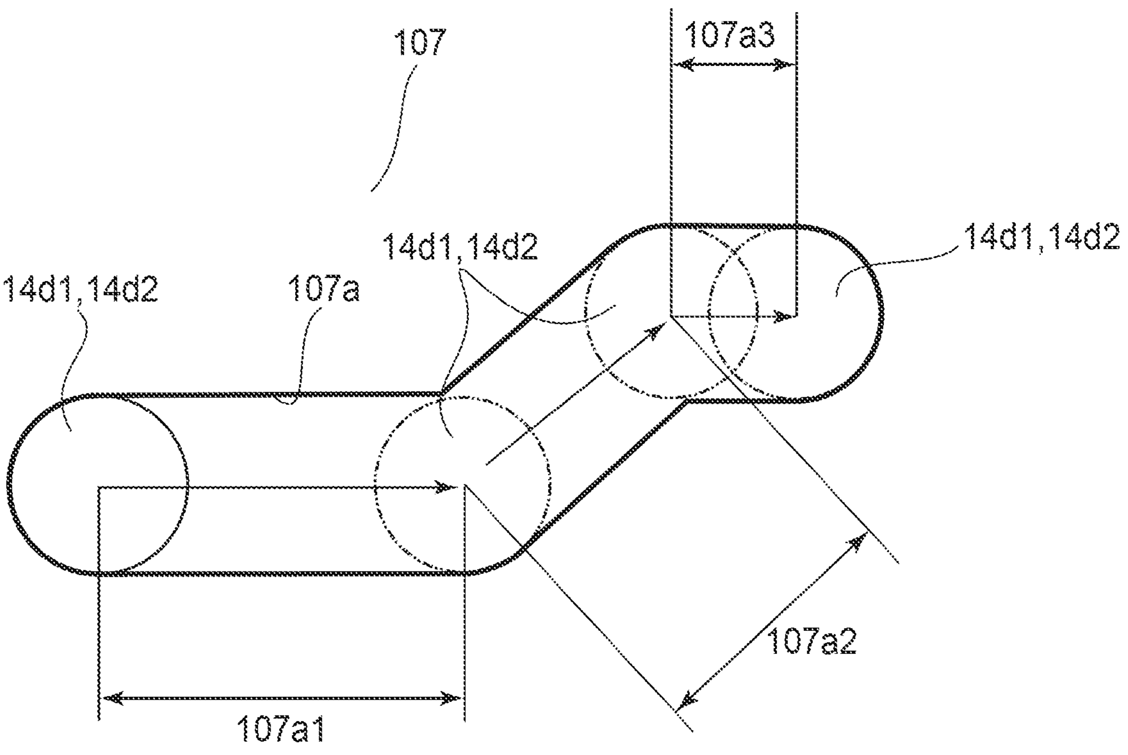
FIG. 26 shows a general arrangement of the electrophotographic image forming apparatus according to the first embodiment of the present invention.
Figure 30:
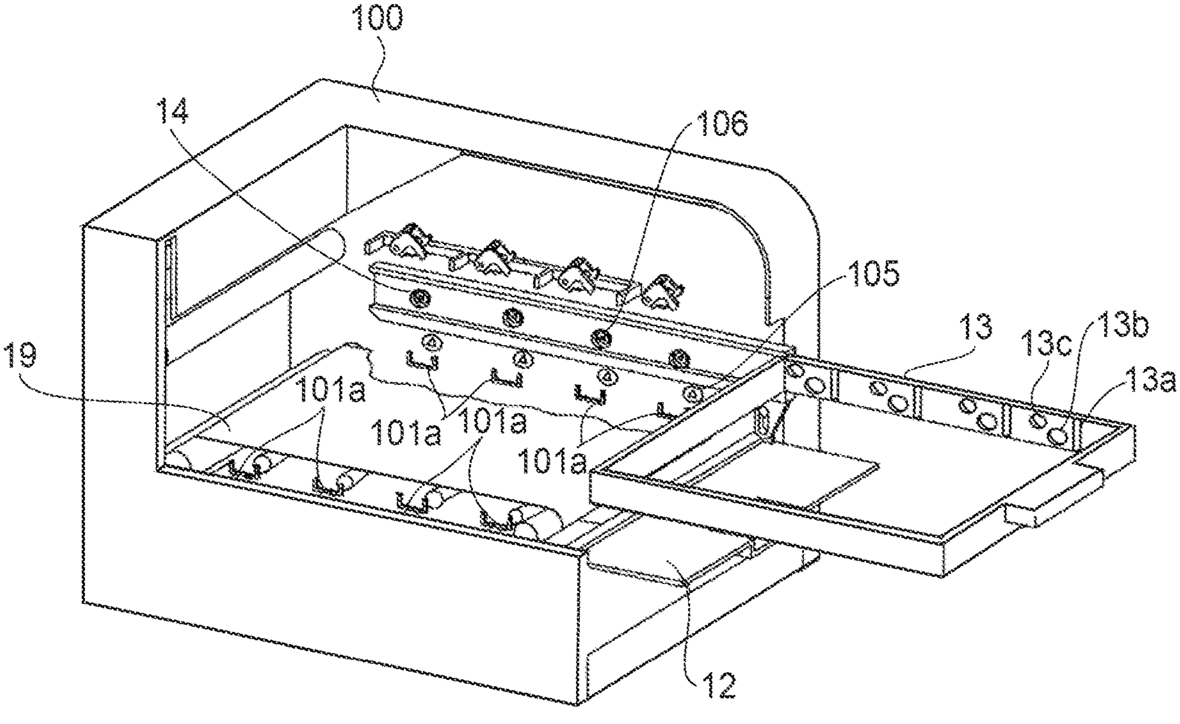
FIG. 30 is a perspective view of the electrophotographic image forming apparatus according to the first embodiment of the present invention.

When the cartridge is taken out of the main assembly 100 of the apparatus, the door 12 is moved from the closed position to the open position. With the movement of the door 12, an engaging portion 15 provided on the door 12 moves clockwise about the rotational center 12*a*. Then, as shown in FIG. 24, the engaging portion 15 moves from the lower end 14*c*2 toward the upper end 14*c*1 in the elongated hole 14*c* provided in the tray holding member 14. Together with this operation, the engaging portion 15 moves the holding member 14 in the direction z1. At this time, as shown in FIG. 25, the projections 14*d*1, 14*d*2 projected from the tray holding member 14 are guided by a guide slot or groove 107 provided in the main assembly 100 of the apparatus. As shown in FIG. 26, the guide groove includes a horizontal portion 107*a*1, an inclined portion 107*a*2 extending from the horizontal portion 107*a*1 and inclining upwardly and a horizontal portion 107*a*3 extending from the inclined portion 107*a*2. Therefore, as shown in FIG. 24, when the door 12 is moved to the open position, the projections 14*d*1, 14*d*2 are guided along horizontal portion 107*a*1, the inclined portion 107*a*2 and the horizontal portion 107*a*3 in this order. Thus, the tray holding member 14 moves in the direction of arrow z1 and in the direction of an arrow y1 away from the transfer belt 19. In this state, as shown in FIG. 25, the cartridge tray 13 can be drawn toward outside of the main assembly 100 of the apparatus in the direction of an arrow D2 through the opening 80. FIG. 30 is a partly broken perspective view of this state.

Figure 23:
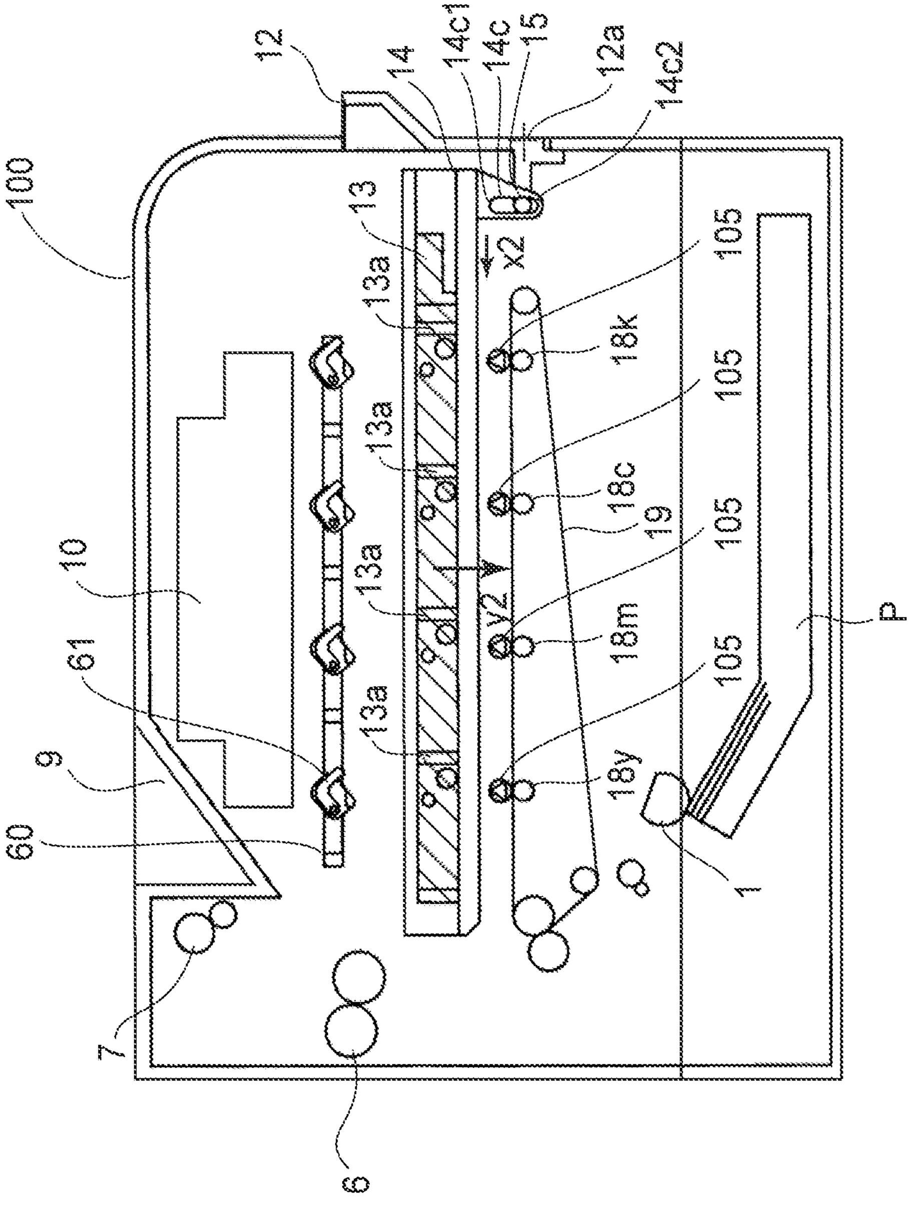
FIG. 23 shows the general arrangement of the electrophotographic image forming apparatus according to the first embodiment of the present invention.

A description will be provided as to the case of mounting the cartridge into the main assembly 100 of the apparatus. In the state that door 12 is at the open position as shown in FIG. 25, the cartridge tray 13 enters the main assembly 100 of the apparatus in the direction of the arrow D1 through the opening 80. Thereafter, as shown in FIG. 23, the door 12 is moved to the closing position. With the movement of the door 12, the engaging portion 15 provided on the door 12 moves counterclockwise about the rotational center 12*a*. Then, as shown in FIG. 23, the engaging portion 15 moves along the elongated hole 14*c* provided in the tray holding member 14 toward the lower end 14*c*2 of the elongated hole 14*c*. Together with this operation, the engaging portion 15 moves the holding member 14 in the direction z2. Therefore, as shown in FIG. 23, when the door 12 is moved to the closing position, the projections 14_d_1, 14_d_2 are guided by the horizontal portion 107_a_3, the inclined portion 107_a_2 and the horizontal portion 107_a_1 in this order. Thus, the tray holding member 14 moves in the direction z2, and moves in the direction of an arrow y2 toward the transfer belt 19.

[Positioning of Process Cartridge Relative to Main Assembly of Electrophotographic Image Forming Apparatus]

Referring to FIGS. 5, 15 and FIGS. 19, 27, 29, 30, a description will be provided as to the positioning of the cartridges 50_y_, 50_m_, 50_c_, 50_k_ relative to the main assembly 100 of the apparatus.

Figure 27:
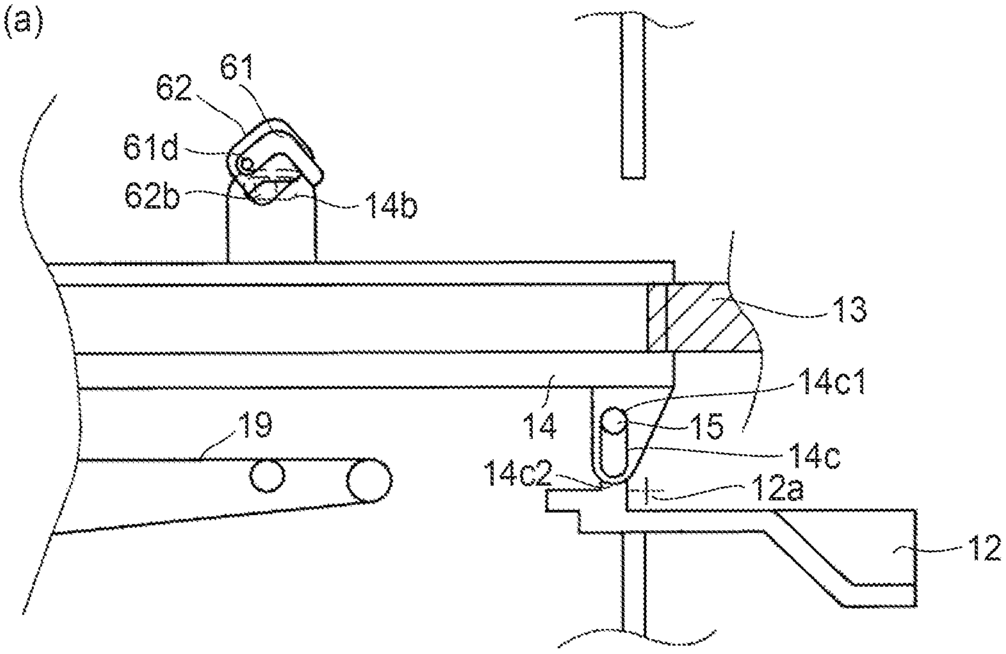
FIG. 27, parts (a) and (b) illustrates an operation of a first force application member according to the first embodiment of the present invention.
Figure 27:
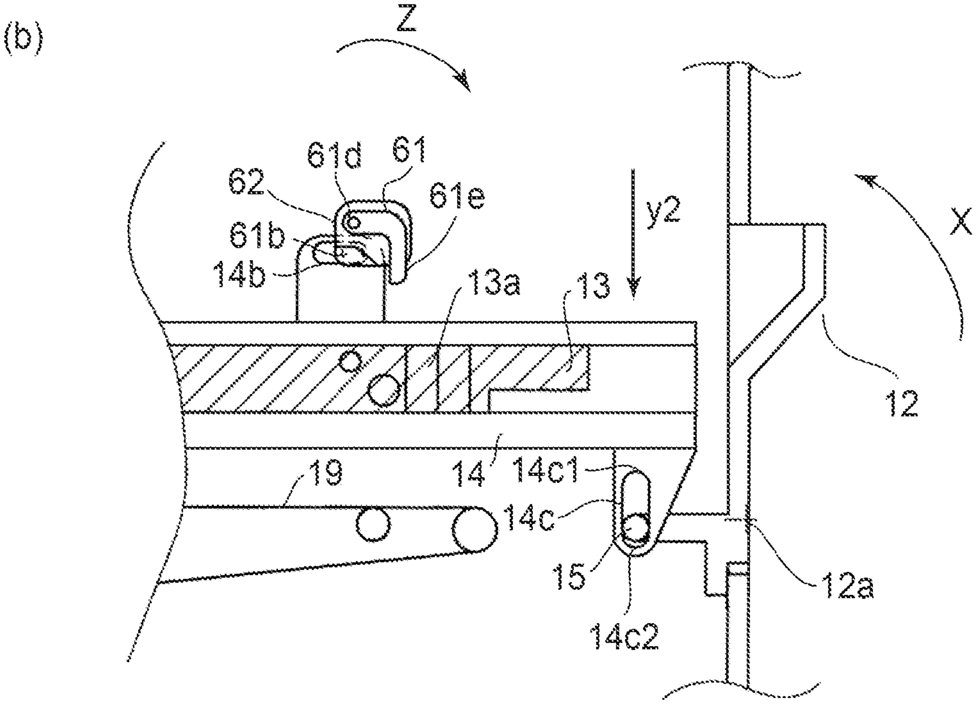

As shown in FIG. 30, there are provided positioning portions 101_a_ for positioning the cartridges 50_y_, 50_m_, 50_c_, 50_k_ in the main assembly 100 of the apparatus. The positioning portions 101_a_ are provided for the respective cartridges 50_y_, 50_m_, 50_c_, 50_k_ interposing the transfer belt 19 with respect to the longitudinal direction. As shown in FIG. 27, parts (a) and (b), a first force application member 61 is rotatably supported by the supporting shaft 55 of the main assembly 100 of the apparatus engaged with the supporting hole 61_d_ at a position above the tray holding member 14.

Figure 6:
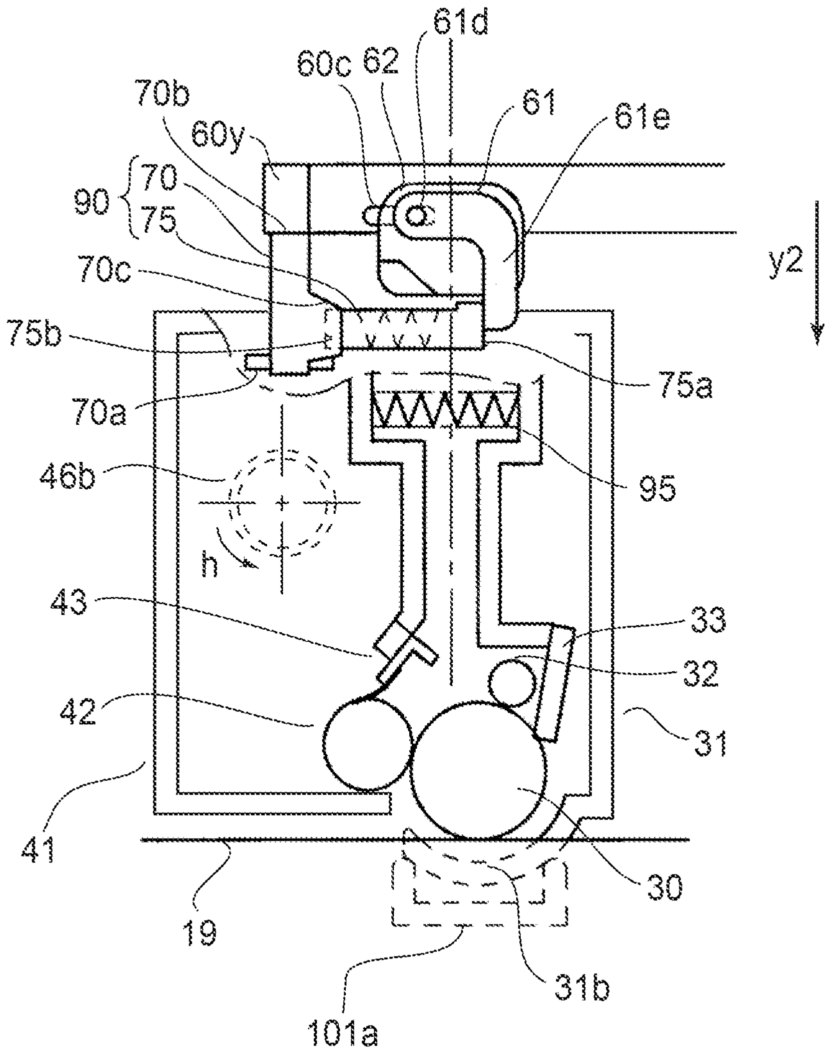
FIG. 6 is a sectional view of the process cartridge as seen in the direction of an axial direction of the photosensitive drum according to the first embodiment of the present invention.
Figure 20:
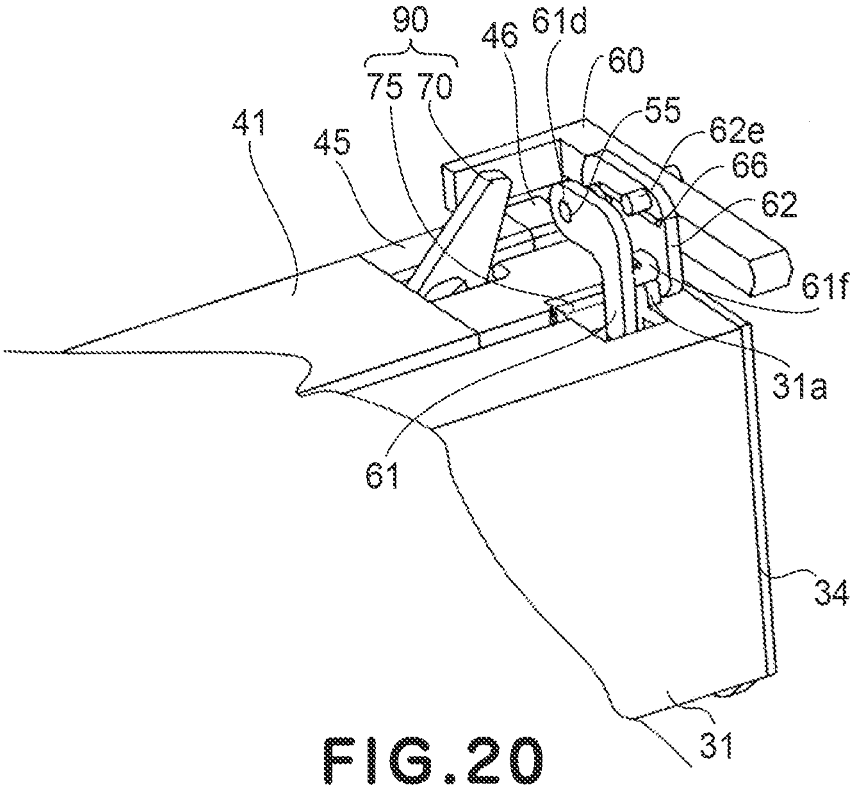
FIG. 20 is a perspective view showing a force receiving device of the process cartridge according to the first embodiment of the present invention.

As shown in FIG. 27, parts (a) and (b), the first force application member 61 moves with the movement of the door 12 from the open position to the closing position. As shown in FIG. 20, the projected portion 61_f_ provided on the first force application member 61 urges the projection 31_a_ provided on the upper surface portion of the drum frame 34. By this, the cartridge 50_y_ is urged in the direction of an arrow P (FIG. 19), so that the portion to be positioned 31_b_ (FIG. 7) provided on the drum unit 31_y_ is abutted to the positioning portion 101_a_ provided in the main assembly 100 of the apparatus by which the cartridge 50_y_ is positioned in place (FIG. 6). The same operation is carried out adjacent the opposite longitudinal ends. Also, the same operation is carried out for the other cartridges 50_m_, 50_c_, 50_k_.

The mechanism for movement of the first force application member 61 in interrelation with the movement of the door 12 will be described. The first force application member 61 is engaged with a connecting member 62 for interrelation with the movement of the door 12. As shown in FIG. 15 to FIG. 19, the connecting member 62 includes a supporting hole 62_c_ engaged with the supporting shaft 55, a hole 62_a_ engaged with the projected portion 61_f_, and a supporting pin 62_b_ engaged with the elongated hole 14_b_ (FIG. 27, part (b)) provided in the tray holding member 14. As shown in FIG. 27, parts (a) and (b), by the movement of the door 12 from the open position to the closed position, the tray holding member 14 moves in the direction of the arrow y2 (FIG. 27, parts (a) and (b)). By this, the supporting pin 62_b_ engaged with the elongated hole 14_b_ also receives the force in the direction of the arrow y2. Therefore, the connecting member 62 rotates in the direction of an arrow Z (Figure, parts 27(_a_) and (_b_)) about the supporting hole 62_c_. As shown in FIG. 19, between the first force application member 61 and the connecting member 62, there is provided a spring 66. The spring 66 is supported by the supporting shaft 55, and is contacted to the projection 62_e_ provided on the connecting member 62 and to the projected portion 61_f_ provided on the first force application member 61. By the urging force of the spring 66, the projected portion 61_f_ urges the projection 31_a_ provided on the drum frame 34 in the direction of an arrow P so as to position the cartridges 50_y_, 50_m_, 50_c_, 50_k_ to the positioning portions 101_a_ of the main assembly 100 of the apparatus.

Figure 21:
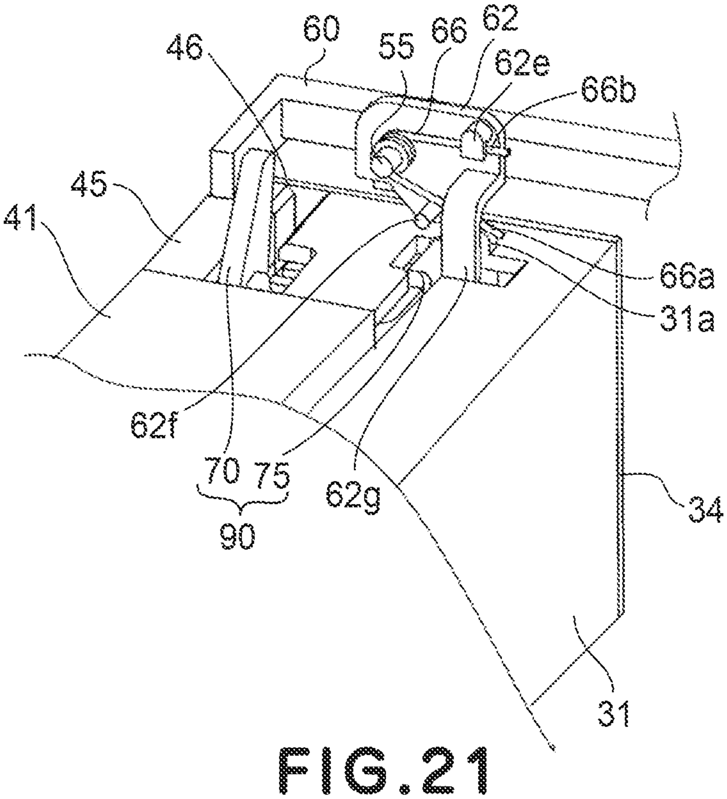
FIG. 21 is a perspective view showing a force receiving device of the process cartridge according to the first embodiment of the present invention.

As shown in FIG. 21, the projection 31_a_ may be urged directly by the spring 66. Thus, the structure for the connecting member 62 to interrelate with the movement of the door 12 is same as with FIG. 15 to FIG. 20. When the door 12 is at the open position, one end 66_b_ of the spring 66 is engaged with the hook 62_e_ provided on the connecting member 62, and the other end 66_b_ of the spring 66 is engaged with the projection 62_f_ provided on the connecting member 62. By the door 12 moving from the open position to the closed position, the other end 66_b_ moves away from the projection 62_f_ and directly urges the projection 31_a_ to position the cartridges 50_y_, 50_m_, 50_c_, 50_k_ to the positioning portion 101_a_ of the main assembly 100 of the apparatus.

[Spacing Mechanism of Main Assembly of Electrophotographic Image Forming Apparatus]

Referring to FIG. 5 to FIG. 8 and FIG. 11 to FIG. 19, a description will be provided as to the mechanism for operating the force receiving device 90 provided on the cartridge 50_y_. FIG. 5-FIG. 8 are sectional views of the cartridge as seen in the axial direction of the photosensitive drum 30, and FIG. 11-FIG. 14 are perspective views as seen from the non-driving side of the cartridge 50_y_. The state shown in FIG. 5 corresponds to the state shown in FIG. 11 and to the state shown in FIG. 15. The state shown in FIG. 6 corresponds to the state shown in FIG. 12 and to the state shown in FIG. 16. The state shown in FIG. 7 corresponds to the state shown in FIG. 13, and the state of FIG. 8 corresponds to the state of FIG. 14.

Figure 5:
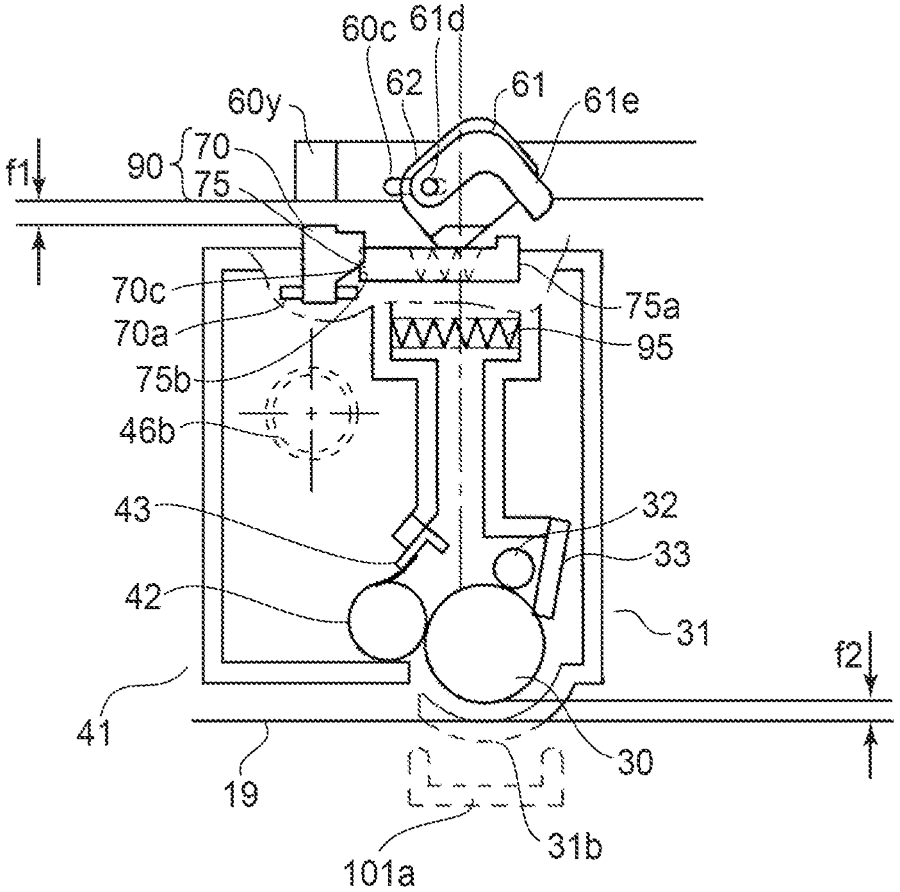
FIG. 5 is a sectional view of the process cartridge as seen in the direction of an axial direction of the photosensitive drum according to the first embodiment of the present invention.
Figure 11:
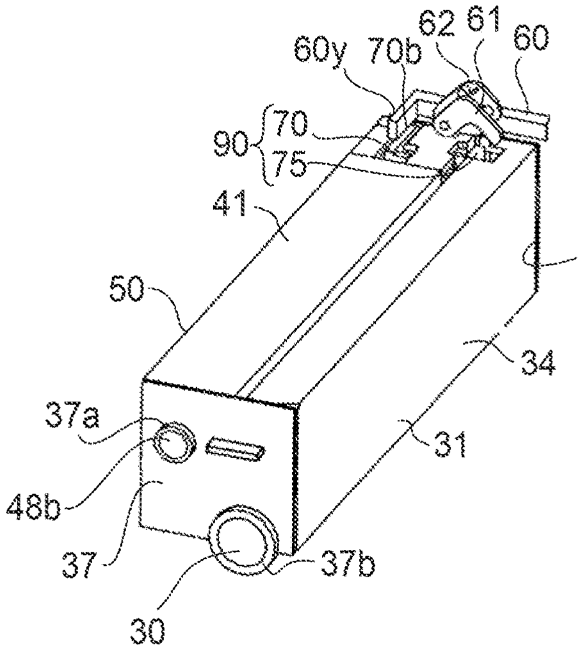
FIG. 11 is a perspective view of the process cartridge as seen from a non-driving side according to the first embodiment the present invention.
Figure 12:
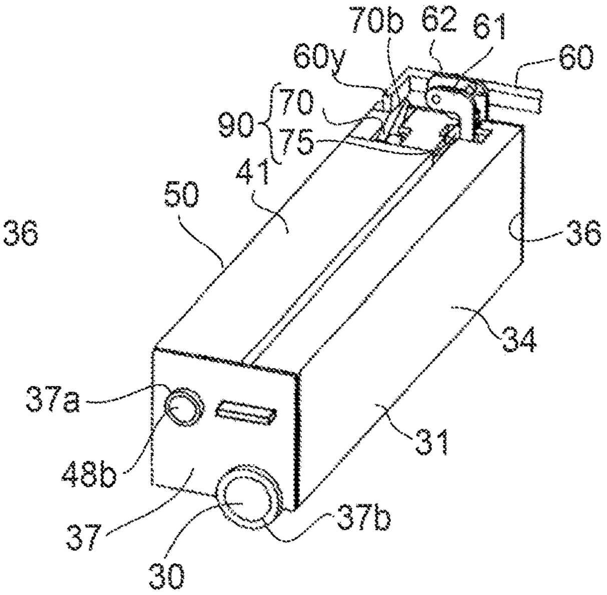
FIG. 12 is a perspective view of the process cartridge as seen from a non-driving side according to the first embodiment the present invention.
Figure 16:
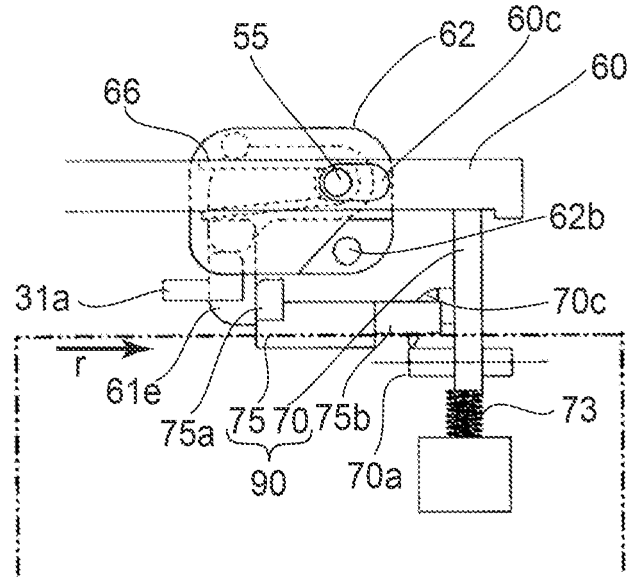
FIG. 16 is a perspective view showing a force receiving device of the process cartridge according to the first embodiment of the present invention.
Figure 17:
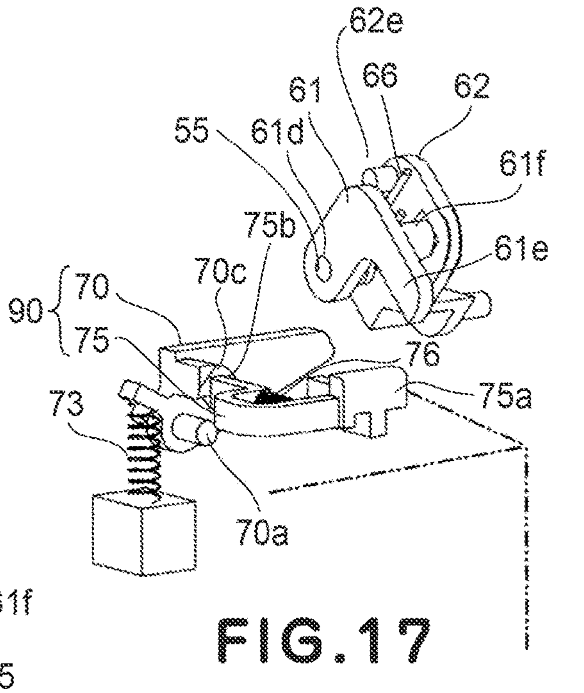
FIG. 17 is a perspective view showing a force receiving device of the process cartridge according to the first embodiment of the present invention.
Figure 18:
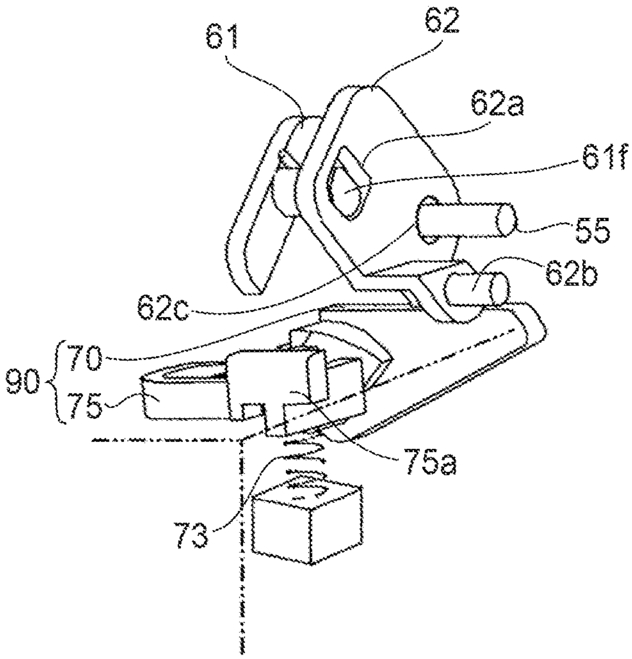
FIG. 18 is a perspective view showing a force receiving device of the process cartridge according to the first embodiment of the present invention.

As described hereinbefore, with the closing operation of the door 12 from the open position, the first force application member 61 moves about the supporting shaft 55 from the state of FIGS. 5, 11 and 15 to the state of FIGS. 6, 12, 16. At this time, the first force application member 61 not only positions the cartridge 50_y_ relative to the main assembly 100 of the apparatus but also acts on the first force receiving member 75 of the cartridge 50_y_. More particularly, an urging portion 61_e_ of the first force application member 61 abuts the first urged portion of the first force receiving member 75. Thereafter, the first force receiving member 75 biases the cam surface 70_c_ (third urged portion) provided in the second force receiving member 70 by which the second force receiving member 70 is rotated about the shaft 70_a_. Then, the second force receiving member 70 is moved from the stand-by position as shown in FIGS. 5, 11, 15 to an outside of the developing unit 41 of the cartridge 50_y_, that is, away from the rotation axis 46_b_ of the developing unit 41. With the structure shown in FIG. 21, the projected portion 62_g_ projected from the connecting member 62 functions as the first force application member 61.

Figure 28:
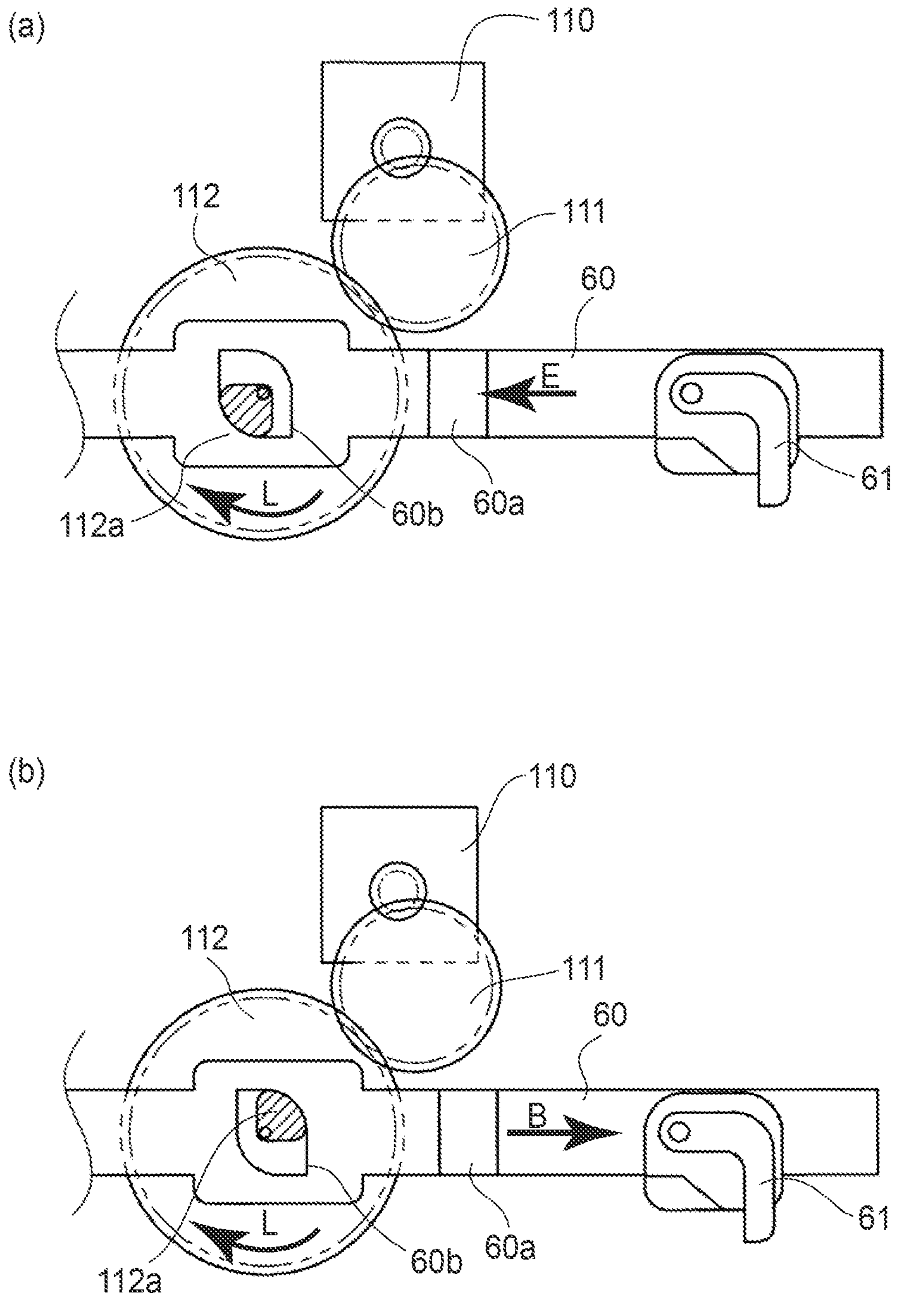
FIG. 28, parts (a) and (b), illustrates a second force application member operation according to the first embodiment of the present invention.
Figure 29:
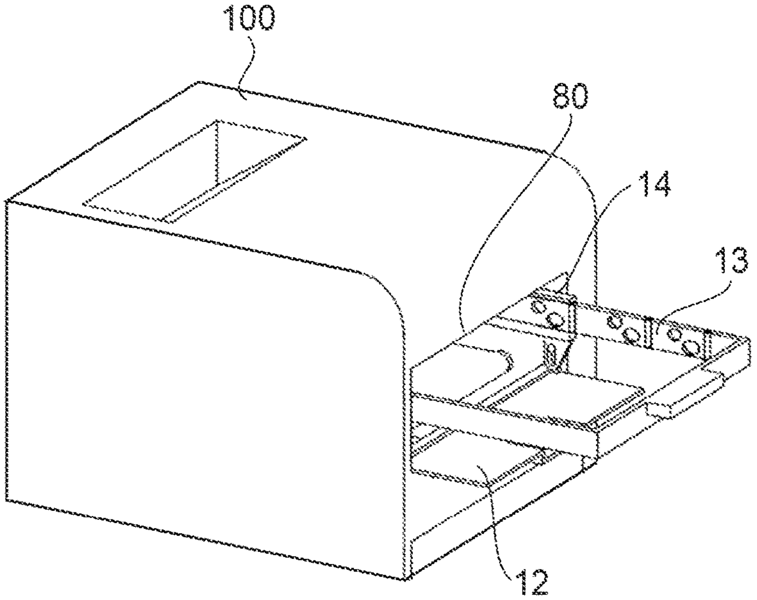
FIG. 29 is a perspective view of the electrophotographic image forming apparatus according to the first embodiment of the present invention.

Referring to FIG. 28, parts (a) and (b), a description will be provided as to the operation of the second force applying portion 60.

A driving force from a motor 110 (driving source) provided in the main assembly 100 of the apparatus is transmitted to the gear 112 by way of the gear 111. The gear 112 receiving the driving force rotates in the direction of an arrow L to rotate a cam portion 112_a_ provided integrally with the gear 112 in the direction of the arrow L. The cam portion 112_a_ is engaged with a shifting force receiving portion 60_b_ provided on the second force application member 60. Therefore, with rotation of the cam portion 112_a_, the second force application member 60 moves in the direction of an arrow E or B.

Figure 7:
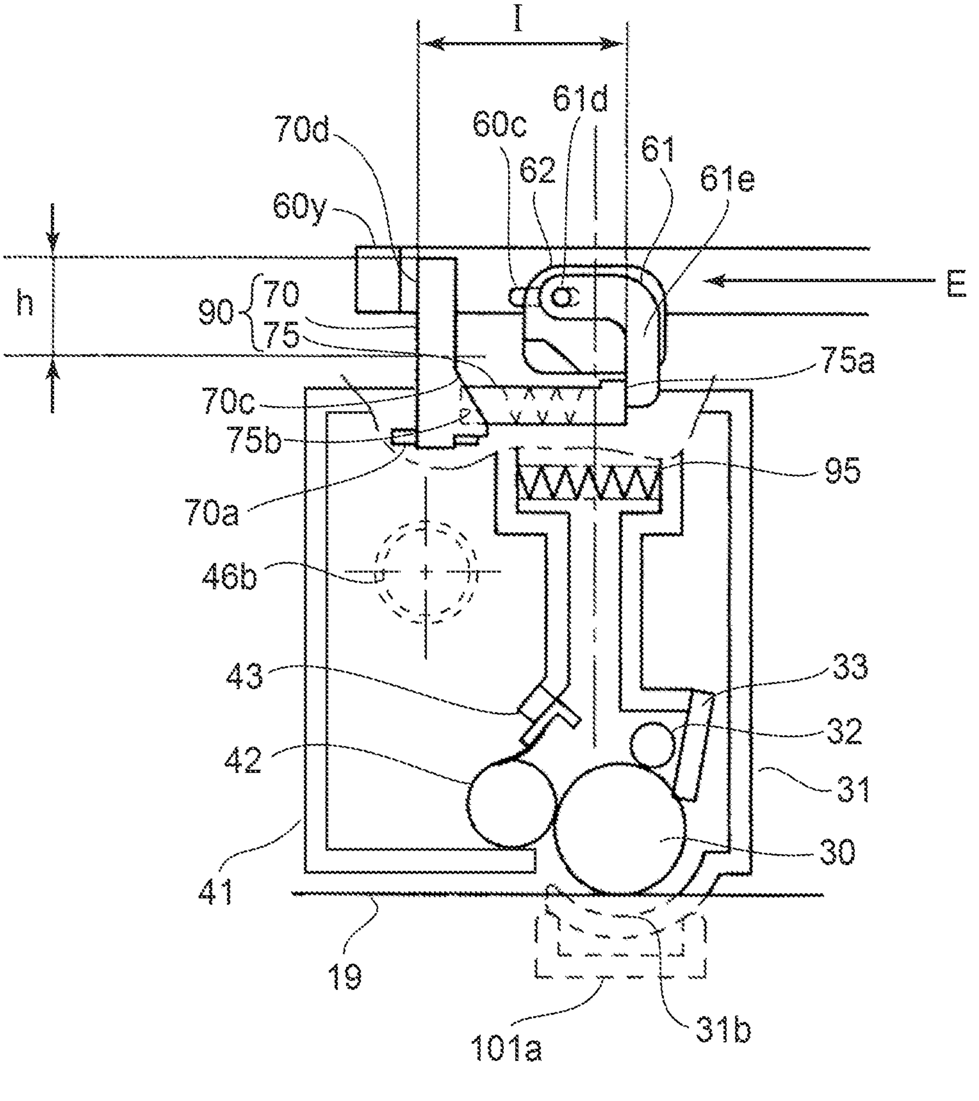
FIG. 7 is a sectional view of the process cartridge as seen in the direction of an axial direction of the photosensitive drum according to the first embodiment of the present invention.

FIG. 28, part (a), illustrates the case in which the second force application member 60 moves in the direction of the arrow E and in which the developing roller 42 and the photosensitive drum 30 are still in contact with each other (FIG. 7). FIG. 28, part (b), illustrates the case in which the second force application member 60 moves in the direction of the arrow B and in which the second force receiving member 70 receives a force from the engaging rib 60*y*. By doing so, the developing unit 41 is rotated (moved) about the rotation axis 46*b*, so that developing roller 42 and the photosensitive drum 30 become spaced from each other. The position of the developing unit 41 at this time is a spaced position.

As shown in FIG. 15, the second force application member 60 is provided with an elongated hole portion 60*c* for permitting movement of a supporting shaft 55 on which the first force application member 61 is provided rotatably. Therefore, even when the second force application member 60 moves in the direction of the arrow B (FIG. 8) or in the direction of the arrow E (FIG. 7), the second force application member 60 can move without being disturbed by the first force application member 61. Similarly to the first force application member 61, the second force application member 60 is provided facing the movement path of the cartridges so as to be above the cartridges 50*y*, 50*m*, 50*c*, 50*k* entering the main assembly 100 of the apparatus on the cartridge tray 13. In the step of advancement of the cartridges 50*y*, 50*m*, 50*c*, 50*k* into the main assembly 100 of the apparatus, the second force receiving member 70 is kept at the stand-by position (FIG. 15). Therefore, the first force application member 61 and the second force application member 60 can be very close to the cartridges 50*y*, 50*m*, 50*c*, 50*k* as long as they do not interfere therewith, so that wasteful space can be removed. Therefore, the main assembly 100 of the apparatus can be downsized with respect to the vertical direction and the longitudinal direction of the cartridge 50*y* (axial direction of the photosensitive drum 30).

The operation will be described hereinafter in detail.

[Mounting of Process Cartridge to Main Assembly of Electrophotographic Image Forming Apparatus and Operation of Force Receiving Device]

A description will be provided as to the series of operations from the mounting of the cartridges 50*y*, 50*m*, 50*c*, 50*k* to the main assembly 100 of the apparatus to the spacing of the developing roller 42 from the photosensitive drum 30.

As shown in FIG. 4, the cartridges 50*y*, 50*m*, 50*c*, 50*k* are mounted from the top to the cartridge tray 13 drawn out to the drawn-out position in the direction of an arrow C.

By moving the cartridge tray 13 in the direction of the arrow D1, the cartridges 50*y*, 50*m*, 50*c*, 50*k* are passed through the opening 80 into the main assembly 100 of the apparatus. Thus, in this embodiment, the cartridges 50*y*, 50*m*, 50*c*, 50*k* are inserted into the main assembly 100 of the apparatus in the direction substantially perpendicular to the axial direction of the photosensitive drum 30.

Figure 31:
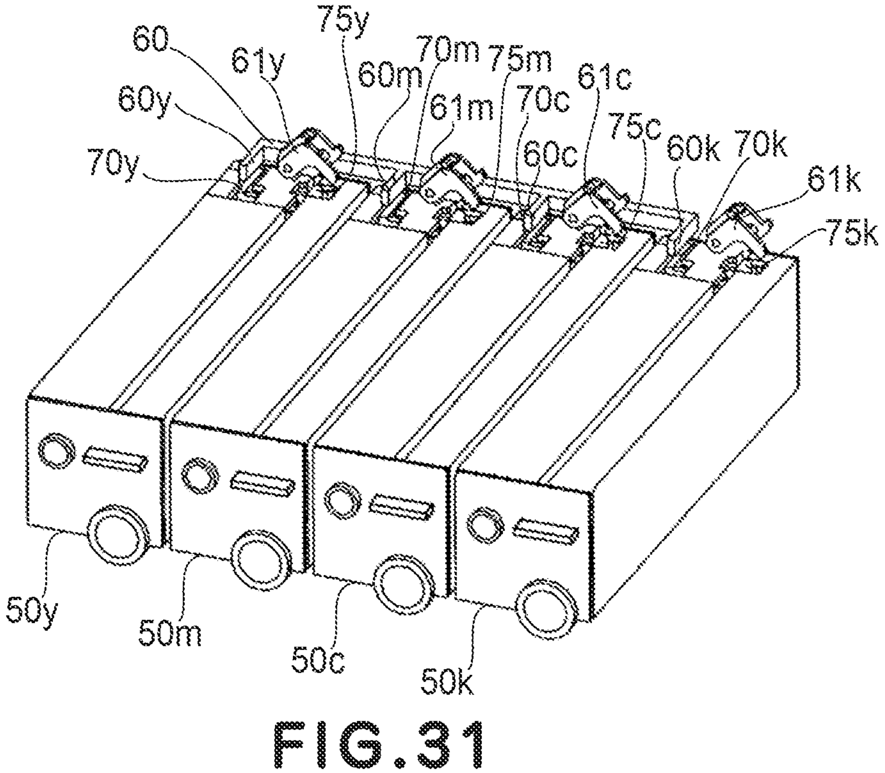
FIG. 31 illustrates exchange of the process cartridge according to the first embodiment of the present invention.
Figure 32:
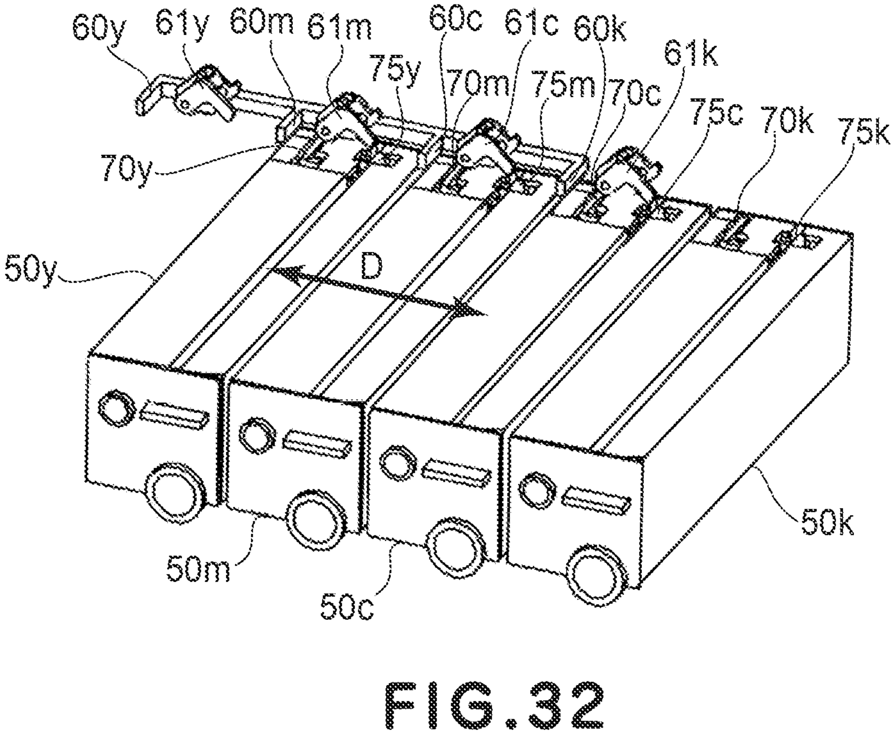
FIG. 32 illustrates exchange of the process cartridge according to the first embodiment of the present invention.

As shown in FIGS. 31, 32, the cartridge 50*y* is mounted at the most downstream position in the cartridge tray 13 with respect to the inserting or entering direction. The cartridge 50*y* advances from the upstream side toward the downstream side below the first force application members 61*k*, 61*c*, 61*m* and the engaging ribs 60*k*, 60*c*, 60*m* of the second force application member 60, which are actable on the cartridges 50*m*, 50*c*, 50*k*.

The cartridge 50*m* is mounted at the second position from the downstream side on the cartridge tray 13 with respect to the entering direction. The cartridge 50*m* advances from the upstream side toward the downstream side below the first force application members 61*k*, 61*c* and the engaging ribs 60*k*, 60*c* of the second force application member 60, which are actable on the cartridges 50*c*, 50*k*.

The cartridge 50*c* is mounted at the third position from the downstream side on the cartridge tray 13 with respect to the entering direction. The cartridge 50*c* passes from the upstream side toward the downstream side below the engaging ribs 60*k* of the first force application member 61*k* and the second force application member 60, which are actable on the cartridge 50*k*.

The most upstream cartridge 50*k* on the cartridge tray 13 with respect to the entering direction enters from the upstream side toward the downstream side such that second force receiving member 70 thereof passes below the first force application member 61 actable on the cartridge 50*k*.

The passing of the second force receiving member 70 below the first force application member 61*k* from the upstream side toward the downstream side is the same with respect to the cartridges 50*y*, 50*m*, 50*c*.

That is, when the process cartridge is inserted with the second force receiving member 70 projected, the first force application member 61 and the second force application member 60 have to be at an upper part so as to avoid interference of the second force receiving member 70 with the first force application member 61 and second force application member 60. However, if the second force receiving member 70 is at the stand-by position, the first force application member 61 and the second force application member 60 can be disposed close to the cartridges 50*y*, 50*m*, 50*c*, 50*k* without the necessity of taking into account the degree of projection of the second force receiving member 70. Therefore, the main assembly 100 of the apparatus can be downsized with respect to the vertical direction. In addition, as shown in FIGS. 31, 32, the positions of the force receiving device 90, the first force application member 61 and the second force application member 60 are such that the force receiving device 90 overlaps with the first force application member 61 and the second force application member 60 in the drum axial direction, and therefore, the cartridge can be downsized with respect to the longitudinal direction thereof.

When the cartridge tray 13 is inserted into the main assembly 100 of the apparatus, a gap f1 is maintained between the second force application member 60 and the force receiving device 90 as shown in FIG. 5. Also, a gap f2 is maintained between the photosensitive drum 30 and the transfer belt 19. Therefore, the cartridges 50*y*, 50*m*, 50*c*, 50*k* can enter without interference with the main assembly 100 of the apparatus.

Thereafter, as shown in FIG. 23, by moving the door 12 to the closed position, the tray holding member 14 moves in the direction of approaching the transfer belt 19 (arrow y2). A vertical component of the movement distance in the direction of an arrow y2 is f2. By doing so, as shown in FIG. 6, the cartridges 50*y*, 50*m*, 50*c*, 50*k* also move so that surface of the photosensitive drum 30 is brought into contact with the surface of the transfer belt 19. In this state, the gap f1 between the force receiving device 90 and the second force application member engaging portion 60 expands to f1+f2.

In addition, by moving the door 12 to the closed position, the first force application member 61 is moved so that the projection 31*a* provided on the upper surface portion of the drum frame 34 is urged by the projected portion 61*f*. By this, as shown in FIG. 6, the positioning portions 31*b* of the cartridges 50*y*, 50*m*, 50*c*, 50*k* are abutted to the respective positioning portions 101*a* provided in the main assembly 100 of the apparatus, so that the cartridges 50*y*, 50*m*, 50*c*, 50*k* are positioned to the main assembly 100 of the apparatus.

The cartridges 50y, 50m, 50c, 50k are prevented from moving in the direction of the arrow a (FIG. 1) in the main assembly 100 of the apparatus by engaging the shaft 36d provided on the covering member 36 shown in FIG. 10 with a rotation preventing portion 13a provided on the cartridge tray 13.

The urging portion 61e of the first force application member 61 contacts and urges the urged portion 75a (FIG. 15) of the first force receiving member 75 positioned at the first position (FIG. 15). Thereafter, the first force receiving member 75 is moved in the direction of an arrow r to be positioned at the second position (FIG. 16).

At the second position, the urging portion 75b urges the cam surface 70c of the second force receiving member 70 shown in FIG. 15. By doing so, the second force receiving member 70 rotates about the axis of the shaft 70a from the stand-by position to a position outside the developing unit 41 of the cartridges 50y, 50m, 50c, 50k, that is, in the direction away from the rotation axis 46b of the developing unit 41.

However, at this time, the upper surface 70 of the second force receiving member 70 interferes with the lower surface of the engaging rib 60y of the second force application member 60 which is placed at the home position, by which the movement of the second force receiving member 70 is regulated by the engaging rib 60y (FIGS. 6, 12). The position of the second force receiving member 70 at this time is called regulating position.

Figure 8:
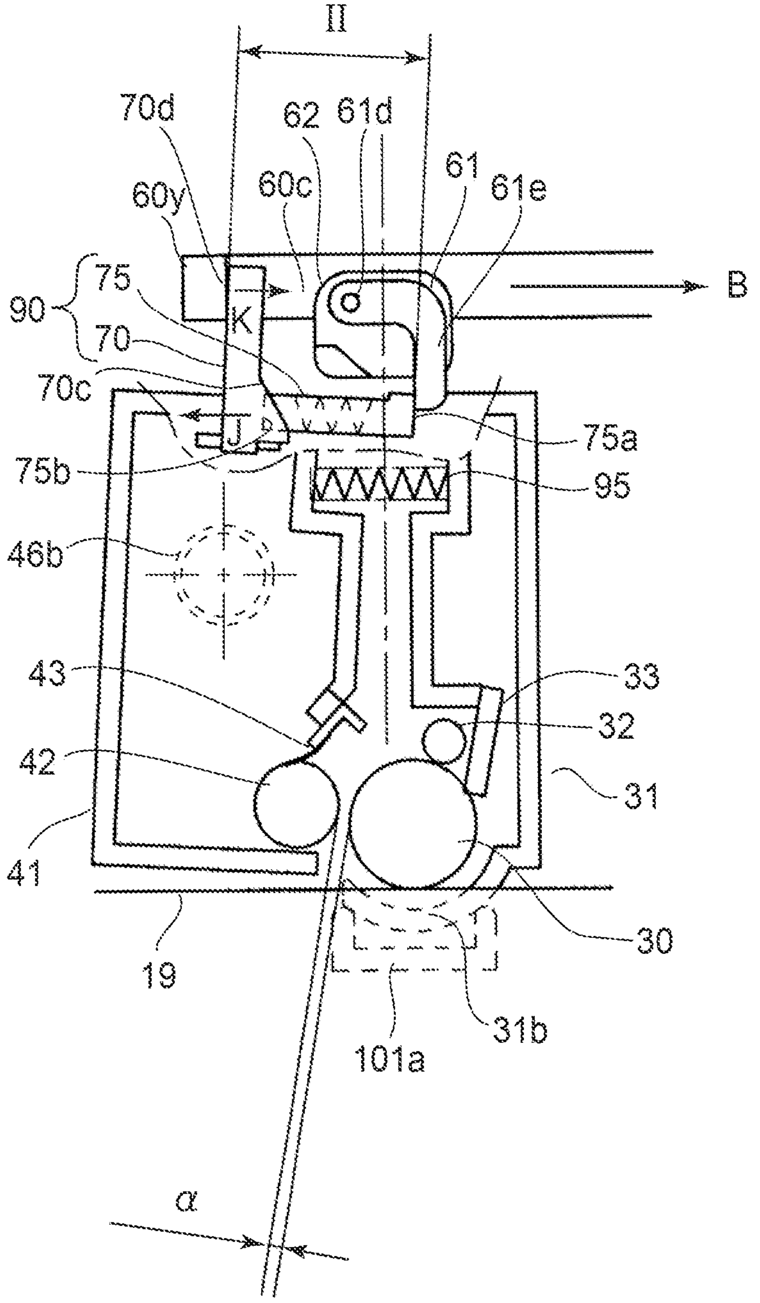
FIG. 8 is a sectional view of the process cartridge as seen in the direction of an axial direction of the photosensitive drum according to the first embodiment of the present invention.

Here, this position is made the home position for the following reason: After the cartridges 50y, 50m, 50c, 50k are mounted to the main assembly 100 of the apparatus, the state is as shown in FIG. 8 until the image forming operation is carried out. More particularly, the second force application member 60 has been moved in the direction of the arrow B, so that engaging rib 60y urges the second force receiving member 70. In this state, the photosensitive drum 30 and the developing roller 42 are spaced from each other. In the state of FIG. 8, cartridges 50y, 50m, 50c, 50k are dismounted from the main assembly 100 of the apparatus. Thereafter, when cartridges 50y, 50m, 50c, 50k are mounted to the main assembly 100 of the apparatus again, the second force application member 60 is at the position shown in FIG. 8, and therefore, when the second force receiving member 70 moves from the stand-by position, it is contacted to the rib 60y.

As shown in FIG. 8, the direction (arrow J) of the force received by the first force receiving member 75 from the first force application member 61 is substantially opposite the direction of the force received by the second force receiving member 70 from the second force application member 60. The surface of the second force receiving member 70 which receives the force from the second force application member 60 direction faces the direction of entrance of the cartridges 50y, 50m, 50c, 50k into the main assembly 100 of the apparatus. By selecting the direction of the receiving force, when the second force receiving member 70 receives the force from the second force application member 60, the developing unit 41 can be efficiently moved relative to the drum unit 31 with certainty. Furthermore, the state that photosensitive drum 30 and the developing roller 42 are spaced can be maintained stably.

Figure 22:
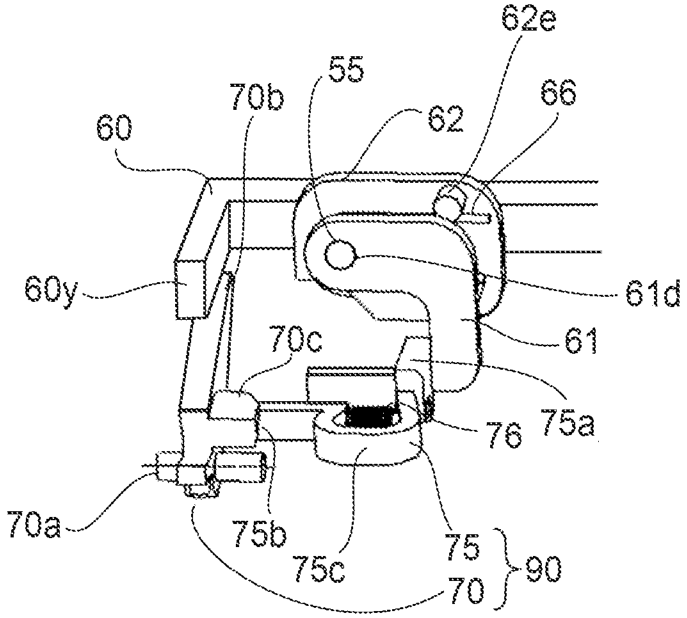
FIG. 22, parts (a) and (b), illustrates a process cartridge according to the first embodiment of the present invention wherein a first force receiving member and a second force receiving member are worked on by a first force receiving member and a second force receiving member of the electrophotographic image forming apparatus.
Figure 22:
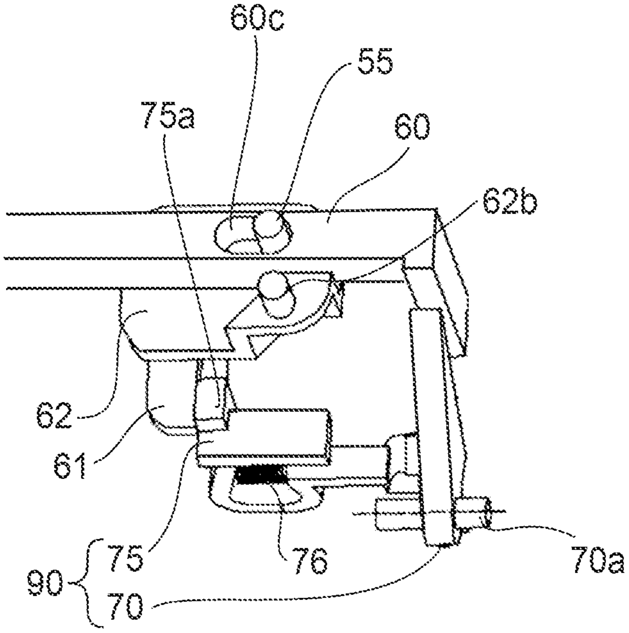

However, even when the movement of the second force receiving member 70 is limited by the engaging rib 60y, the force receiving device 90 including the second force application member 60 and the second force receiving member 70 is not damaged. As shown in FIG. 22, part (a), since the movement of the second force receiving member 70 is regulated, the movement of the urging portion 75b for urging the cam surface 70c is also regulated. Even if the urging portion 61e of the first force application member 61 further urges the urged portion 75a, an elastic portion 75c in the form of arch provided on the first force receiving member 75 flexes (elastic deformation). Therefore, even if the movement of the second force receiving member 70 is regulated, the force receiving device 90 is not damaged.

Figure 13:
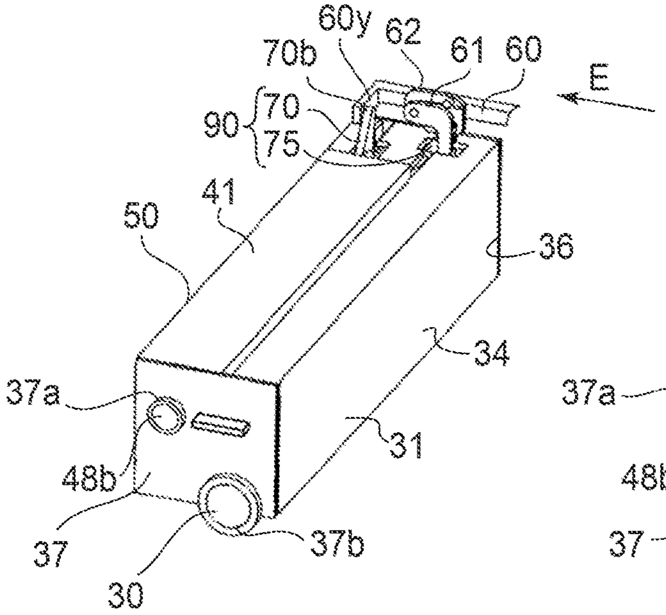
FIG. 13 is a perspective view of the process cartridge as seen from a non-driving side according to the first embodiment the present invention.

And, when the second force application member 60 is moved from the position of FIGS. 6, 12 in the direction of the arrow E as shown in FIGS. 7, 13, the second force receiving member 70 moves outwardly of the cartridge 50y to enter the movement path of the engaging rib 60y. The position of the second force application member 60 at this time is called the projected position. Thus, the second force application member 60 is projected beyond the above-described stand-by position when it is at the projected position. The degree of projection of the second force receiving member 70 at the projected position is larger than the gap f1+f2 in order to engage with the second force application member 60. The operation of the second force application member 60 is carried out prior to the image formation after cartridges 50y, 50m, 50c, 50k are mounted to the main assembly 100 of the apparatus.

Figure 14:
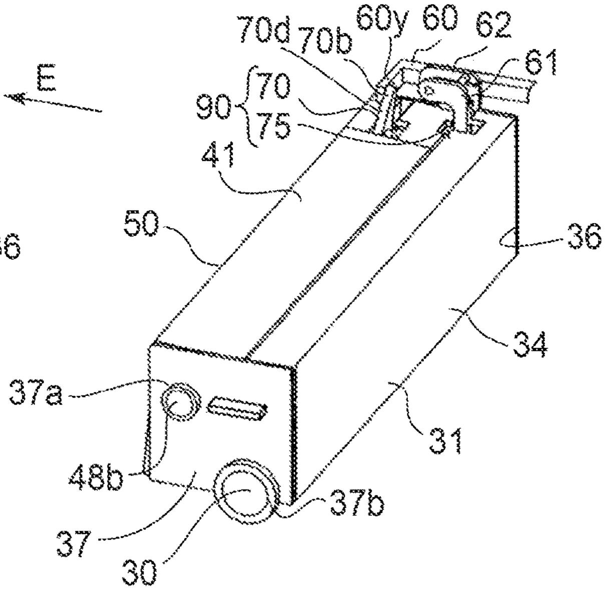
FIG. 14 is a perspective view of the process cartridge as seen from a non-driving side according to the first embodiment the present invention.

Then, as shown in FIGS. 8, 14, the second force application member 60 moves in the direction of the arrow B, so that the side surface 70b which is the second urged portion of the second force receiving member 70 entering the movement path, receives the force from the engaging rib 60y. By doing so, the developing unit 41 rotates (moves) about the rotation axis 46b, so that developing roller 42 is spaced from the photosensitive drum 30 by a gap $\alpha$. The second force receiving member 70 receives the force from the second force receiving member 70 in the projected position. Thus, as compared to a structure in which the second force receiving member moves toward the process cartridge and engages with the developing unit to effect the developing device spacing, the distance from the rotation axis 46b of the developing unit 41 can be made large. Therefore, the driving torque required for spacing the developing roller 42 from the photosensitive drum 30 can be made small.

In addition, by the movement of the second force application member 60 in the direction of the arrow B, the position where the first force receiving member 75 is pushed by the first force application member 61 and the position where the second force receiving member 70 receives the force from the engaging rib 60y change with respect to the horizontal direction. In other words, the relation between a distance I shown in FIG. 7 and a distance II shown in FIG. 8 is distance I>distance II. The change of the distance is accommodated by the elastic portion 75c provided on the second force receiving member 70. As shown in FIG. 22, part (a), the elastic portion 75c is in the form of a flexible arch configuration. Inside the elastic portion 75c, there is provided a spring 76 which is an elastic member. The spring 76 prevents the elastic portion 75c from flexing beyond necessity and functions to restore the flexed elastic portion 75c. The arch configuration of the elastic portion 75c is not inevitable, and the elastic member may be a simple elastic member.

In order to effect the image forming operation, the developing roller 42 is contacted to the photosensitive drum 30 by moving the second force application member 60 in the direction of the arrow E. By this, as shown in FIGS. 7, 13, the second force receiving member 70 is brought into a state of not receiving the force from the engaging rib 60y.

Therefore, by the urging force of the spring 95 provided between the developing unit 41 and the drum unit 31, the developing roller 42 and the photosensitive drum 30 are contacted to each other so that cartridges 50*y*, 50*m*, 50*c*, 50*k* become capable of forming the image. On this occasion, prior to the contact of the developing roller 42 to the photosensitive drum 30, the photosensitive drum 30 rotates, and the developing roller 42 also receives the driving force from the main assembly 100 of the apparatus and rotates. This is accomplished by providing the coupling portion 67*a* co-axially with the cylindrical portion 46*b* so that even if the developing unit 41 moves about the cylindrical portion 46*b*, the position of the coupling portion 67*a* does not change. Thus, the photosensitive drum 30 and the developing roller 42 are rotated before the developing roller 42 and the photosensitive drum 30 are contacted to each other. Therefore, when the developing roller 42 is brought into contact to the photosensitive drum 30, the speed difference between the peripheral surfaces of the photosensitive drum 30 and the developing roller 42 can be made small, and therefore, wearing of the photosensitive drum 30 and the developing roller 42 can be reduced. When image formation is completed, the developing roller 42 and the photosensitive drum are spaced from each other by moving the second force application member 60 in the direction of the arrow B, as described hereinbefore. After the spacing, the rotations of the developing roller 42 and the photosensitive drum 30 are stopped. Thus, the speed difference between the peripheral surfaces of the photosensitive drum 30 and the developing roller 42 is reduced, and therefore, the wearing of the photosensitive drum 30 and the developing roller 42 can be reduced. Therefore, the image quality can be improved.

Figure 33:
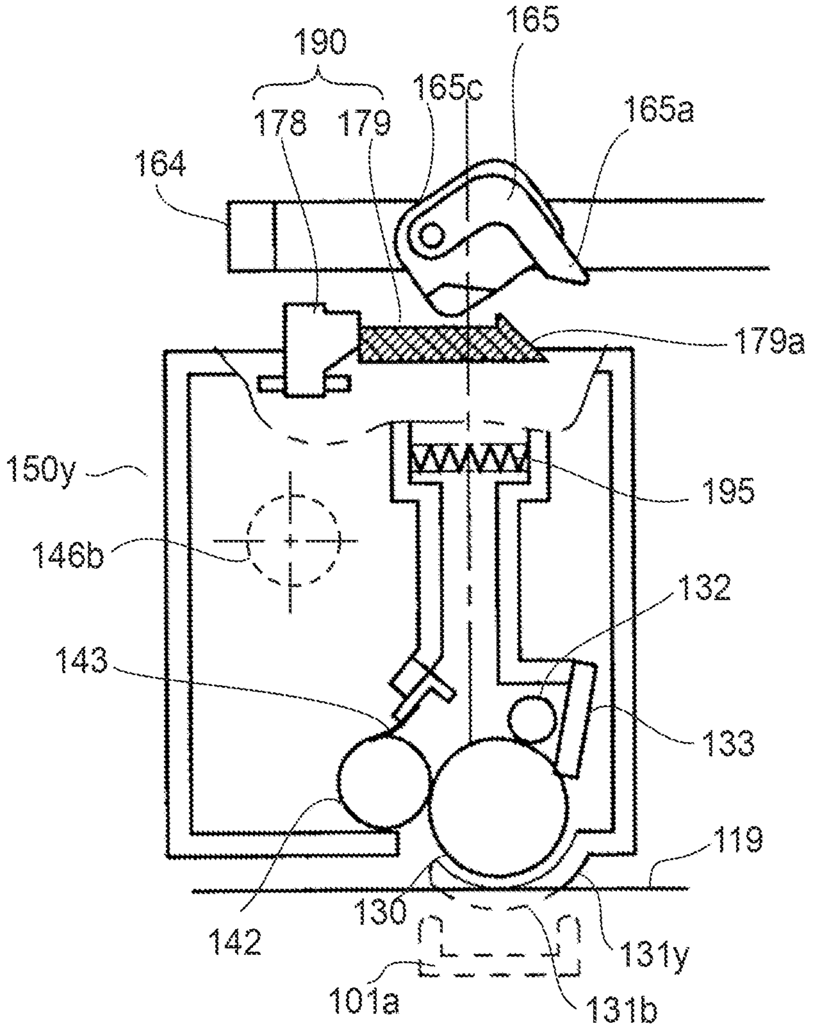
FIG. 33 is a sectional view of the process cartridge as seen in the axial direction of the photosensitive drum according to the first embodiment of the present invention, illustrating an operation of the force receiving member of the process cartridge.
Figure 34:
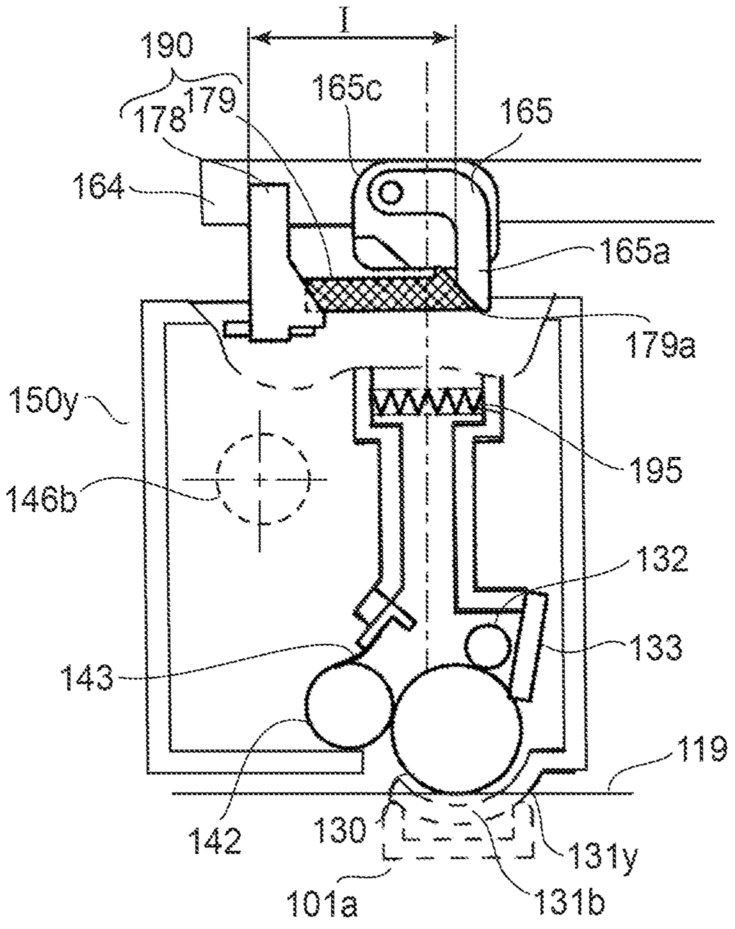
FIG. 34 is a sectional view of the process cartridge as seen in the axial direction of the photosensitive drum according to the first embodiment of the present invention, illustrating an operation of the force receiving member of the process cartridge.
Figure 35:
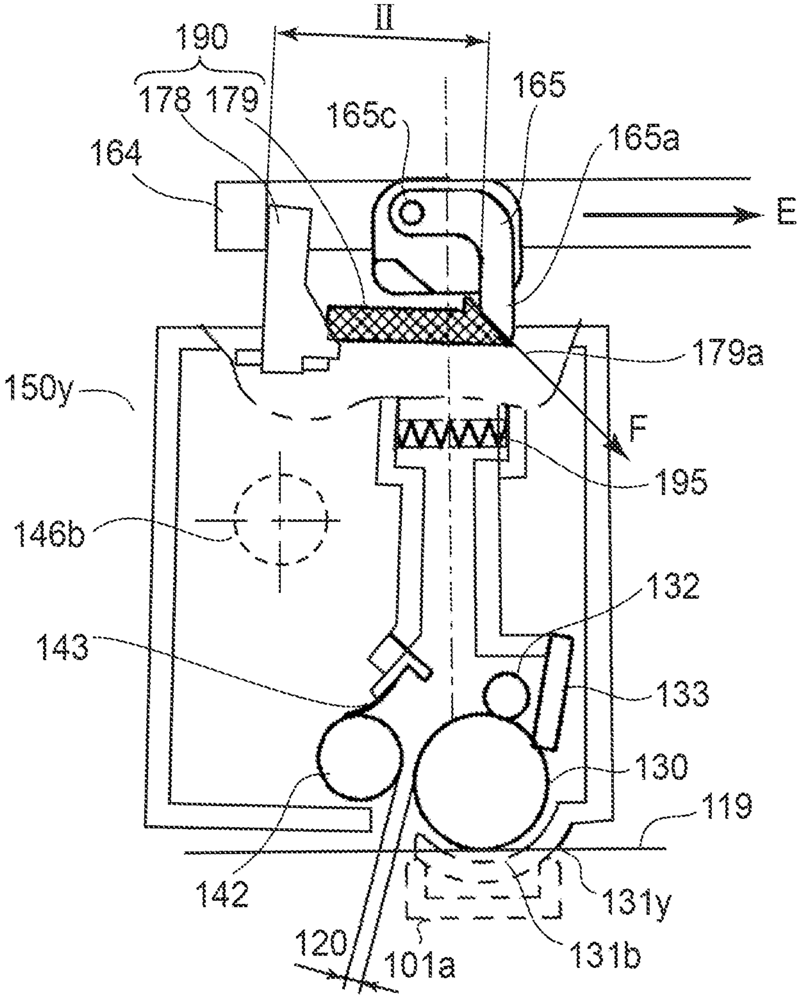
FIG. 35 is a sectional view of the process cartridge as seen in the axial direction of the photosensitive drum according to the first embodiment of the present invention, illustrating an operation of the force receiving member of the process cartridge.

The elastic portion can be replaced with the structure shown in FIGS. 33, 34, 35. Here, a force receiving device 190 comprises a first force receiving member 179 and a second force receiving member 178. As shown in FIGS. 34, 35, the first force application member 165 is provided with a sliding portion 165*a* (inclined surface), and the first force receiving member 179 is provided with a sliding portion 179*a* (inclined surface). FIG. 33 shows the state before the first force application member 165 moves. FIG. 34 shows the state in which the second force receiving member 178 is projected from the cartridge 150*y* by the first force application member 165 moving to abut the first force receiving member 179. FIG. 35 shows the state after the second force application member 164 moves in the direction of the arrow E.

The change from I to II of the distance between the first force receiving member 179 and the second force receiving member 178 shown in FIGS. 34, 35 is permitted by the slidability between the sliding portion 179*a* and the sliding portion 165*a* and by the movability of the first force receiving member 179 in the direction of an arrow F shown in FIG. 35.

Figure 36:
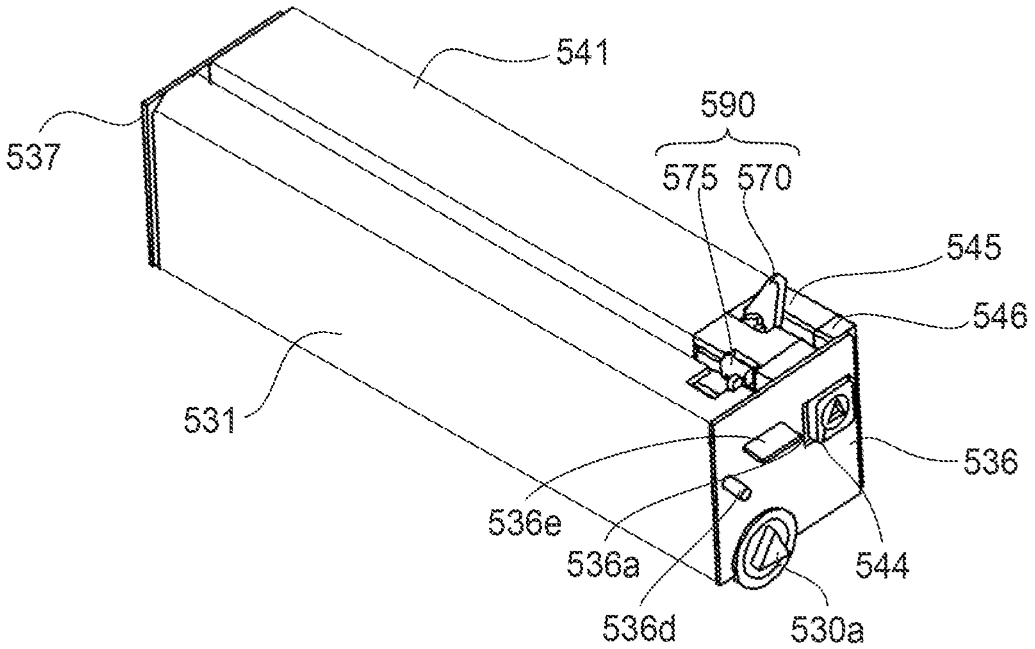
FIG. 36 illustrates a spacing operation in the process cartridge according to the first embodiment of the present invention.

In the cartridge 50*y* used for the description of this embodiment, the developing unit 41 is rotatable relative to the drum unit 31 in order to contact and space the developing roller 42 and the photosensitive drum 30 relative to each other. However, FIG. 36 shows an alternative structure wherein the portion to be guided 544 is in the form of a square pole configuration, and the drum unit 531 is provided with an elongated hole 536*a* engageable with the portion to be guided 544, wherein the developing unit 541 is slidable relative to the drum unit 531.

Figure 37:
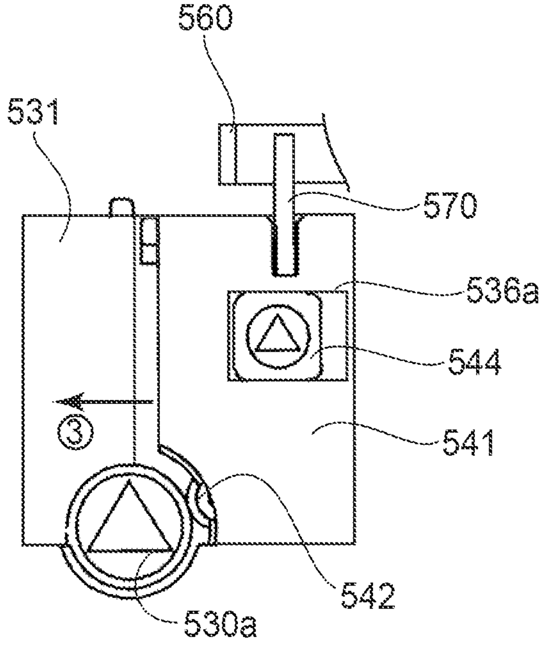
FIG. 37 illustrates a spacing operation in the process cartridge according to the first embodiment of the present invention.
Figure 38:
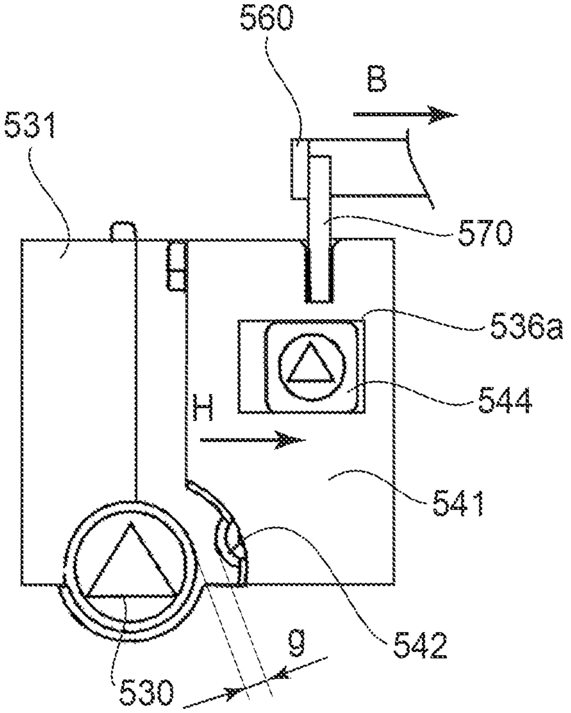
FIG. 38 illustrates a spacing operation in the process cartridge according to the first embodiment of the present invention.

More particularly, as shown in FIG. 37, when the second force application member 560 does not act on the second force receiving member 570, the developing roller 542 is urged by an urging spring (unshown) (elastic member) so as to contact the developing roller 542 to the photosensitive drum. Then, as shown in FIG. 38, the second force application member 560 moves in the direction of the arrow B to act on the second force receiving member 570. By this, the developing unit 541 slides in the direction the relative to the drum unit 531 so that the developing roller 542 and the photosensitive drum 530 are spaced by the gap g. Similarly to the first embodiment, the force receiving device 590 includes the first force receiving member 575 and the second force receiving member 570.

A description will be provided as to the operation of taking the cartridges 50*y*, 50*m*, 50*c*, 50*k* out of the main assembly 100 of the apparatus.

With the movement of the door 12 from the closed position to the open position, the first force application member 61 rotates from the position shown in FIGS. 6, 12 to the position shown in FIGS. 5, 11. By this, the first force receiving member 75 is released from the urging force of the first force application member 61, so that first force receiving member 75 moves from the state shown in FIGS. 6, 12 to the state shown in FIGS. 5, 11. More particularly, the second force receiving member 70 becomes free from the urging portion 75*b* of the first force receiving member 75. As shown in FIG. 5, the second force receiving member 70 also returns to the stand-by position (non-operating position) about the shaft 70*a* by the force of the spring 73 shown in FIG. 19 in the direction of an the arrow A.

With the movement of the door 12 from the closed position to the open position, the tray holding member 14 is raised away from the transfer belt 19 as shown in FIGS. 3, 4. By this, the cartridges 50*y*, 50*m*, 50*c*, 50*k* are raised, and therefore, the photosensitive drum 30 is separated from the transfer belt 19.

As described in the foregoing, the second force receiving member 70 for moving the developing unit 41 is constituted such that it projects outwardly from the developing unit 41 when the cartridges 50*y*, 50*m*, 50*c*, 50*k* are mounted to the main assembly 100 of the apparatus and the door 12 moves to the closed position. Therefore, the cartridges 50*y*, 50*m*, 50*c*, 50*k* can be downsized. In addition, since the mounting is effected when the second force receiving member 70 is at the stand-by position, the space in the main assembly 100 of the apparatus required for the movement of the cartridges 50*y*, 50*m*, 50*c*, 50*k* may be small. In other words, the size of the opening 80 may be small, and the first force application member 61 and the second force application member 60 can be close to the cartridges 50*y*, 50*m*, 50*c*, 50*k*. Therefore, the size of the main assembly 100 of the apparatus can be reduced with respect to the vertical direction. In addition, as seen in the vertical direction of the main assembly 100 of the apparatus, as shown in FIGS. 31, 32, the force receiving device 90 is overlapped with the first force application member 61 and the second force application member 60 with respect to the drum axial direction, and therefore, the cartridge can be downsized with respect to the longitudinal direction.

When the cartridges 50*y*, 50*m*, 50*c*, 50*k* are handled by the user or when they are transported, the second force receiving member 70 can be placed at the stand-by position, and therefore, the second force receiving member 70 is not easily damaged.

Second Embodiment

In the first embodiment, the cartridges 50*y*, 50*m*, 50*c*, 50*k* are mounted to the main assembly 100 of the apparatus in the direction substantially perpendicular to the axis of the photosensitive drum 30. In Embodiment 2, the cartridges 450*y*, 450*m*, 450*c*, 450*k* are mounted to the main assembly 401 of the electrophotographic image apparatus (main assembly of the apparatus) in the direction substantially parallel with the axial direction of the electrophotographic photosensitive drum the photosensitive drum) 430. In the following description, the points different from the first embodiment will be described mainly.

[General Arrangement of Electrophotographic Image Forming Apparatus]

Figure 39:
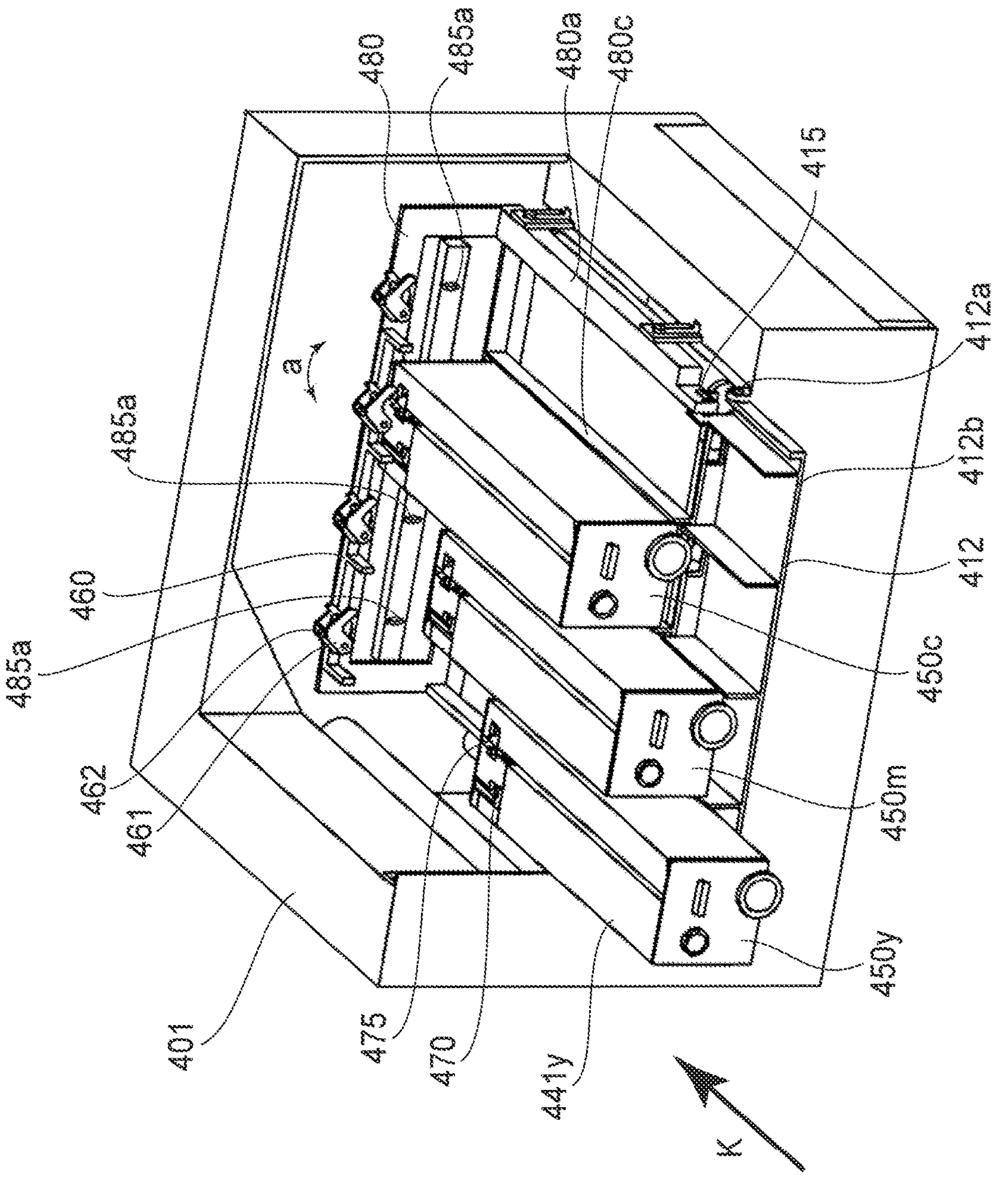
FIG. 39 shows a general arrangement of an electrophotographic image forming apparatus according to a second embodiment of the present invention.
Figure 41:
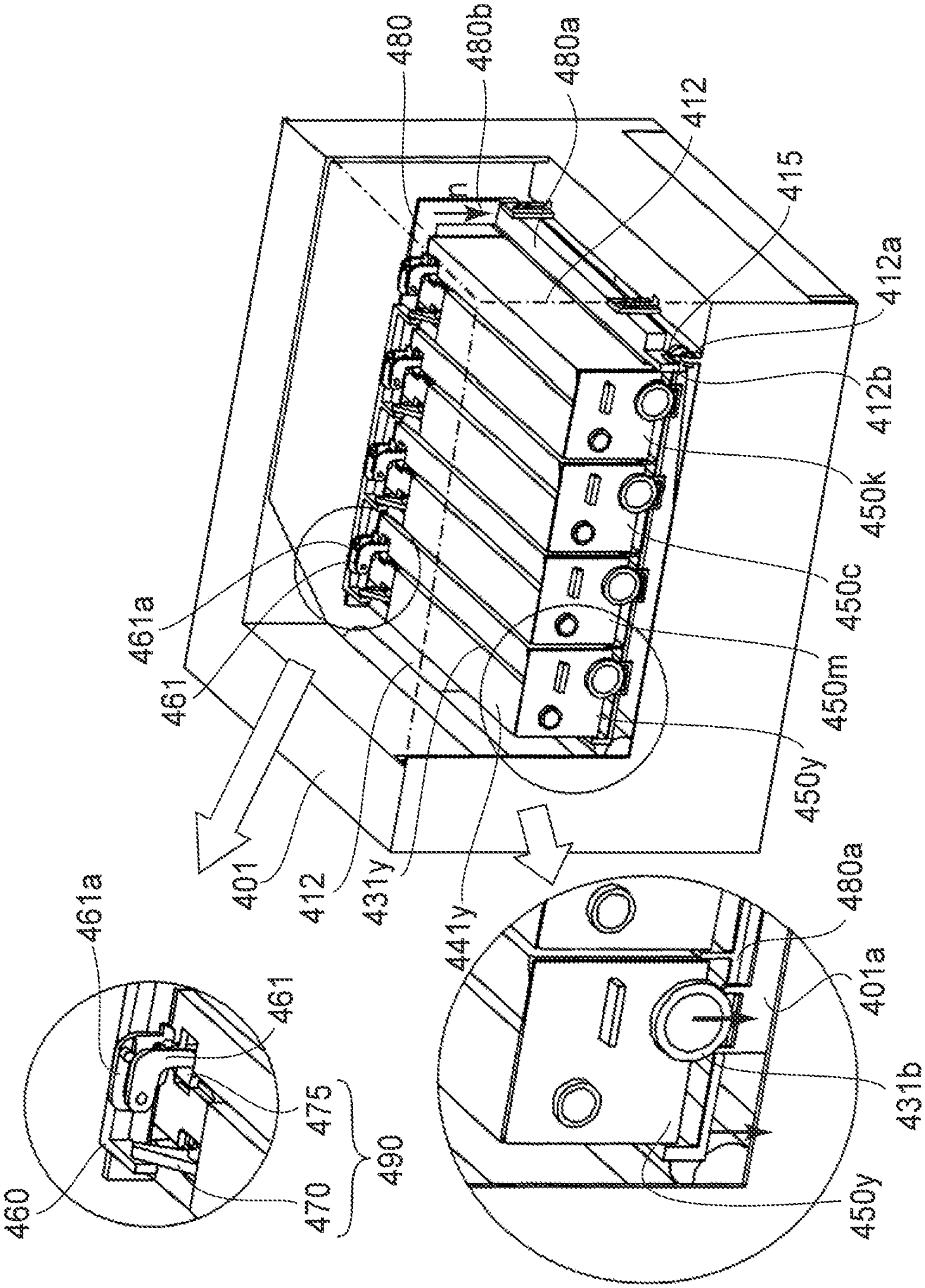
FIG. 41 shows a general arrangement of the electrophotographic image forming apparatus according to the second embodiment of the present invention.

As shown in FIG. 39 FIGS. 41, the main assembly 401 of the apparatus is loaded with the cartridges 450*y*, 450*m*, 450*c*, 450*k* in the direction (arrow K) substantially parallel with the axial direction (longitudinal direction) of the photosensitive drum 430. In this embodiment, the cartridges 450*y*, 450*m*, 450*c*, 450*k* are mounted to the mounting member 480*c* provided in the main assembly 401 of the apparatus, in the direction of the arrow K. The cartridges 450*y*, 450*m*, 450*c*, 450*k* accommodate yellow color, magenta color, cyan color and black color toner particles (developers), respectively.

Figure 42:
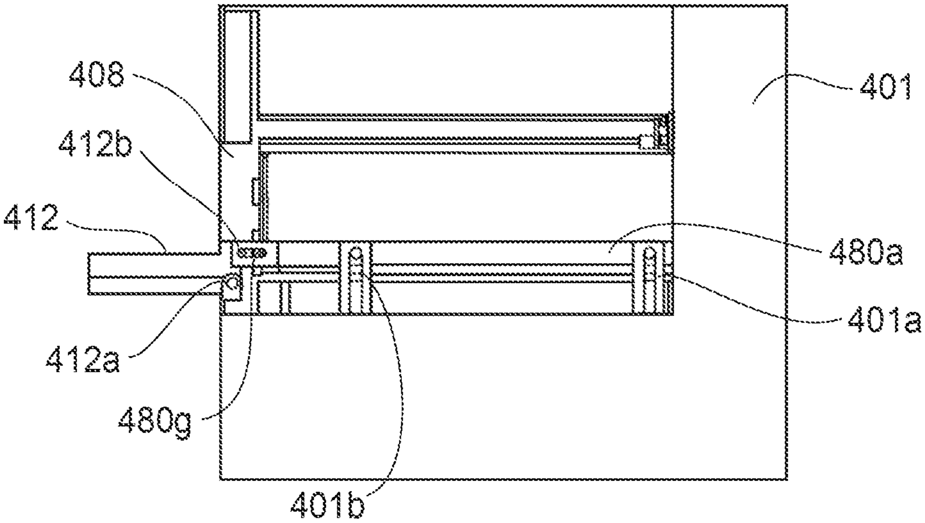
FIG. 42, parts (a) and (b), illustrates an operation of a first force applying operation member of the electrophotographic image forming apparatus according to the second embodiment of the present invention.
Figure 42:
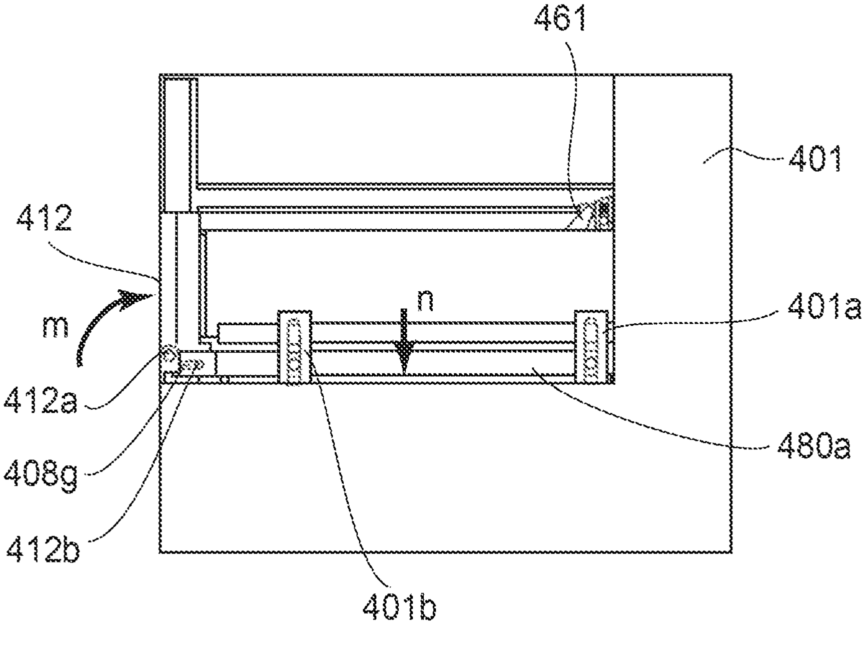
Figure 45:
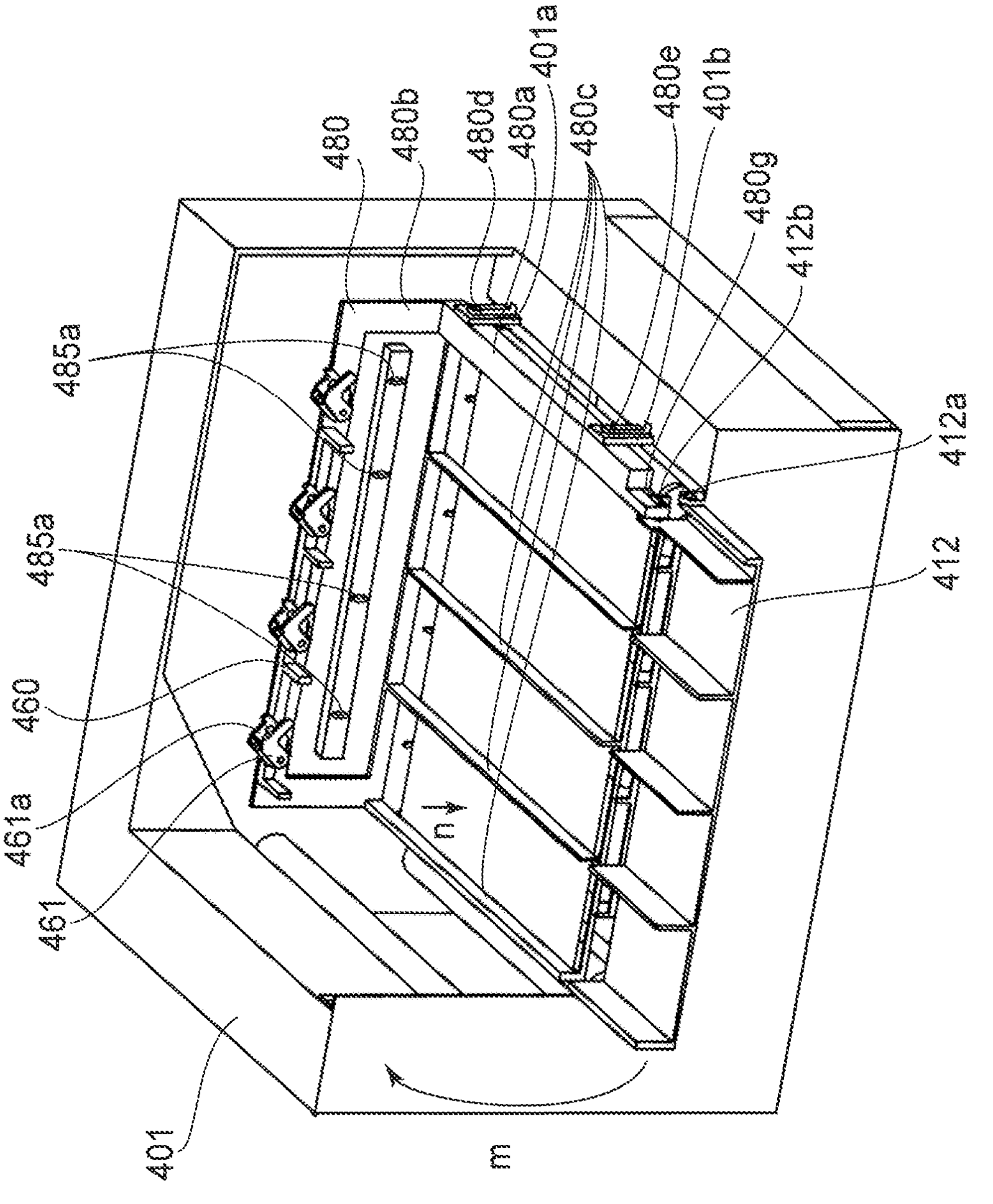
FIG. 45 is an illustration of an operation of the first force application member according to the second embodiment of the present invention.

The cartridges 450*y*, 450*m*, 450*c*, 450*k* are each provided with a force receiving device 490 having a first force receiving member 475 and a second force receiving member 470. At the rear side of the main assembly 401 of the apparatus with respect to the cartridge entering direction, there are provided a first force application member 461 and a second force application member 460 actable on the first force receiving member 475 and the second force receiving member 470, respectively. As shown in FIG. 42, parts (a) and (b), the main assembly 401 of the apparatus is provided with an opening 408 for permitting the cartridges 450*y*, 450*m*, 450*c*, 450*k* to enter the main assembly 401 of the apparatus and a door 412 movable between a closed position closing the opening 408 and an open position opening the opening 408. The door 412 is rotatable about the rotation axis 412*a*. As shown in FIG. 45, the mounting member 480 integrally includes holding portions 480*c* for holding the cartridges 450*y*, 450*m*, 450*c*, 450*k*, respectively, an operation member 480*b* for moving the first force application member 461, and a connecting portion 480*a* for connecting the operation member 480*b* and the door 412 with each other. As shown in FIG. 42, the connecting portion 480*a* and the door 412 are connected with each other by engagement between an elongated hole 480*g* provided in the connecting portion 480*a* and a projection 412*b* provided on the door 412.

Therefore, with movement of the door 412 from the open position to the closed position in the direction of an arrow m, projections 480*d*, 480*e* provided on the connecting portion 480*a* move along guide grooves 401*a*, 401*b* provided in the main assembly 401 of the apparatus as shown in FIG. 42, parts (a) and (b). Thus, a holding portion 480*c* integral with the operation member 480*b* moves in the direction of an arrow n. Thus, the photosensitive drums 430 of the cartridges 450*y*, 450*m*, 450*c*, 450*k* supported on the holding portion 480*c* are moved from the positions spaced from the transfer belt 419 shown in FIG. 47 to the position contacting the transfer belt 419 shown in FIG. 48. Simultaneously, the portion to be positioned 431*b* provided on the drum unit 431 is abutted to the positioning portion 401*a* provided in the main assembly 401 of the apparatus by which the cartridges 450*y*, 450*m*, 450*c*, 450*k* are positioned correctly.

Each of the cartridges 450*y*, 450*m*, 450*c*, 450*k* is prevented from movement in the direction of the arrow a in FIG. 39 in the main assembly 401 of the apparatus by engaging the shaft 436*d* provided on the covering member 436 with a rotation preventing portion 485*a* provided in the main assembly 401 of the apparatus.

When the cartridges 450*y*, 450*m*, 450*c*, 450*k* are dismounted from the main assembly 401 of the apparatus, the operations are reverse to the mounting operations.

[Operations First Force Application Member and Second Force Applying Portion]

Figure 40:
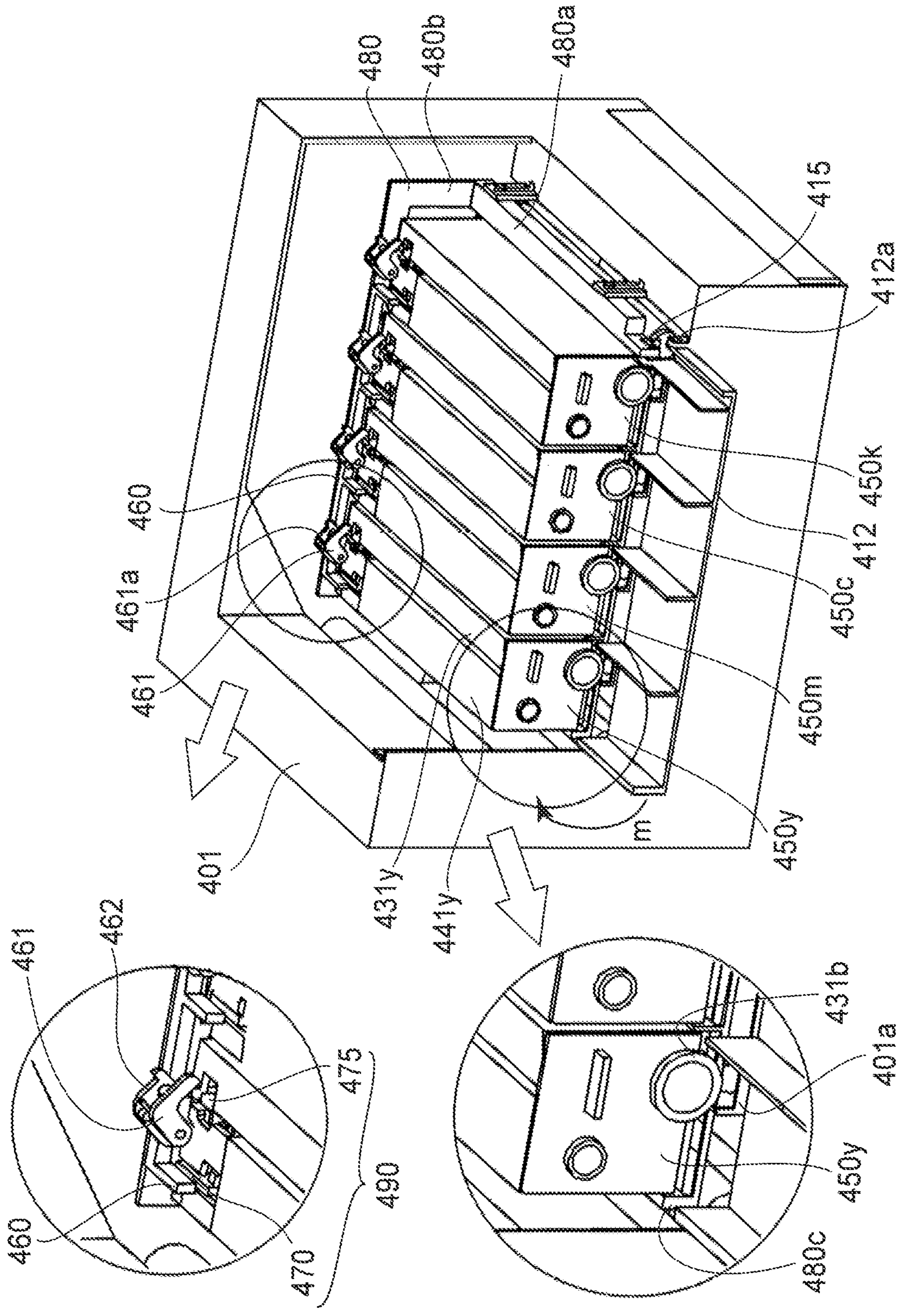
FIG. 40 shows a general arrangement of the electrophotographic image forming apparatus according to the second embodiment of the present invention.
Figure 43:
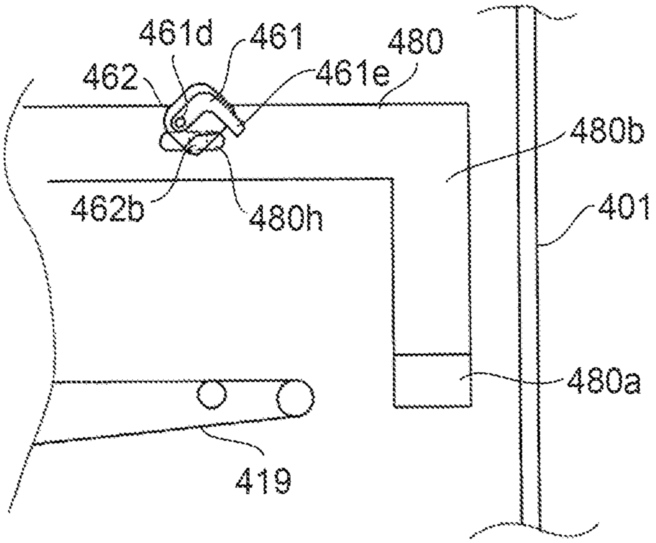
FIG. 43 is an illustration of an operation of the first force application member according to the second embodiment of the present invention.
Figure 44:
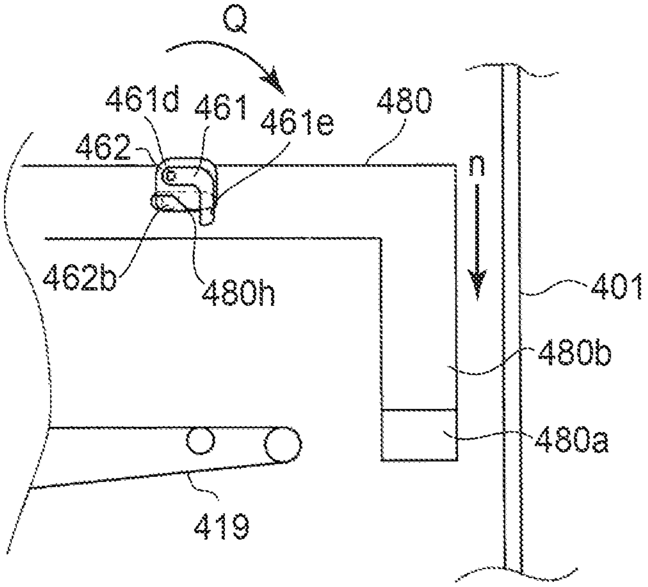
FIG. 44 is an illustration of an operation of the first force application member according to the second embodiment of the present invention.

Referring to FIG. 40-FIG. 45, the operations of the first force application member 461 will be described. Similarly to the first embodiment, the first force application member 461 is engaged with a connecting member 462 to interrelate with the operation of the operation member 480*b*. The structure of the connecting member 462 is the same as in the first embodiment. FIGS. 40 and 42, (a) and FIG. 43 show the state in which the door 412 is at the open position and in which the operation member 480*b* takes an upper position. FIGS. 41 and 42, (b) and FIG. 44 show the state in which the door 412 is at the closed position. When the door 412 is closed, the operation member 480*b* moves down (in the direction of an arrow n). As shown in FIGS. 43, 44, a projection 462*b* provided on the connecting member 462 is in engagement with an elongated hole 480*h* provided in the mounting member 480. Therefore, with movement of the operation member 480*b*, the connecting member 462 rotates in the direction of an arrow Q about the rotational center 461*d*. Similarly to the first embodiment, the first force application member 461 rotates with the rotation of the connecting member 462. When the door 412 is moved from the closed position to the open position, the operations are reverse to the above-described operations. The other operations are the same as with the first embodiment.

The operations of the second force applying portion 460 are the same as with the first embodiment.

[General Arrangement of Process Cartridge]

Figure 46:
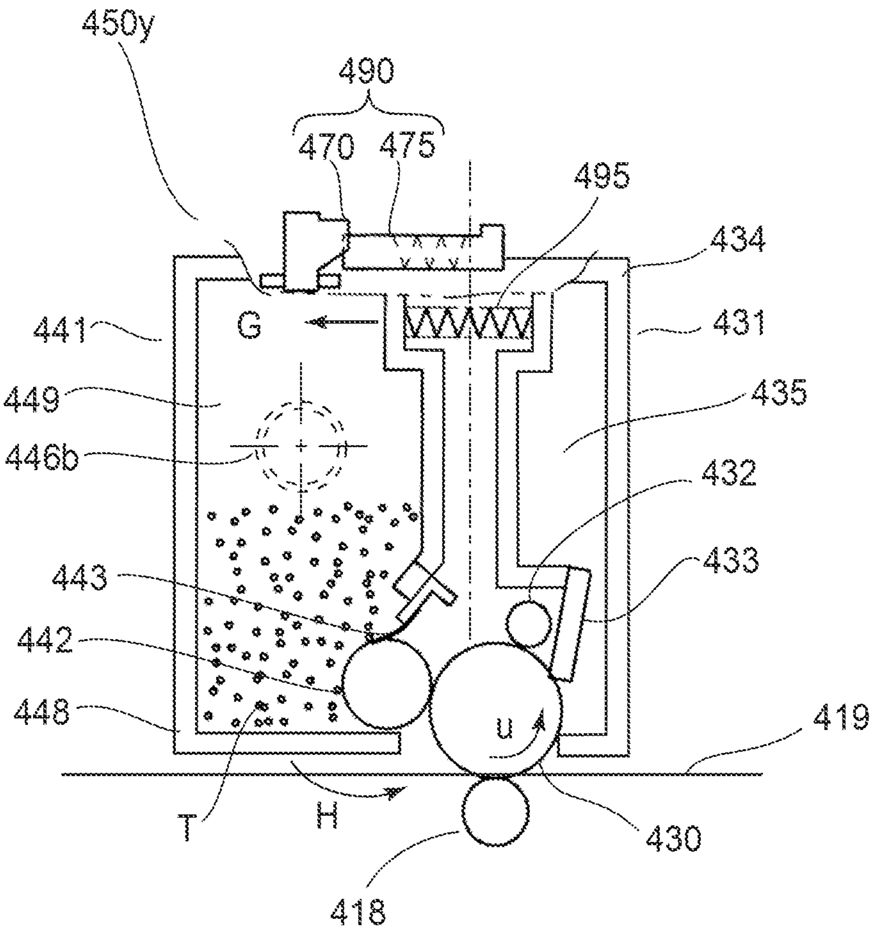
FIG. 46 is a sectional view of the process cartridge as seen in the axial direction of the photosensitive drum according to the second embodiment of the present invention.

A description will be provided as to the structure of the process cartridge of this embodiment. The structures of the cartridges 450*y*, 450*m*, 450*c*, 450*k* are the same, and therefore, the description will be provided as to the cartridge 450*y* referring to FIG. 46.

The cartridge 450*y* includes a photosensitive drum 430, and process means actable on the photosensitive drum 430. The process means includes a charging roller 432 functioning as charging means for charging electrically the photosensitive drum 430, a developing roller 442 functioning as developing means for developing a latent image formed on the photosensitive drum 430, and/or blade 433 functioning as cleaning means for removing residual toner remaining on the surface of the photosensitive drum 430. The cartridge 450*y* comprises a drum unit 431 and a developing unit 441.

The structures of the drum unit 431 and the developing unit 441 and the connecting structure between the drum unit 431 and the developing unit 441 are the same as with the first embodiment.

[Force Receiving Device]

Figure 47:
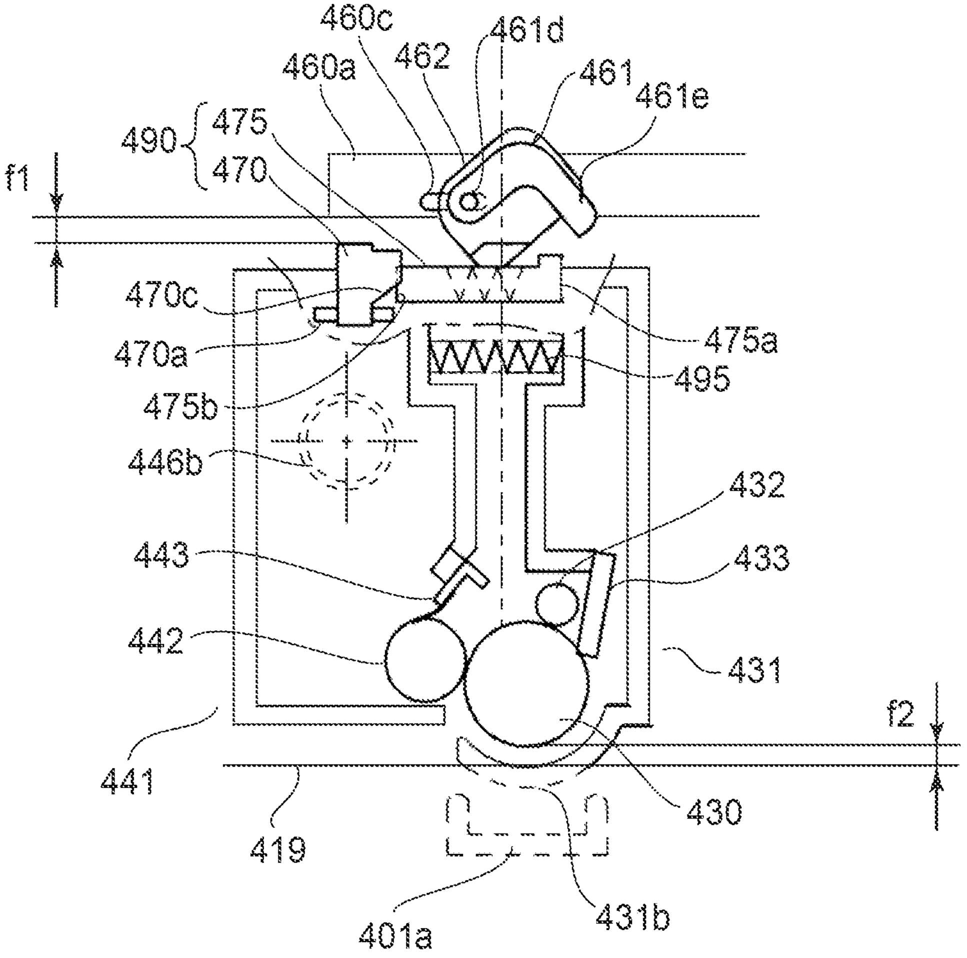
FIG. 47 illustrates a sectional view of the process cartridge as seen in the axial direction of the photosensitive drum according to the second embodiment of the present invention, illustrating a force receiving device of the process cartridge.
Figure 48:
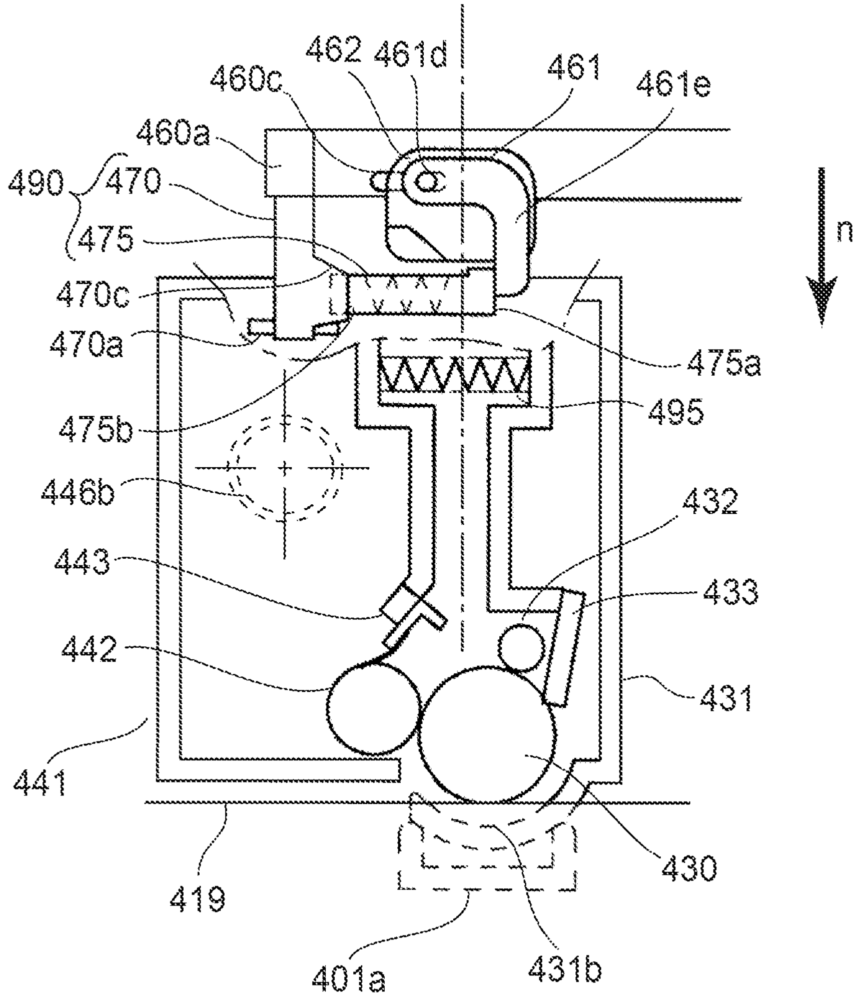
FIG. 48 illustrates a sectional view of the process cartridge as seen in the axial direction of the photosensitive drum according to the second embodiment of the present invention, illustrating a force receiving device of the process cartridge.

Similarly to the first embodiment, as shown in FIG. 47, the cartridge 450*y* includes a force receiving device 490 for contacting the developing roller 442 and the photosensitive drum 430 to each other and for spacing them from each other. The detailed structures thereof are the same as with FIGS. 9 and 15-19. As shown in FIG. 47, the force receiving device 490 of this embodiment comprises a first force receiving member 475, a second force receiving member 470 and a spring which is urging means (unshown).

[Spacing Mechanism of Main Assembly of Electrophotographic Image Forming Apparatus and Urging Mechanism for Process Cartridge]

Figure 49:
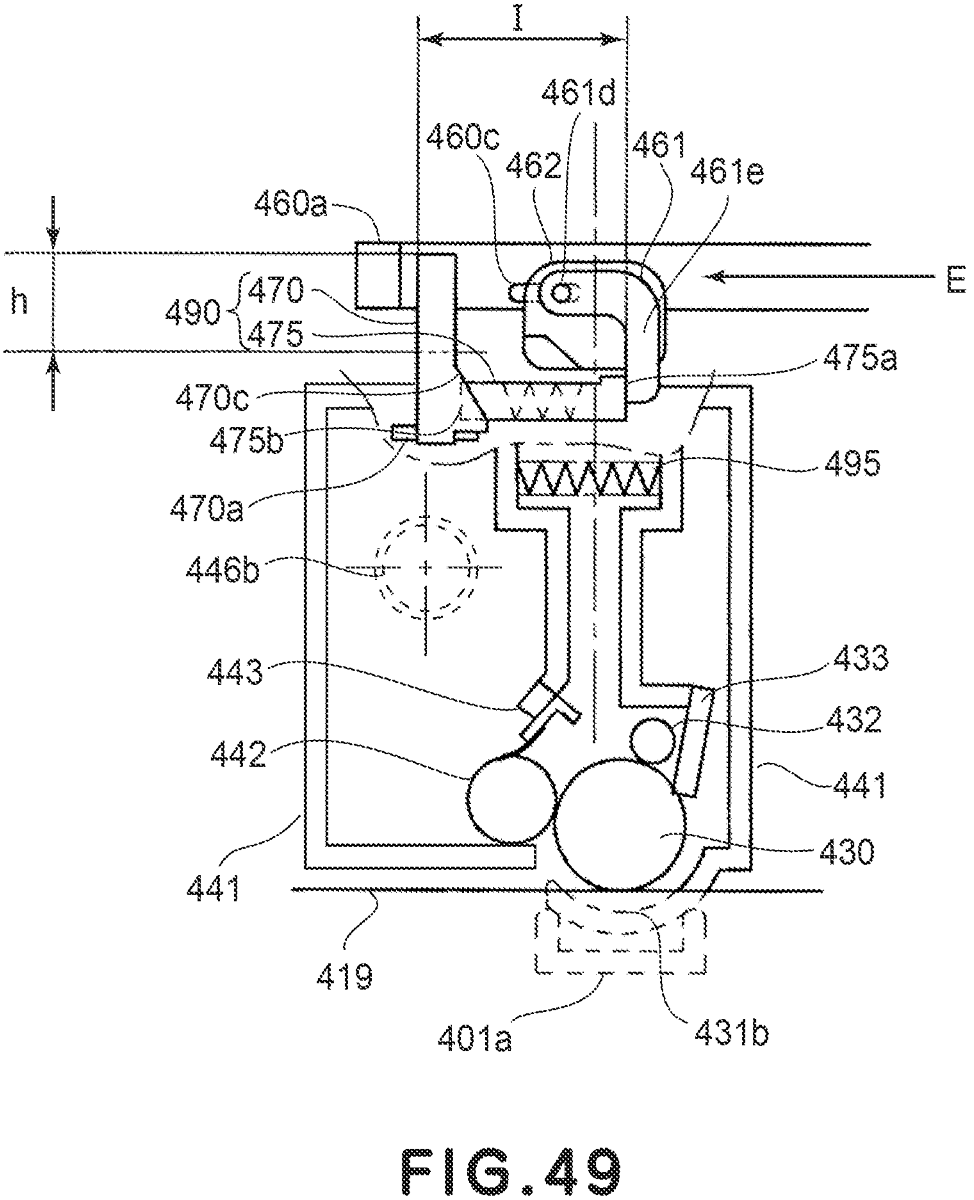
FIG. 49 illustrates a sectional view of the process cartridge as seen in the axial direction of the photosensitive drum according to the second embodiment of the present invention, illustrating a force receiving device of the process cartridge.
Figure 50:
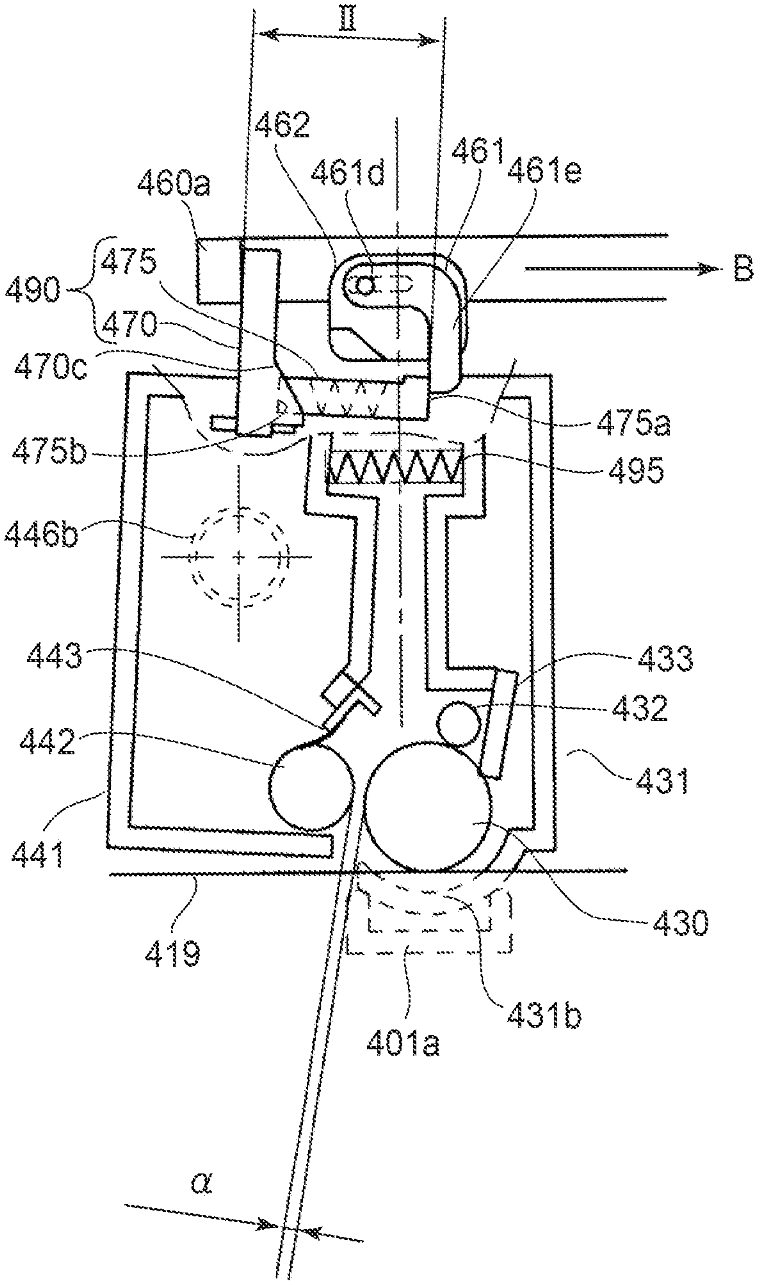
FIG. 50 illustrates a sectional view of the process cartridge as seen in the axial direction of the photosensitive drum according to the second embodiment of the present invention, illustrating a force receiving device of the process cartridge.
Figure 51:
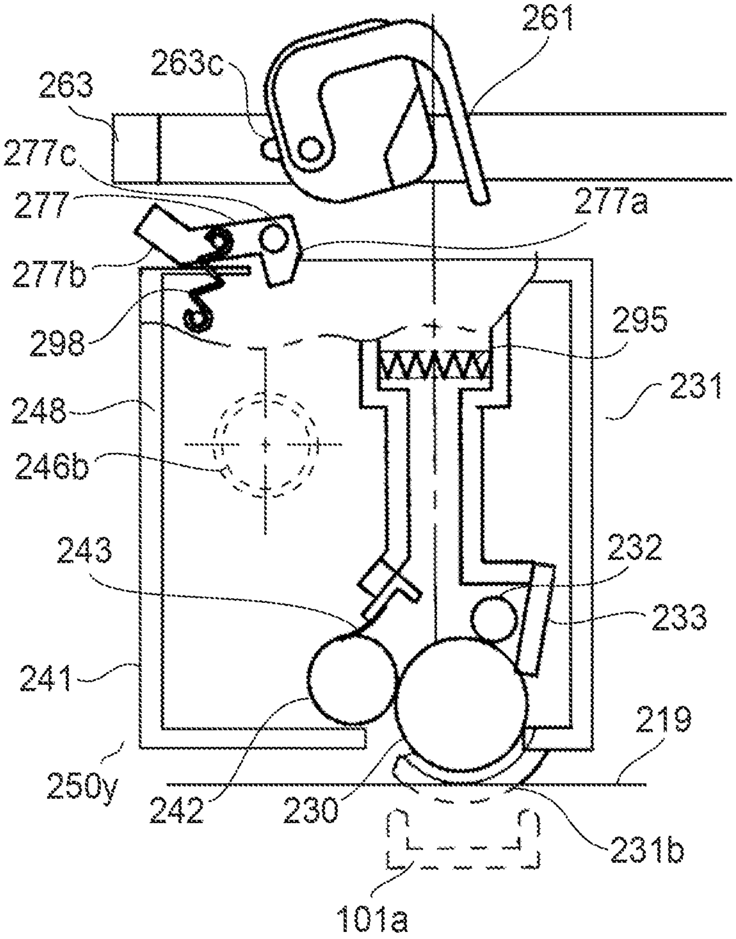
FIG. 51 is a sectional view of a process cartridge according to a third embodiment of the present invention, illustrating an operation of a force receiving member of the process cartridge.

FIG. 49 shows the state after the second force application member 460 moves in the direction of an arrow E from the home position (FIG. 48) in which the developing roller 442 and the photosensitive drum 430 are still in contact with each other. FIG. 50 shows the state after the second force application member 460 moves in the direction of an arrow B in which the developing roller 442 and the photosensitive drum 430 are spaced from each other. Similarly to the first embodiment, the second force applying portion 460 is provided with an elongated hole portion 460*c* for avoiding the rotation axis 461*d* of the first force application member 461. Even when the second force applying portion 460 moves in the direction of an arrow E or arrow B, the second force applying portion 460 can move without interference with the first force application member 461.

The first force application member 461 and the second force application member 460, as shown in FIGS. 39, 40, are provided above the cartridges 450*y*, 450*m*, 450*c*, 450*k* entering the main assembly 401 of the apparatus. When the cartridges 450*y*, 450*m*, 450*c*, 450*k* are in the process of entering the main assembly 401 of the apparatus, the second force receiving member 470 is kept in the stand-by position.

Also in this embodiment, the second force receiving member 470 is projected outwardly of the developing unit 441 when the cartridges 450*y*, 450*m*, 450*c*, 450*k* are mounted to the main assembly 401 of the apparatus and the door 412 is moved to the closed position. Therefore, the cartridges 50*y*, 50*m*, 50*c*, 50*k* can be downsized. Since the cartridges 450*y*, 450*m*, 450*c*, 450*k* are inserted with the second force receiving members 470 at the stand-by positions, the space required for entering the cartridges 450*y*, 450*m*, 450*c*, 450*k* may be small. In other words, the size of the opening 480 may be small, and the first force application member 461 and the second force application member 460 can be close to the cartridges 450*y*, 450*m*, 450*c*, 450*k*. Therefore, the main assembly 401 of the apparatus can be downsized with respect to the vertical direction. Since the arrangement is such that force receiving device 90 is overlapped with the first force application member 61 and the second force application member 60 in the drum axial direction as seen in the vertical direction, the cartridge can be downsized in the longitudinal direction.

When the cartridges 450*y*, 450*m*, 450*c*, 450*k* are handled by the user or when they are transported, the second force receiving member 470 can be placed at the stand-by position, and therefore, the second force receiving member 470 is not easily damaged.

Third Embodiment

This embodiment relates to a modification of the force receiving device.

This embodiment will be described also with a yellow cartridge 250*y* accommodating a yellow color developer as an exemplary cartridge.

As shown in FIG. 51-FIG. 54, the developing unit 241 is provided with a force receiving member 277 (force receiving device).

The force receiving member 277 includes a shaft portion 277*c* supported rotatably on the developing device frame 248, a first force receiving portion 277*a* on which the first force application member 261 is actable, and a second force receiving portion 277*b* on which the second force application member 263 is actable. The force receiving member 277 is integrally constituted by the first force receiving portion and the second force receiving portion. The spring 298 has one end fixed to the force receiving member 277 and another end fixed to the developing device frame 248. The force receiving member 277 is kept in the state shown in FIG. 51 by the spring 298.

Figure 52:
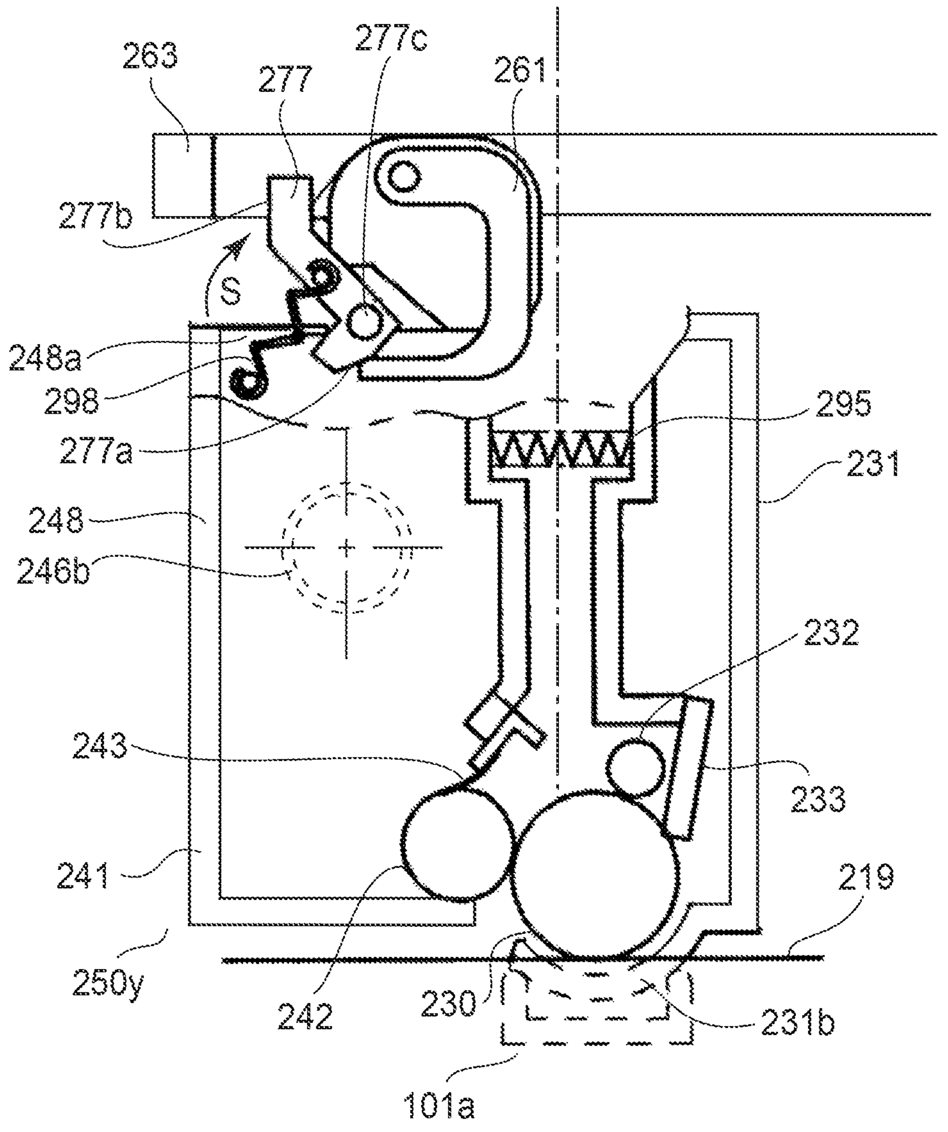
FIG. 52 is a sectional view of the process cartridge according to the third embodiment of the present invention, illustrating the operation of the force receiving member of the process cartridge.

As shown in FIG. 52, similarly to the first embodiment, by movement of the door (unshown) from the open position to the closed position, the first force application member 262 is contacted to the first force receiving portion 277*a* of the force receiving member 277. By doing so, the force receiving member 277 rotates in the direction of an arrow S shown in FIG. 52 about the shaft 277*c*. The second force receiving portion 277*b* of the force receiving member 277 moves outwardly of the developing unit 241.

Figure 53:
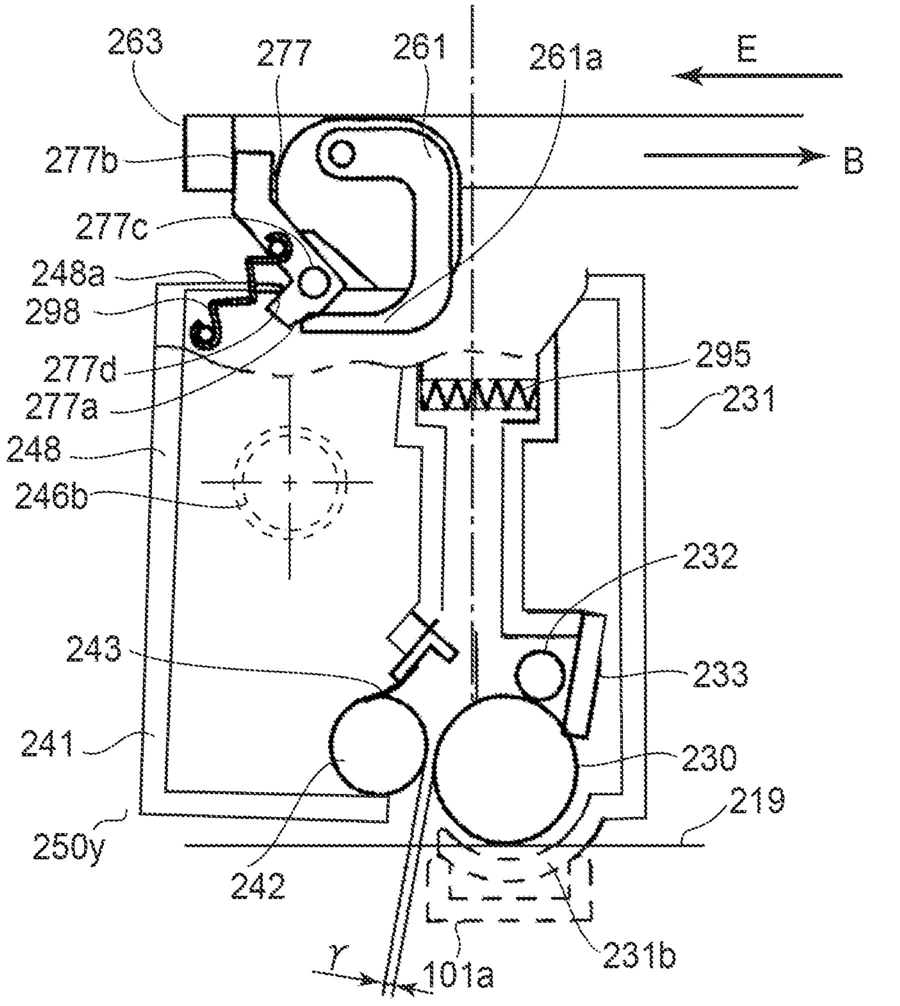
FIG. 53 is a sectional view of the process cartridge according to the third embodiment of the present invention, illustrating the operation of a force receiving member of the process cartridge.
Figure 54:
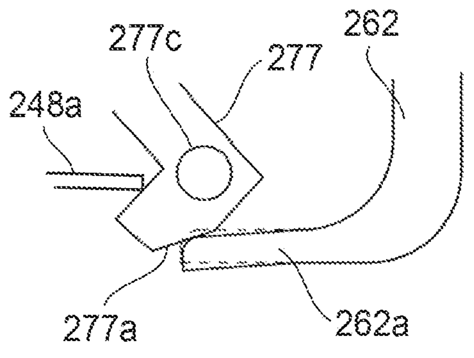
FIG. 54 is a sectional view of the process cartridge according to the third embodiment of the present invention, illustrating the operation of a force receiving member of the process cartridge.

Thereafter, as shown in FIG. 53, the second force application member 263 moves in the direction of an arrow B by the driving force from the main assembly of the apparatus to contact to the second force receiving portion 277*b* of the force receiving member 277. Further, when the second force application member 263 moves in the direction of an arrow B, the developing unit 241 rotates about the connecting portion 246*b* with the drum unit 231, by which the developing roller 242 is spaced from the electrophotographic photosensitive drum 230 by a gap γ. At this time, as shown in FIG. 53, the portion to be locked 277*d* of the force receiving member 277 is contacted to the locking portion 248*a* of the developing device frame 248 to regulate the movement of the force receiving member 277 shown in FIG. 52 in the direction of the arrow S. Therefore, by movement of the second force application member 263 in the direction of the arrow E, the developing unit 241 is rotated relative to the drum unit 31. By the movement of the second force application member 263 in the direction of the arrow B, the first force receiving portion 277*a* of the force receiving member 277 slides on and deforms the free end portion 262*a* of the first force application member 262 from the shape indicated by a solid lines to the shape indicated by broken lines in FIG. 54. To accomplish this, the free end portion 262*a* of the first force application member 262 is elastically deformable. In addition, the first force receiving portion 277*a* constitutes a sliding surface slidable relative to the first force application member 262.

The elastic deformability of the free end portion 262*a* of the first force application member 262 assures the urging of the force receiving member 277 to the locking portion 248*a* even when the second force application member 263 moves in the direction of the arrow B in the state of FIG. 53.

As regards the contact between the developing roller 242 and the photosensitive drum 230, by the movement of the second force application member 263 in the direction of the arrow E in FIG. 53 from the state shown in FIG. 53, the movement to the second force receiving member 277 by the second force application member 263 is permitted. By the urging force of the spring 295, the developing unit 241 is rotated to contact the developing roller 242 to the photosensitive drum 230.

In this embodiment, the structures other than the force receiving member 277 are the same as those of the cartridge 50*y* described in the first embodiment. The operations of the first force application member 261 in this embodiment are the same as those of the first force application member 61 in the first embodiment or the first force application member 461 in the second embodiment.

As described in the foregoing, in the force receiving device of this embodiment, the number of parts is smaller than the number of parts of the force receiving device 90 of the first embodiment.

Fourth Embodiment

This embodiment relates to a modification of the force receiving device.

This embodiment will be described also with a yellow cartridge 250*y* accommodating a yellow color developer as an exemplary cartridge. As shown in FIG. 55-FIG. 58, the developing unit 341 is provided with a force receiving device 370. The force receiving device 370 includes a first force receiving member 370*a*, a second force receiving member 370*b*, a first spring 370*c*, and a second spring 370*d*. The force receiving device 370 is movably supported in a guide 341*a* provided in the developing device frame 348. The second spring 370*d* is provided between a locking portion 341*c* provided at one end of the guide 341*a* and a locking portion 370*e* provided on the second force receiving member 370*b*. The first spring 370*c* is provided between the first force receiving member 370*a* and the second force receiving member 370*b*.

Figure 55:
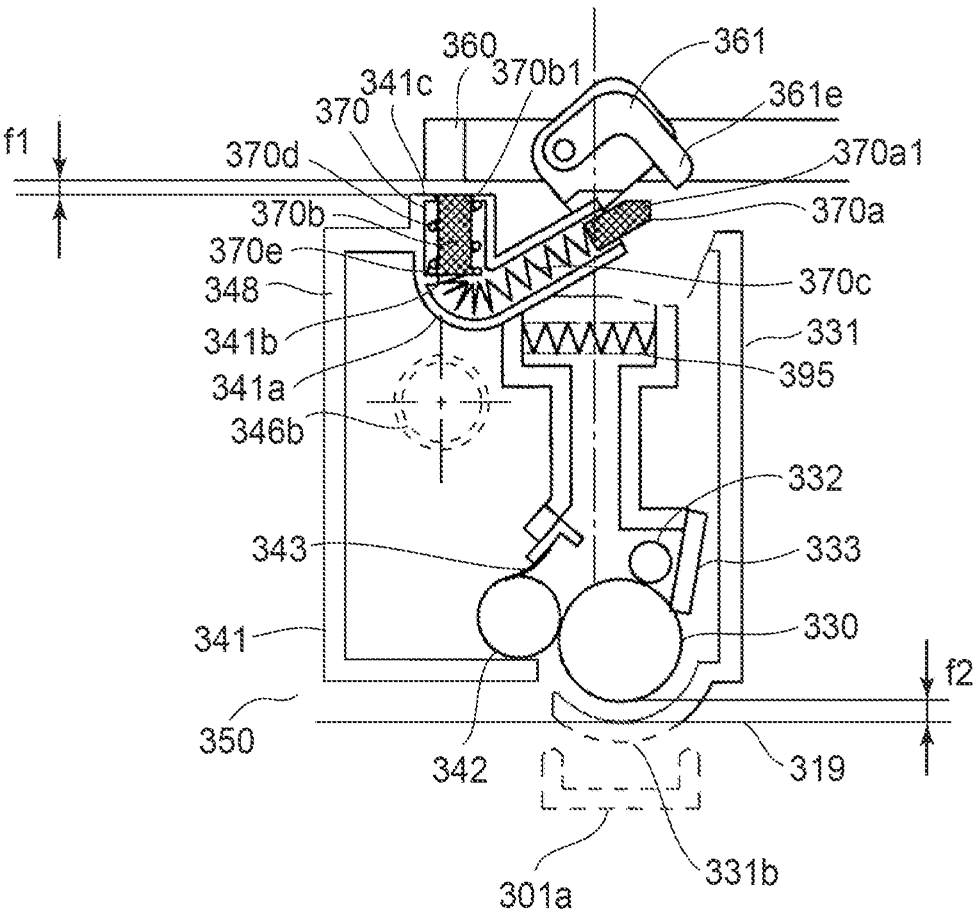
FIG. 55 is a sectional view of a process cartridge as seen in the axial direction of the photosensitive drum according to a fourth embodiment of the present invention, illustrating a force receiving device of the process cartridge.

When the door (unshown) is at the open position, the second force receiving member 370*b* is retracted to the position (stand-by position) where the locking portion 370*e* is contacted to the second locking portion 341*b* provided in the guide 341*a* as shown in FIG. 55 by the urging force of the second spring 370*d*. At this time, a gap f1 is provided between the second force receiving member 370*b* and the second force application member 360 provided in the main assembly side of the apparatus. In other words, since the second force receiving member 370*b* does not receive a force from the second force application member 360, the photosensitive drum 330 and the developing roller 342 are contacted to each other.

Figure 56:
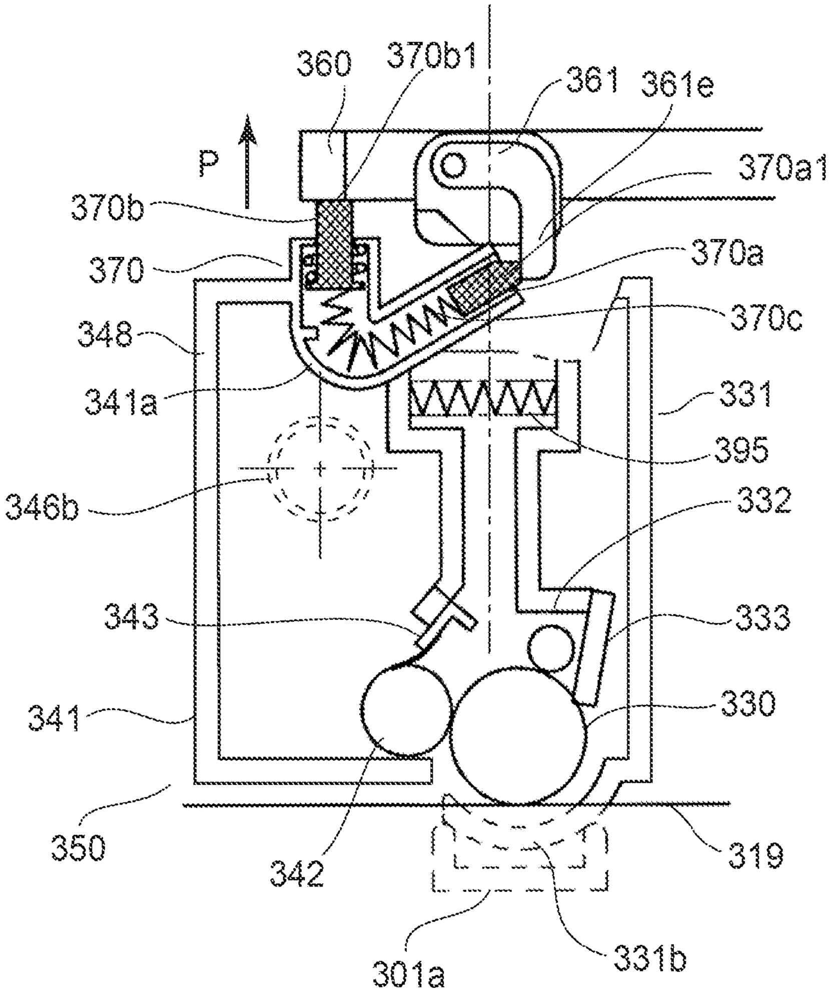
FIG. 56 is a sectional view of the process cartridge as seen in the axial direction of the photosensitive drum according to the fourth embodiment of the present invention, illustrating a force receiving device of the process cartridge.

Similarly to the first embodiment, by movement of the door (unshown) from the open position to the closed position, as shown in FIG. 56, the first force application member 361 is brought into contact to the first urged portion 370*a*1 of the first force receiving member 370*a*. By doing so, the second force receiving member 370*b* is urged through the spring 370*c* to move the second force receiving member 370*b* to an outer part of the developing unit 241 (arrow P). At this time, the second force application member 360 is contacted by the upper surface 370*b*1 of the second force receiving member 370*b* to regulate a further movement. However, since the spring 370*c* elastically deforms, the force receiving device 370 is not damaged even if the first force application member 361 continues pressing against the first force receiving member 370*a* with the movement of the second force receiving member 370*b* regulated.

Figure 57:
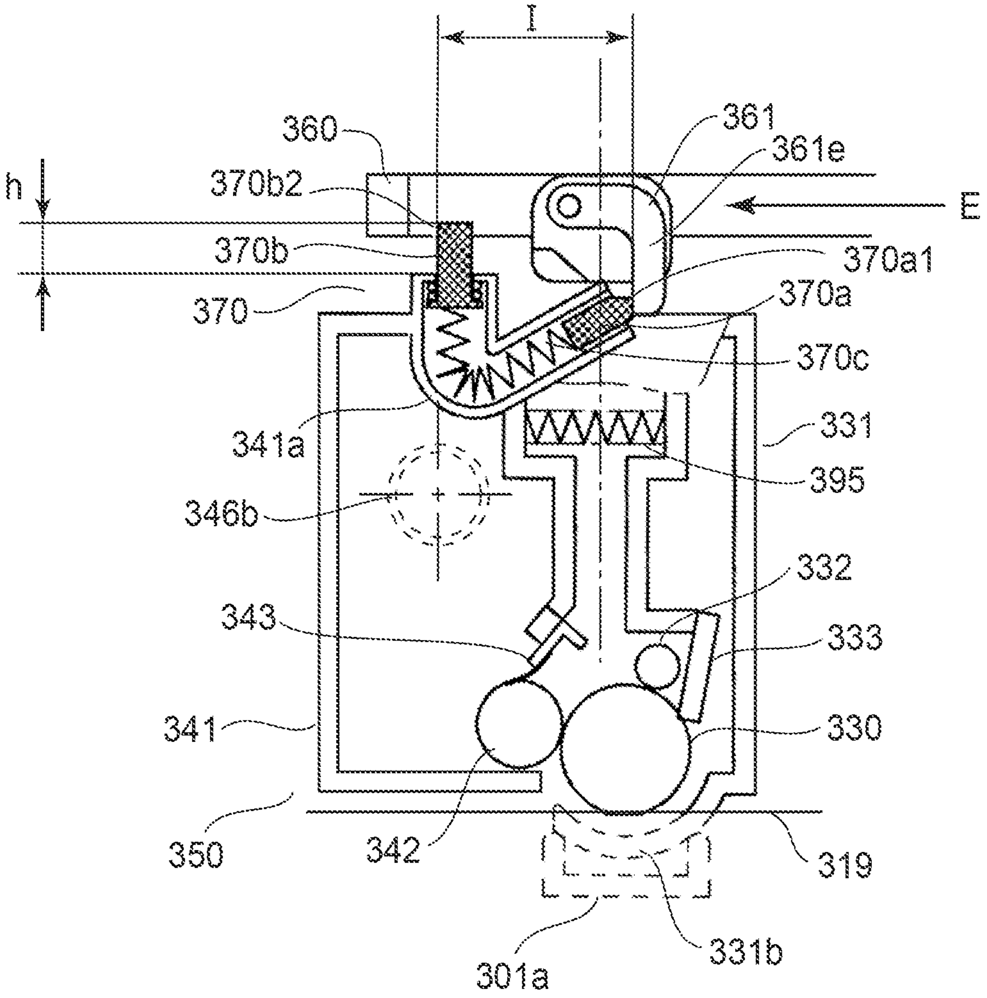
FIG. 57 is a sectional view of the process cartridge as seen in the axial direction of the photosensitive drum according to the fourth embodiment of the present invention, illustrating the force receiving device of the process cartridge.

As shown in FIG. 57, when the second force application member 360 moves in the direction of an arrow E, the second force receiving member 370*b* is further moved by the urging force of the spring 370*c* into the movement path of the second force application member 360.

Figure 58:
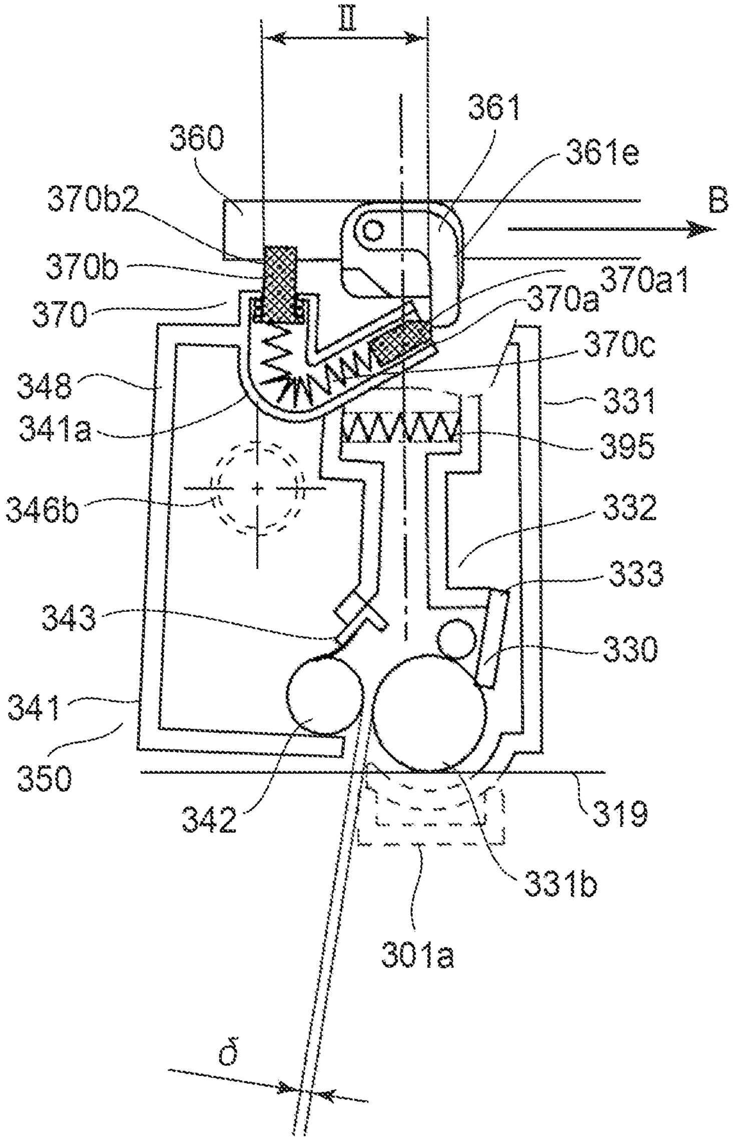
FIG. 58 is a sectional view of the process cartridge as seen in the axial direction of the photosensitive drum according to the fourth embodiment of the present invention, illustrating a force receiving device of the process cartridge.

Then, as shown in FIG. 58, by the movement of the second force application member 360 in the direction of the arrow B, the side surface 370*b*2 (second urged portion) provided on the second force receiving member 370*b* receives a force from the second force application member 360. Further, where the second force application member 360 moves in the direction of an arrow E, the developing unit 341 rotates about the connecting portion 346*b* with the drum unit 331, by which the developing roller 342 is spaced from the electrophotographic photosensitive drum 330 by a gap δ. Here, the position where the first force receiving member 370*a* is urged by the first force application member 361 is fixed, and the second force receiving member 370*b* is moved by the movement on the second force application member 360 in the direction of the arrow B shown in FIG. 58. Therefore, the distance I between the first force receiving member 370*a* and the second force receiving member 370*b* and the distance II between the first force receiving member 370*a* and the second force receiving member 370*b*, satisfy distance I>distance II. In the force receiving device 370 of this embodiment, the change of the distance can be accommodated by the sliding of the spring 370*c* and the first force application member 361 relative to the first force receiving member 370*a*.

By the movement of the second force application member 360 from the position shown in FIG. 58 in the direction indicated by the arrow E in FIG. 57, the movement of the second force receiving member 370*b* by the second force application member 360 is permitted. Similarly to the first embodiment, by the urging spring 395 provided on the cartridge 350*y*, the developing roller 342 and the photosensitive drum 330 are brought into contact to each other.

Also in this embodiment, the structures other than the force receiving device 370 are the same as those of the cartridge 50*y* of the first embodiment. The operations of the first force application member 361 in this embodiment are the same as those of the first force application member 61 in the first embodiment or the first force application member 461 in the second embodiment.

Fifth Embodiment

Figure 59:
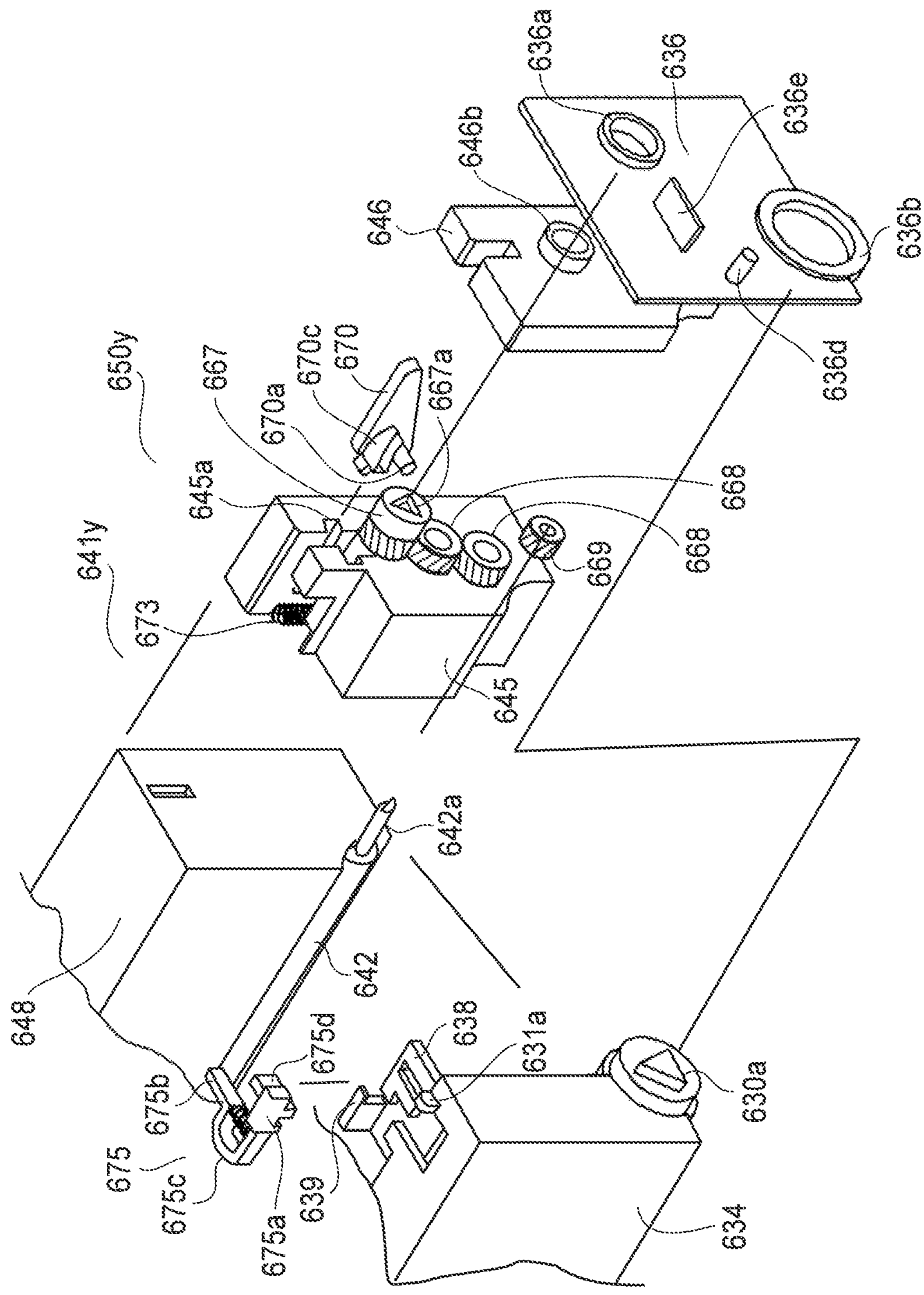
FIG. 59 is a perspective view of a process cartridge according to a fifth embodiment of the present invention, as seen from a drive side.
Figure 60:
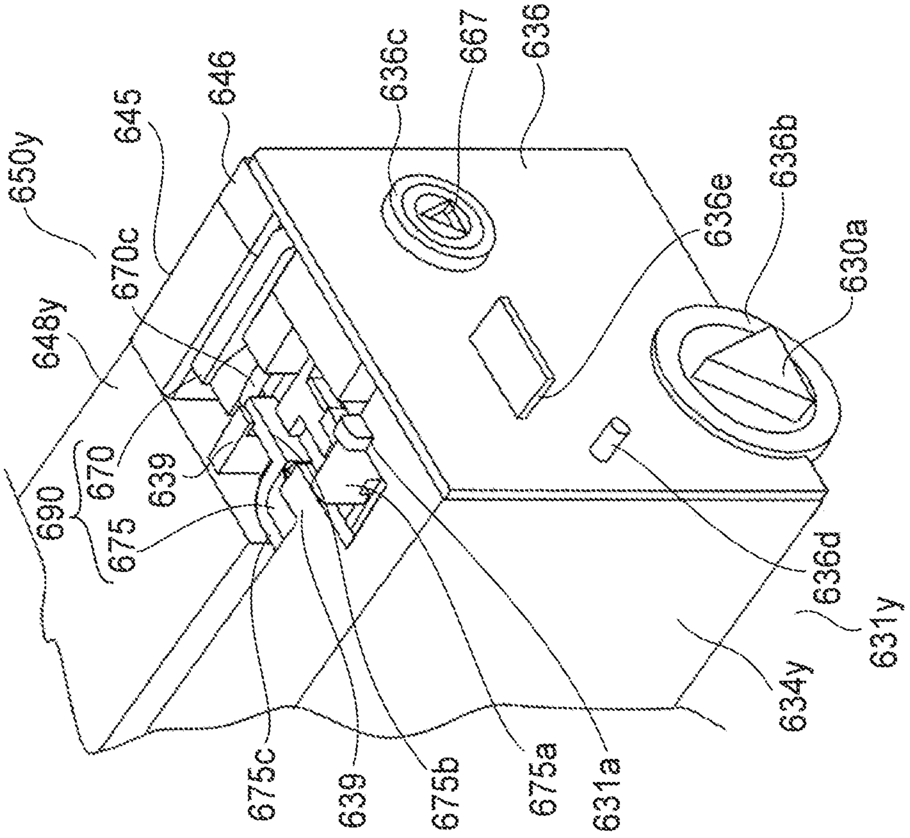
FIG. 60 is a perspective view of the process cartridge according to a fifth embodiment of the present invention, as seen from a drive side.

This embodiment relates to a modified example of a supporting structure for the force receiving device (FIGS. 59, 60).

This embodiment will be described also with a yellow cartridge 650*y* accommodating a yellow color developer as an exemplary cartridge.

The cartridge 650*y* is provided with a force receiving device 690 for providing contact between and spacing of the developing roller 642 and the photosensitive drum 630. The force receiving device 690 comprises a first force receiving member 675 and a second force receiving member 670 shown in FIGS. 59, 60, similarly to the first embodiment. The first force receiving member 675 is mounted to the drum frame 634 by engagement between the engaging portion 675*d* provided on the first force receiving member 675 with the guide portion 638 of the drum frame 634. The first force receiving member 675 mounted to the drum frame 634 is prevented from disengagement from the drum frame 634 by a regulating portion 639 provided on the drum frame 634.

A shaft 670*a* of the second force receiving member 670 is engaged with a guide portion 645*a* provided on the bearing unit 645. The bearing unit 645 including a second force receiving member 670 is fixed to one longitudinal end of the developing device frame 648 and rotatably supports the developing roller 642 having a developing roller gear 669 at the end. Similarly to the first embodiment, the bearing unit 645 is provided with a coupling member 667 for receiving the driving force from the driving motor (unshown), and an idler gear 668 for transmitting the driving force from the coupling member 667 to the developing roller gear 669. The covering member 646 is fixed to the longitudinally outside of the bearing unit 645 so as to cover the coupling member 667 and the idler gear 668. The covering member 646 is provided with a cylindrical portion 646*b* which is projected beyond the surface of the covering member 646. The coupling member 667 is exposed through an inside opening of the cylindrical portion 646*b*.

[Assembling of Drum Unit and Developing Unit]

As shown in FIGS. 59, 60, when the developing unit 641 and the drum unit 631 are assembled, an outside circumference of the cylindrical portion 646*b* are engaged with the supporting hole portion 636*a* at one end. On the other hand, at the other end, the supporting hole portion 637*a* is engaged by the projected portion 648*b* provided projected from the developing device frame 648. The covering member 37 in the first embodiment shown in FIG. 11-FIG. 14 corresponds to the covering member 637 of this embodiment, and the supporting hole portion 37*a* shown in FIG. 11-FIG. 14 corresponds to the supporting hole portion 637*a* of this embodiment. The projected portion 48*b* provided projected from the developing device frame 48 in the first embodiment correspond to the projected portion 648*b* provided projected from the developing device frame 648 of this embodiment.

By doing so, the developing unit 641 is rotatably supported on the drum unit 631. FIG. 60 shows the cartridge 650*y* in which the developing unit 641 and the drum unit 631 have been combined with each other. Similarly to the first embodiment, the assembling is such that the urging portion 675*b* of the first force receiving member 675 is capable of acting on a cam surface 671 (third urged portion) provided on the second force receiving member 670, and similarly to the first embodiment, the contacting and spacing can be accomplished between the electrophotographic photosensitive drum 630 and the developing roller 642. Thus, the similar advantageous effects as with the first embodiment can be provided.

Sixth Embodiment

This embodiment relates to a modification of the force receiving device.

Figure 61:
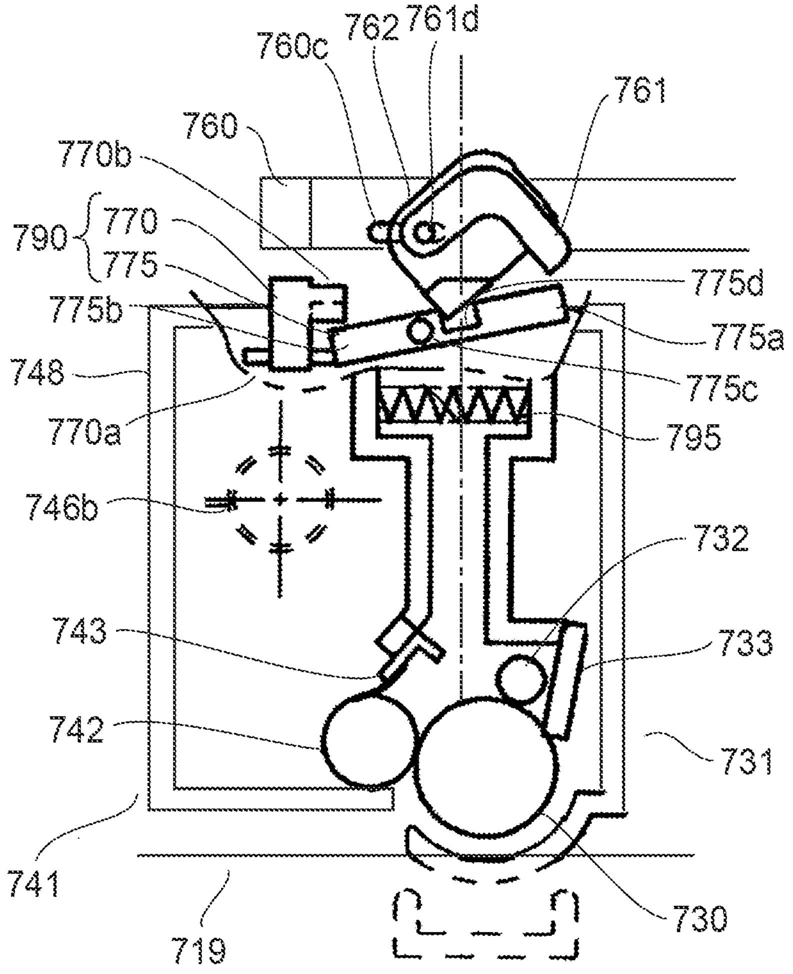
FIG. 61 is a sectional view of a process cartridge according to a sixth embodiment of the present invention.
Figure 62:
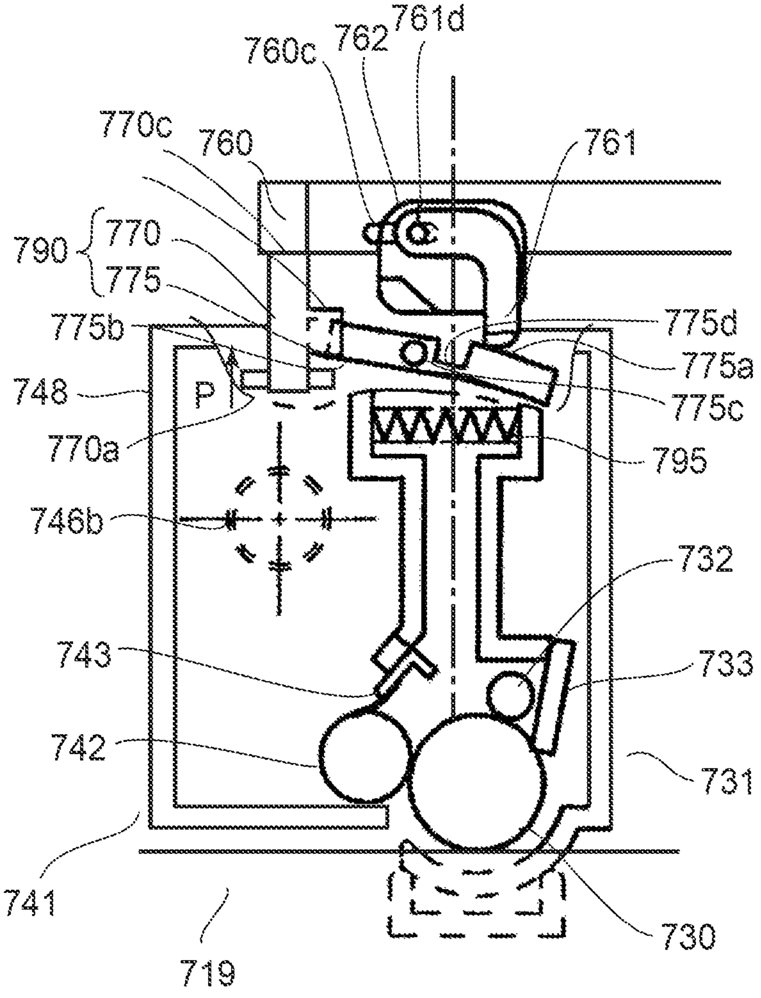
FIG. 62 is a sectional view of the process cartridge according to the sixth embodiment of the present invention.
Figure 63:
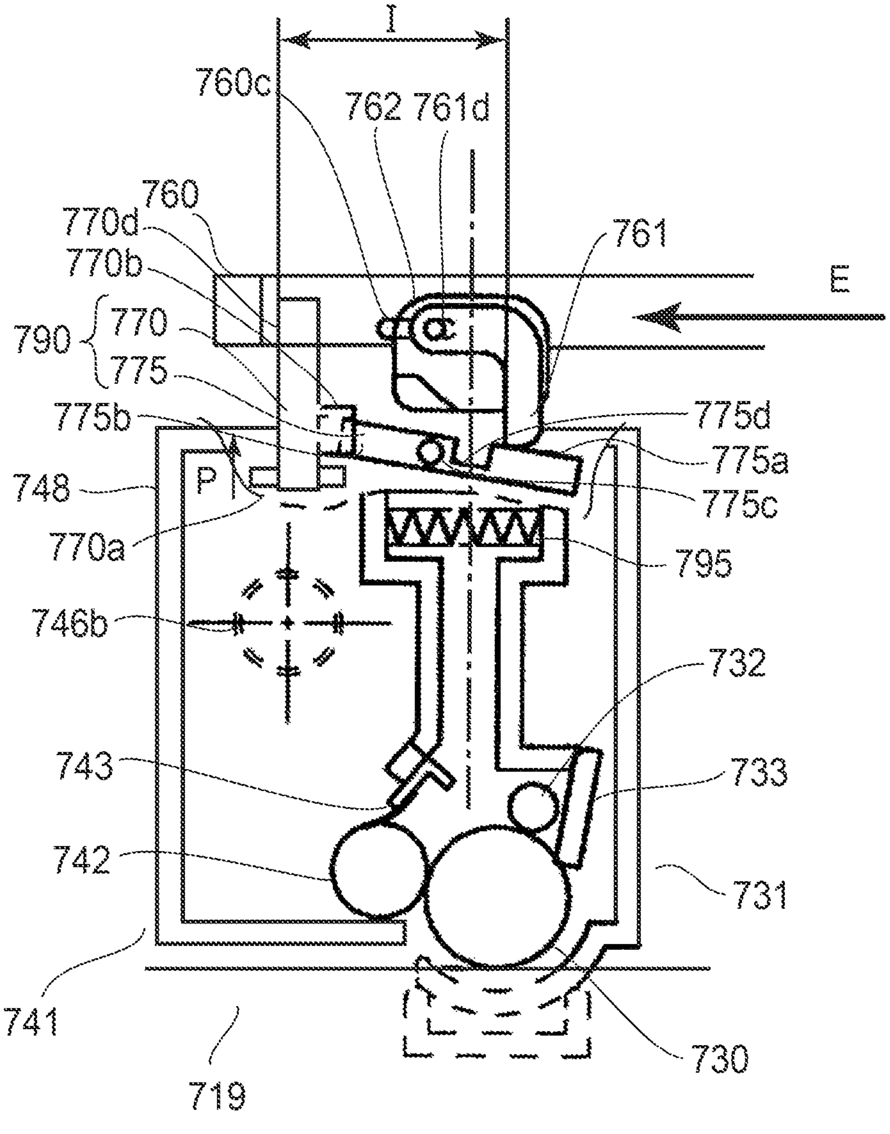
FIG. 63 is a sectional view of the process cartridge according to the sixth embodiment of the present invention.

This embodiment will be described also with a yellow cartridge 750*y* accommodating a yellow color developer as an exemplary cartridge. As shown in FIG. 61-FIG. 63, the developing unit 741 is provided with a force receiving device 790. The force receiving device 790 comprises a first force receiving member 775 and a second force receiving member 770. The first force receiving member 775 comprises a supporting portion 775*c* supported rotatably on the developing device frame 748.

Similarly to the first embodiment shown in FIG. 15-FIG. 19, the second force receiving member 770 is urged normally to provide the state shown in FIG. 61 by urging means (unshown). In other words, since the second force receiving member 770 does not receive a force from the second force application member 760, the photosensitive drum 730 and the developing roller 742 are contacted to each other. Similarly to the first embodiment, by movement of the door (unshown) from the open position to the closed position, the first force application member 761 is brought into contact to the first urged portion 775*a* of the first force receiving member 775 from the top side, as shown in FIG. 62. By this, the first force receiving member 775 is rotated about the supporting portion 775*c*, and the urging portion 775*b* of the first force receiving member 775 acts on the third urged portion 770*b* of the second force receiving member 770. Then, the second force receiving member 770 moves to an outside (arrow P) of the developing unit 741. At this time, the upper surface portion 770*c* of the second force receiving member 770*b* abuts the second force application member 760 to prevent further movement. The position of the second force receiving member 770 at this time is called regulating position.

However, even when the second force receiving member 770 is prevented from moving by the engaging rib 760, the force receiving device 790 including the second force application member 760 and the second force receiving member 770 is not damaged. This is because the elastic portion 775*d* formed by a thin portion provided in the first force receiving member 775 flexes (elastic deformation) as shown in FIG. 62. Therefore, even if the movement of the second force receiving member 770 is regulated, the force receiving device 790 is not damaged.

As shown in FIG. 63, when the second force application member 760 moves in the direction of an arrow E, the regulation by the second force application member 760 is released. Then, the elastic portion 775*d* of the first force receiving member 775 restores to the original position from the elastically deformed position to permit the urging portion 775*b* to move the second force receiving member 770*b* outwardly. Then, the second force receiving member 770*b* moves into the movement path of the second force application member 760.

Figure 64:
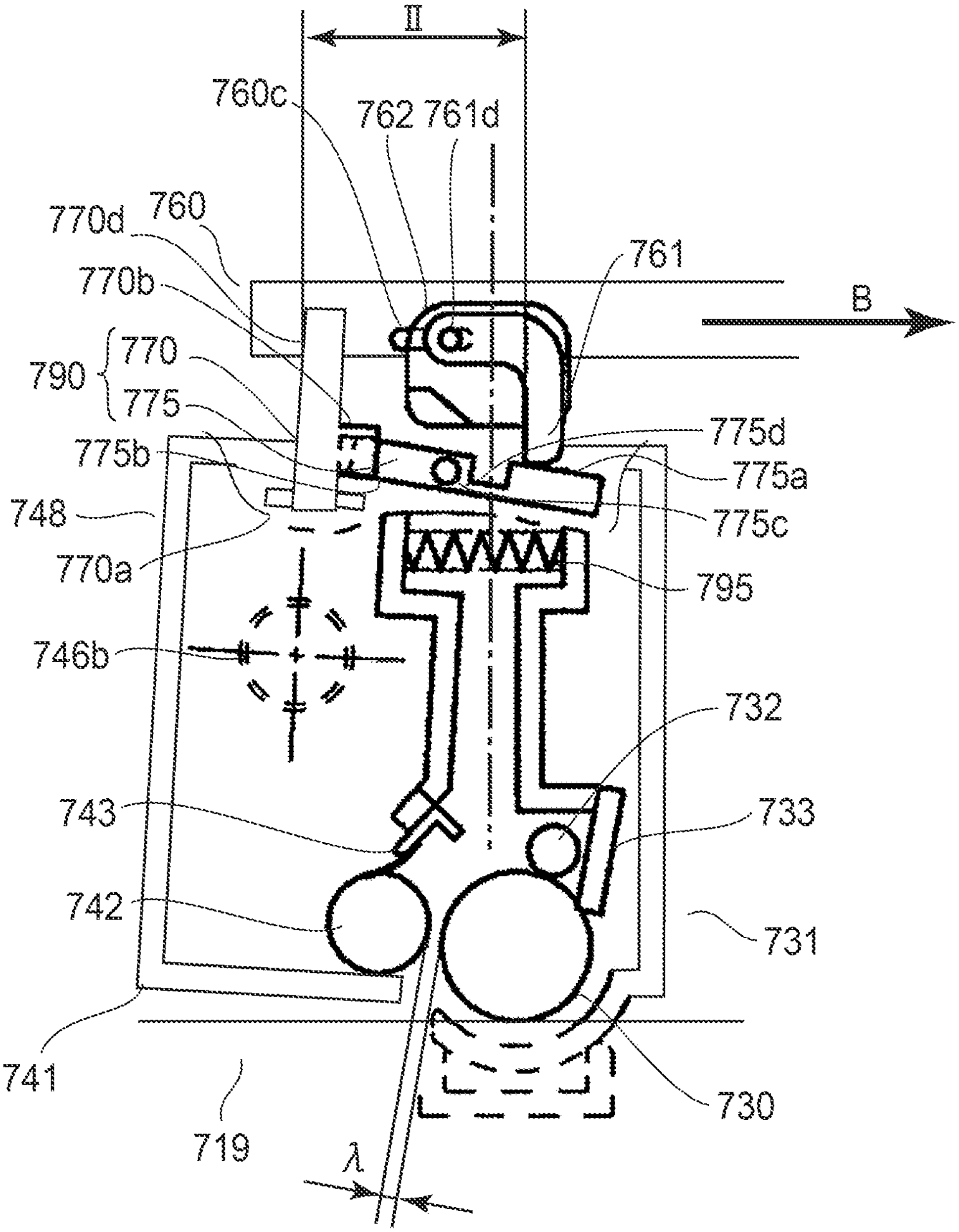
FIG. 64 is a sectional view of the process cartridge according to the sixth embodiment of the present invention.

As shown in FIG. 64, by movement of the second force application member 760 in the direction of the arrow B, the side surface 770*d* (second urged portion) receives a force from the second force application member 760. Further, when the second force application member 760 moves in the direction of an arrow B, the developing unit 741 rotates about the connecting portion 746*b* with the drum unit 731, by which the developing roller 742 is spaced from the electrophotographic photosensitive drum 730 by a gap λ. Here, the position where the first force receiving member 775 is urged by the first force application member 761 is fixed, and the second force receiving member 760*b* is moved by the movement on the second force application member 770 in the direction of the arrow B shown in FIG. 64. Therefore, the distance I between the first force receiving member 775 and the second force receiving member 770*b* and the distance II between the first force receiving member 775 and the second force receiving member 770*b*, satisfy distance I>distance II. In the force receiving device 790 of this embodiment, the distance change can be accommodated by the sliding of the first force application member 761 relative to the first force receiving member 775*a* and the deformation of the elastic portion 775*d* formed by a thin portion provided on the first force receiving member 775.

By the movement of the second force application member 760 from the position shown in FIG. 64 in the direction indicated by the arrow E in FIG. 63, the movement of the second force receiving member 770*b* by the second force application member 760 is permitted. Similarly to the first embodiment, the developing roller 742 and the photosensitive drum 730 are contacted to each other by the urging spring 795 provided on the cartridge 750*y*.

Also in this embodiment, the structures other than the force receiving device 790 are the same as those of the cartridge 50*y* of the first embodiment. The operations of the first force application member 761 in this embodiment are the same as those of the first force application member 61 in the first embodiment or the first force application member 461 in the second embodiment. The force receiving device 790 of this embodiment provides the similar advantageous effects as with the first embodiment.

Seventh Embodiment

FIG. 65 to FIG. 68 show a modified example of the modified example.

Figure 65:
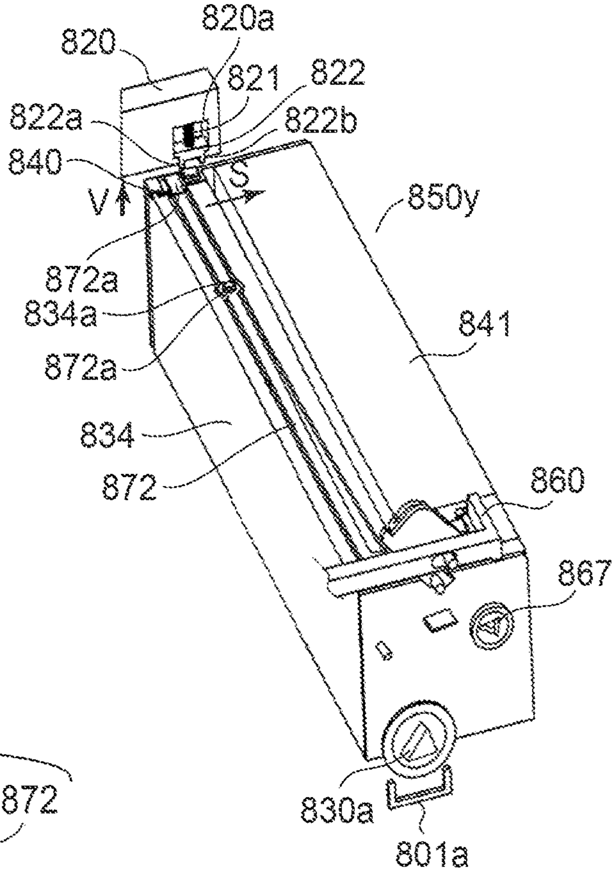
FIG. 65 is a perspective view of a process cartridge according to a seventh embodiment, illustrating a force receiving device of a process cartridge.
Figure 66:
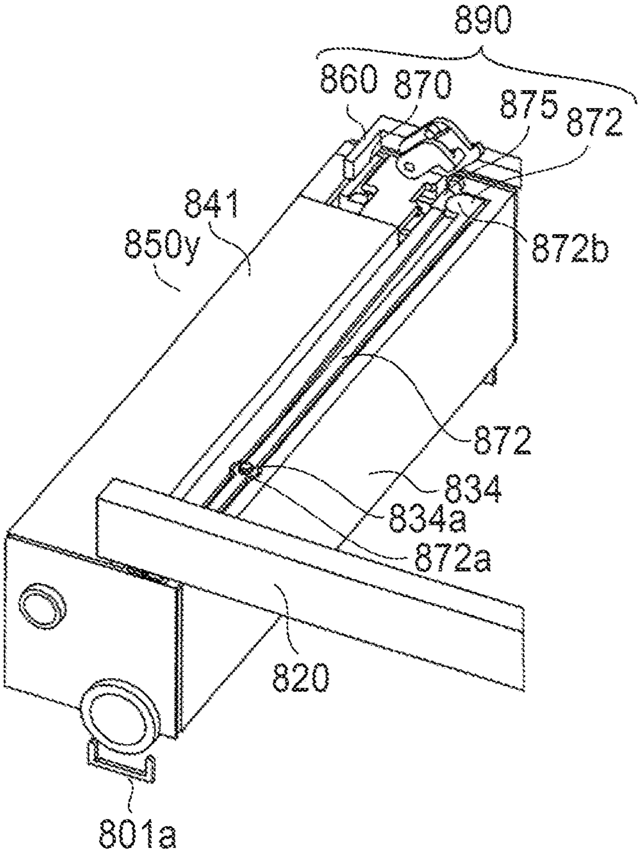
FIG. 66 is a perspective view of the process cartridge according to the seventh embodiment, illustrating the force receiving device of a process cartridge.
Figure 67:
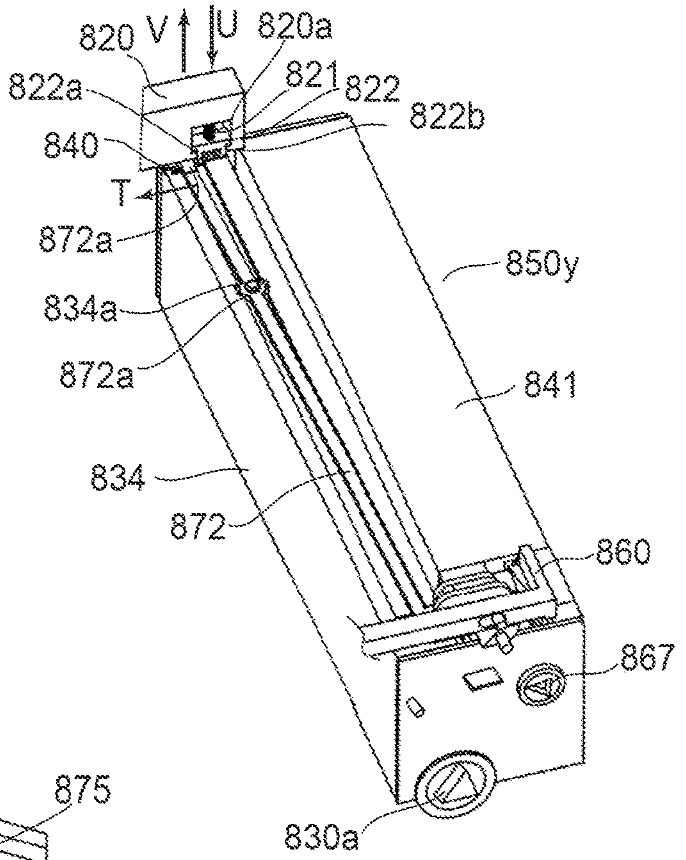
FIG. 67 is a perspective view of the process cartridge according to the seventh embodiment, illustrating the force receiving device of a process cartridge.
Figure 68:
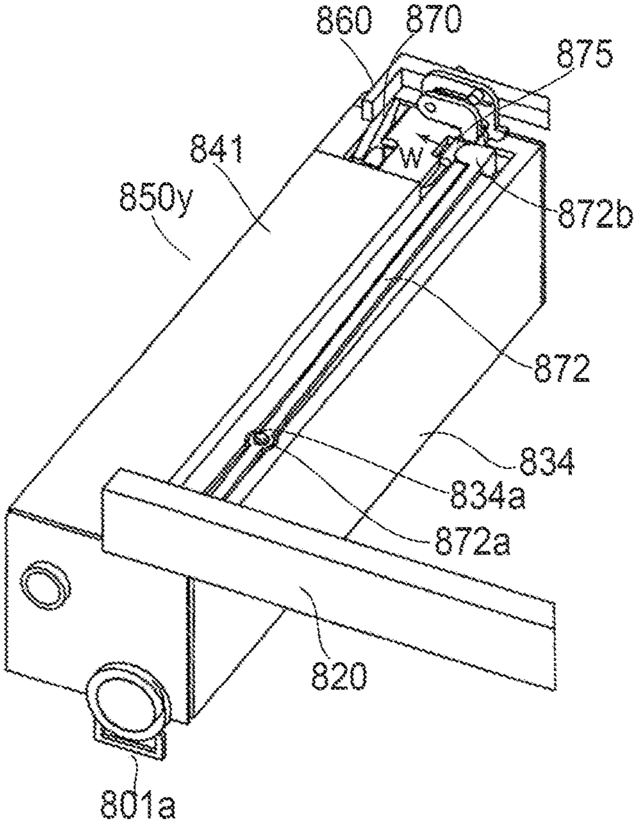
FIG. 68 is a perspective view of the process cartridge according to the seventh embodiment, illustrating the force receiving device of a process cartridge.

This embodiment will be described also with a yellow cartridge 850*y* accommodating a yellow color developer as an exemplary cartridge. FIG. 65 is a perspective view of a process cartridge 850*y* as seen from a coupling member 830*a* side of the photosensitive drum 830 wherein an urging member 820 of the main assembly of the apparatus has moved in the direction of an arrow V (upward) in FIG. 67. FIG. 66 is a perspective view of the process cartridge 850*y* as seen from the side opposite from the coupling member 830*a* of the photosensitive drum 830 in the same state as of FIG. 65. FIG. 67 is a perspective view of the process cartridge 850*y* as seen from the coupling member 830*a* side of the photosensitive drum 830 wherein the urging member 820 of the main assembly of the apparatus has moved in the direction of an arrow U in FIG. 67. FIG. 68 is a perspective view of the process cartridge 850*y* as seen from the side opposite from the coupling member 830*a* of the photosensitive drum 830 in the same state as of FIG. 67.

In this embodiment, as shown in FIGS. 65, 66, the main assembly of the apparatus comprises an urging member 820 for urging the cartridge 850*y* to a positioning portion 801*a* provided in the main assembly of the apparatus. The photosensitive drum 830 is provided with a coupling member 830*a* for receiving the driving force, and a developing roller is provided with a developing roller gear 869 provided in turn with a coupling member 867 for receiving the driving force, and the urging member 820 urges the cartridge 850*y* at the longitudinal end opposite from the other longitudinal end where the coupling member 830*a* and the coupling member 867 are provided. The urging member 820 has a guide portion 820*a*, an urging portion 822 and an urging spring 821. The urging portion 822 is supported by the guide portion 820*a* for movement toward the cartridge 850*y*.

The urging portion 822 is urged by an urging spring 821 in the direction of an arrow U in FIG. 67. The operations of the urging member 820 are similar to the operations of the first force application member 61 of the first embodiment, and with the opening operation of the door of the main assembly of the apparatus, the urging member 820 moves in the direction of an arrow V in FIG. 67, and with the closing operation of the door of the main assembly of the apparatus, it moves in the direction of an arrow U in FIG. 67. Thus, when the urging member 820 moves in the direction of the arrow U, the urging portion 822 is contacted to the cartridge 850*y* to urge the cartridge 850*y* by a force of the urging spring 821. By the urging force, the cartridge 850*y* is positioned relative to the main assembly of the image forming apparatus 100 by positioning the projection 831*a* provided on the drum frame 834 to the positioning portion 801*a* of the main assembly of the apparatus, similarly to the positioning operation of the cartridge 50*y* to the main assembly 100 of the apparatus of the first embodiment.

Also in this embodiment, as shown in FIGS. 65, 66, the developing unit 841 is provided with a force receiving device 890. The force receiving device 890 comprises a first force receiving member 875, a second force receiving member 870 and a rod 872. In this embodiment, the drum frame 834 is provided with a rod 872, and the hole 872*a* provided in the rod 872 is engaged by the shaft 834*a* provided on the drum frame 834, and the rod 872 is supported on the drum frame 834 rotatably about the hole 872*a*. The rod 872 is urging in the direction of an arrow S in FIG. 65 by a pressure of the spring 840. In other words, since the second force receiving member 870*b* does not receive a force from the second force application member 860, the photosensitive drum 830 and the developing roller 842 are contacted to each other.

Similarly to the first embodiment, by movement of the door (unshown) from the open position to the closed position, the urging portion 822 contacts the cartridge 850*y* and urges the cartridge 850*y* by the force of the urging spring 821, as shown in FIG. 67. At this time, the contact portion 822*a* of the urging portion 822 relative to the contact portion 822*a* moves the contact portion 872*a* of the rod 872 to rotate the rod 872 about the hole 872*a*. As shown in FIGS. 67, 68, an operating portion 872*b* of the rod 872 moves the first force receiving member 875 in the direction of an arrow W. When the first force receiving member 875 moves in the direction of the arrow W, the second force receiving member 870 moves (projects) outwardly of the developing unit 841 of the cartridge 850*y* from the stand-by position, similarly to the first embodiment.

The operations are the same as with the first embodiment.

The process cartridge of this embodiment has the same structure as the cartridge 50*y* of the first embodiment. The operations of the second force application member 860 of this embodiment are the same as the second force application member 60 of the first embodiment. The force receiving device 790 of this embodiment provides the similar advantageous effects as with the first embodiment.

According to the present invention, the process cartridge in which the electrophotographic photosensitive drum and the developing roller are contactable to and spaceable from each other, and the electrophotographic image forming apparatus to which such a process cartridge is detachably mountable can be downsized. In addition, a force receiving portion for spacing the developing roller and the electrophotographic photosensitive drum from each other is not easily damaged, when the process cartridge is handled and/or when the process cartridge is transported.

While the invention has been described with reference to the structures disclosed herein, it is not confined to the details set forth and this application is intended to cover such modifications or changes as may come within the purpose of the improvements or the scope of the following claims.

This application claims priority from Japanese Patent Applications No. 004106/2006 filed Jan. 11, 2006 and No. 346270/2006 filed Dec. 22, 2006 which are hereby incorporated by reference.

The invention claimed is:

1. A cartridge comprising;

a photosensitive drum;

a developing roller configured to develop an electrostatic latent image formed on the photosensitive drum;

a first frame rotatably supporting the photosensitive drum;

a second frame rotatably supporting the developing roller; and a movable member movable with respect to the second frame, the movable member including a first force receiving surface and a second force receiving surface, wherein the second frame is movable relative to the first frame between a contact position in which the developing roller is in contact with the photosensitive drum and a spaced position in which the developing roller is spaced from the photosensitive drum, wherein the first force receiving surface is inclined relative to a surface orthogonal to a rotational axis of the developing roller, wherein the second force receiving surface is capable of being moved by the first force receiving surface, in a direction including a component parallel to the rotational axis of the developing roller, between a first position and a second position, and wherein the second frame is capable of being moved by the second force receiving surface from the contact position toward the spaced position.

2. A cartridge according to claim 1, wherein the first force receiving surface is capable of receiving a first force to move the second force receiving surface, and the second force receiving surface is capable of receiving a second force to move the second frame.

3. A cartridge according to claim 1, wherein the first force receiving surface is inclined relative to a longitudinal direction of the cartridge.

4. A cartridge according to claim 1, wherein, as viewed from one end side of the cartridge along the direction parallel to the rotational axis of the developing roller, the first force receiving surface is provided at an opposite side of the movable member relative to the second force receiving surface.

5. A cartridge according to claim 3, wherein the longitudinal direction of the cartridge is parallel to the rotational axis of the developing roller.

6. A cartridge according to claim 3, wherein the second force receiving surface is parallel to the rotational axis of the developing roller.

7. A cartridge according to claim 1, wherein, when the second force receiving surface is in the second position, the second frame is in the contact position.

8. A cartridge according to claim 1, wherein, when the second force receiving surface is in the first position, the second frame is in the contact position.

9. A cartridge according to claim 1, wherein the second frame is provided with a groove portion extended in a direction parallel to the rotational axis of the developing roller, and the second force receiving surface is movable in the groove.

10. A cartridge according to claim 1, wherein the second force receiving surface is movable from the first position to the second position in a direction away from a central part of the cartridge.

11. A cartridge according to claim 10, wherein the first position is an inward position relative to the cartridge, and wherein the second position is an outward position relative to the cartridge.

12. A cartridge according to claim 11, wherein, when the second force receiving surface is in the outward position, the second force receiving surface is outside of the second frame and beyond an upper surface portion of the second frame.

13. A cartridge according to claim 11, wherein the second force receiving surface is movable from the inward position to the outward position in a direction away from the rotational axis of the developing roller.

14. A cartridge according to claim 11, further comprising an urging portion configured to urge the movable member to keep the second force receiving surface in the inward position.

15. A cartridge according to claim 14, wherein the urging portion includes a compression spring.

* * * * *